(12) United States Patent
Tago et al.

(10) Patent No.: US 8,655,921 B2
(45) Date of Patent: Feb. 18, 2014

(54) TRUE/FALSE DECISION METHOD FOR DECIDING WHETHER SEARCH QUERY CONTAINING LOGICAL EXPRESSION IS TRUE OR FALSE

(75) Inventors: Shinichiro Tago, Kawasaki (JP); Tatsuya Asai, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 12/479,569

(22) Filed: Jun. 5, 2009

(65) Prior Publication Data

US 2010/0036815 A1 Feb. 11, 2010

(30) Foreign Application Priority Data

Aug. 11, 2008 (JP) ................................. 2008-207367

(51) Int. Cl.
*G06F 17/30* (2006.01)
*G06F 17/50* (2006.01)

(52) U.S. Cl.
USPC .......................................... 707/802; 716/103

(58) Field of Classification Search
None
See application file for complete search history.

(56) References Cited

U.S. PATENT DOCUMENTS

| | | | | |
|---|---|---|---|---|
| 5,243,538 A * | 9/1993 | Okuzawa et al. | ............. | 716/103 |
| 5,434,794 A * | 7/1995 | Coudert et al. | ............... | 716/132 |
| 7,363,097 B2 * | 4/2008 | Sakai | ............................... | 700/97 |
| 7,865,339 B2 * | 1/2011 | Rushby et al. | ..................... | 703/2 |
| 2002/0062463 A1 * | 5/2002 | Hines | ................................ | 714/38 |
| 2002/0116440 A1 * | 8/2002 | Cohn et al. | ...................... | 709/105 |
| 2003/0018618 A1 * | 1/2003 | Bestgen et al. | .................... | 707/3 |
| 2003/0158720 A1 * | 8/2003 | Liu | .................................. | 703/17 |
| 2005/0044070 A1 * | 2/2005 | Nagata et al. | ..................... | 707/3 |
| 2006/0010428 A1 * | 1/2006 | Rushby et al. | ................. | 717/124 |
| 2006/0036983 A1 * | 2/2006 | Iwashita | ............................ | 716/5 |
| 2008/0021795 A1 * | 1/2008 | Hungar et al. | ................... | 705/27 |
| 2008/0072190 A1 * | 3/2008 | Jain et al. | ........................... | 716/5 |
| 2008/0095468 A1 * | 4/2008 | Klemmer et al. | ............. | 382/285 |

FOREIGN PATENT DOCUMENTS

JP 2000-330786 A 11/2000

OTHER PUBLICATIONS

Adrian Wrixon, "New Directions in Static and Dynamic Variable Ordering of Binary Decision Diagrams", 1998.*

* cited by examiner

*Primary Examiner* — Tarek Chbouki
(74) *Attorney, Agent, or Firm* — Fujitsu Patent Center

(57) ABSTRACT

When a searching apparatus accepts a search condition including a logical condition formed of variables, transition table is created by using a BDD method. In the transition table, a combination of a bit string indicative of true or false of a variable at each level for arriving from a starting-point variable to an arrival variable and the starting-point variable is associated with the arrival variable. Then, a true/false decision on the search condition of the search target data is made by, with an arrival variable of a transition destination being taken as the starting-point variable, extracting a bit string of a predetermined number of digits from the starting-point variable from among logical bit strings of the search target data and specifying the arrival variable as the transition destination based on the combination and the transition table.

9 Claims, 66 Drawing Sheets

FIG.1
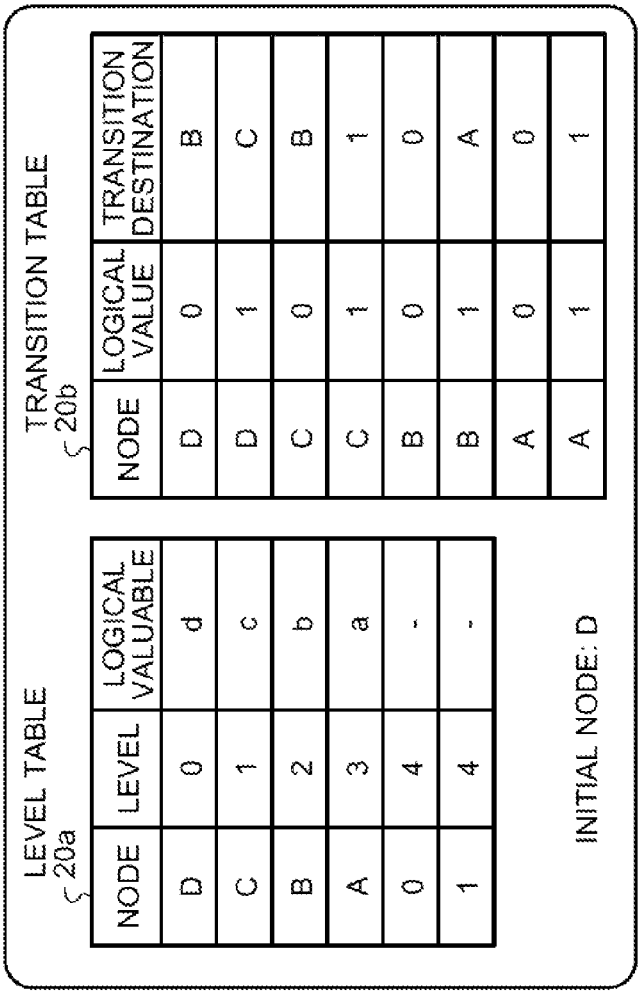
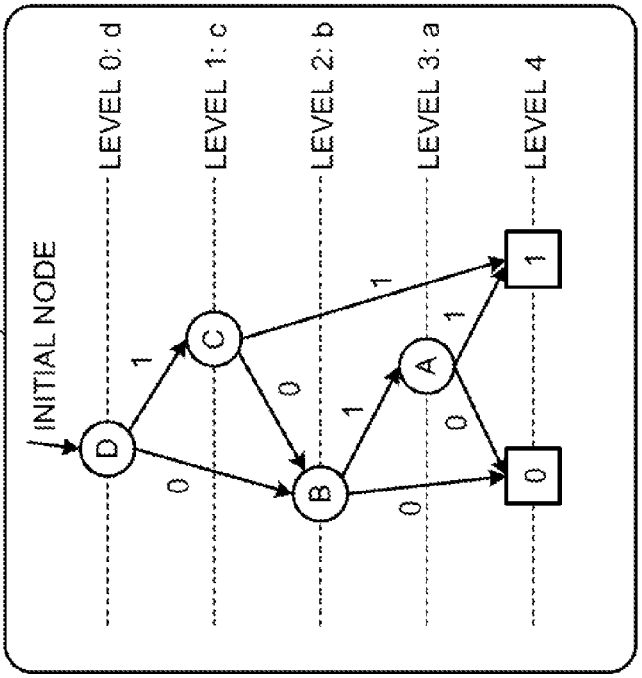

FIG.6

SEARCH QUERY
┌150b for $a in /DEPARTMENT [name="DEVELOPMENT DEPARTMENT"and ID="1.˜3"]
return $a/name/text()

FIG.7

SPLIT-SEARCH QUERY
┌150c

Q=q1 and q2 (foreach/DEPARTMENT)
 q1./DEPARTMENT/name="DEVELOPMENT DEPARTMENT"
          q2./DEPARTMENT/ID=="1.˜3"
Return /DEPARTMENT/name/text()

FIG.8

EXTRACTION RESULT TABLE
150d

| DATA TYPE | FIRST LOGICAL VARIABLE INFORMATION (q1) | SECOND LOGICAL VARIABLE INFORMATION (q2) | ... | REPLY ITEM |
|---|---|---|---|---|
| Data 0 | ○ | 2222 | ... | FIRST DEVELOPMENT DEPARTMENT |
| Data 1 | × | 3333 | ... | FIRST RESEARCH DEPARTMENT |
| Data 2 | ○ | 1223 | ... | THIRD DEVELOPMENT DEPARTMENT |

FIG.9

LOGICAL VALUE TABLE
150e

| DATA TYPE | FIRST LOGICAL VALUE(q1) | SECOND LOGICAL VALUE(q2) | ... |
|---|---|---|---|
| Data 0 | 1 | 0 | ... |
| Data 1 | 0 | 0 | ... |
| Data 2 | 1 | 1 | ... |

EVALUATION RESULT TABLE
⌐150i

| DATA TYPE | EVALUATION RESULT |
|---|---|
| Data 0 | 0 |
| Data 1 | 0 |
| Data 2 | 1 |

SEARCH RESULT DATA
⌐150j

THIRD DEVELOPMENT DEPARTMENT

FIRST DIAGRAM DATA
150g

FIRST LEVEL TABLE
151

| NODE | LEVEL | LOGICAL VARIABLE |
|---|---|---|
| H | 0 | H |
| G | 1 | G |
| F | 2 | F |
| E | 3 | E |
| D | 4 | D |
| C | 5 | C |
| B | 6 | B |
| A | 7 | A |
| 0 | 8 | - |
| 1 | 8 | - |

FIRST TRANSITION TABLE
152

| NODE | LOGICAL VALUE | TRANSITION DESTINATION |
|---|---|---|
| H | 1 | G |
| H | 0 | F |
| G | 0 | F |
| D | 1 | C |
| D | 0 | B |
| E | 0 | D |
| C | 1 | 1 |
| E | 1 | 1 |
| C | 0 | B |
| G | 1 | E |
| F | 1 | E |
| B | 1 | A |
| F | 0 | B |
| A | 1 | 1 |
| B | 0 | 0 |
| A | 0 | 0 |

FIG.33

THIRD DEVELOPMENT DEPARTMENT

FIG.47

SECOND DIAGRAM DATA
250h

SECOND TRANSITION TABLE
253

| NODE | LOGICAL VALUE | TRANSITION DESTINATION |
|------|---------------|------------------------|
| H | "1"1 | "1" |
| H | 1011 | "1" |
| H | 0"11 | "1" |
| H | 11"0 | D |
| H | 1010 | D |
| H | 0"10 | D |
| H | 100" | B |
| H | 0"0" | B |

| NODE | LOGICAL VALUE | TRANSITION DESTINATION |
|------|---------------|------------------------|
| "1" | ""1" | 1 |
| D | 11" | 1 |
| D | 1011 | 1 |
| D | 0"11 | 1 |
| D | 1010 | 0 |
| D | 100" | 0 |
| D | 0"10 | 0 |
| D | 0"0" | 0 |

| NODE | LOGICAL VALUE | TRANSITION DESTINATION |
|------|---------------|------------------------|
| B | "11 | 1 |
| B | "10 | 0 |
| B | "0" | 0 |

INITIAL NODE: H

FIG.57
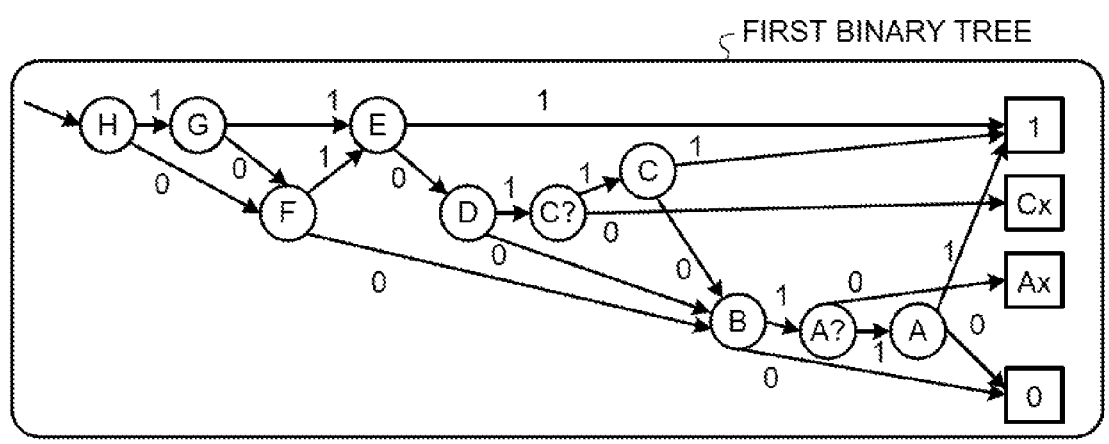
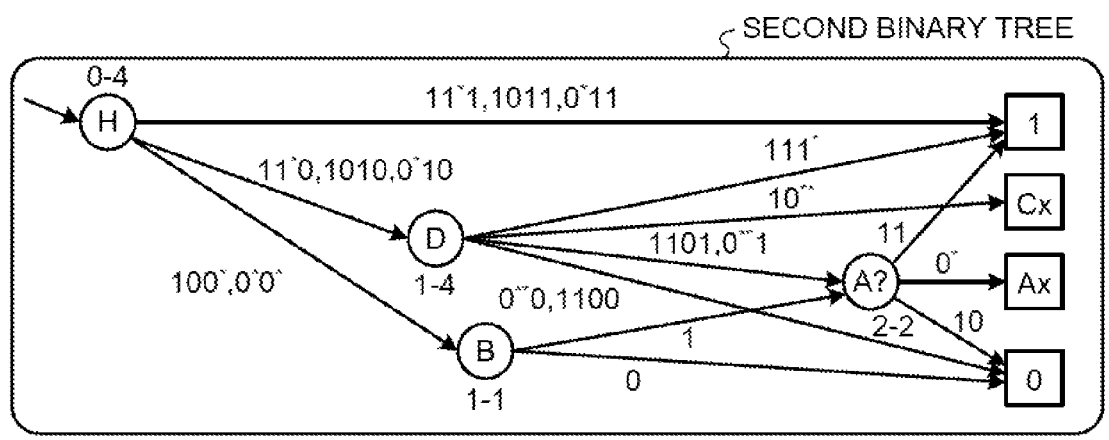

FIG.59

CALCULATION-AMOUNT ESTIMATION TABLE
350d

| EVALUATION EXPRESSION TYPE | CALCULATION COST |
|---|---|
| SIMPLE SEARCH | 1 |
| REGULAR EXPRESSION | 100 |
| NUMERICAL-VALUE OPERATION | 100 |
| DATE AND TIME CALCULATION | 100 |
| NEIGHBOR SEARCH | 100 |
| . . . | . . . |

FIG.60

CALCULATION AMOUNT TABLE
350e

| EVALUATION EXPRESSION IDENTIFICATION INFORMATION | CALCULATION COST |
|---|---|
| q1 | 1 |
| q2 | 100 |

FIG.62
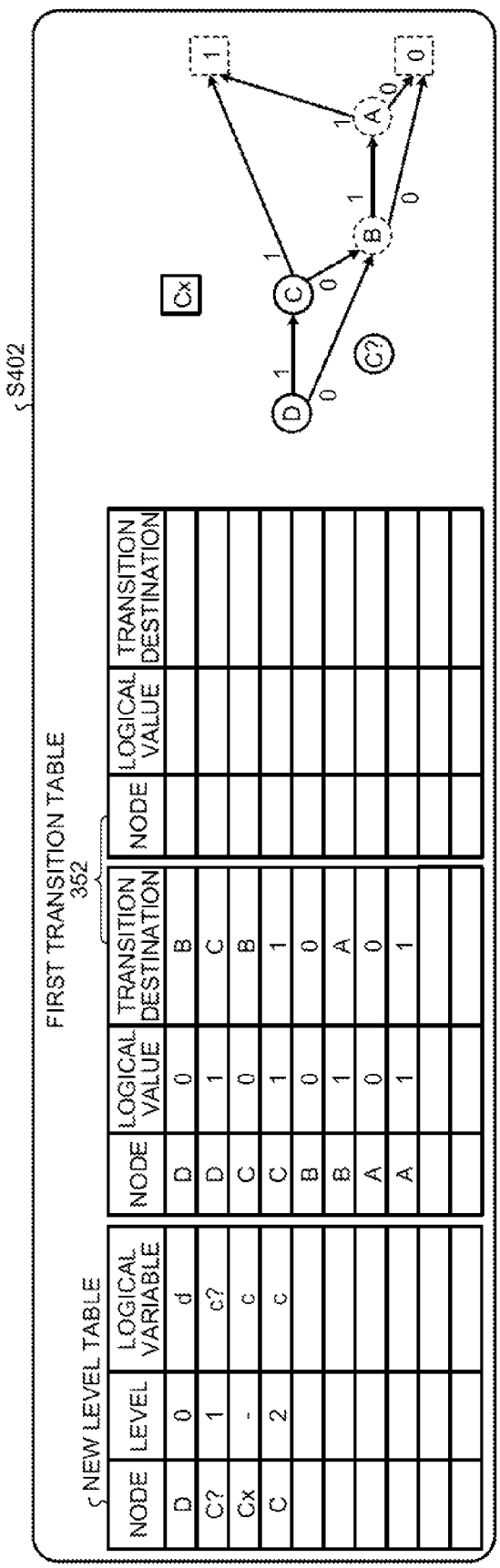
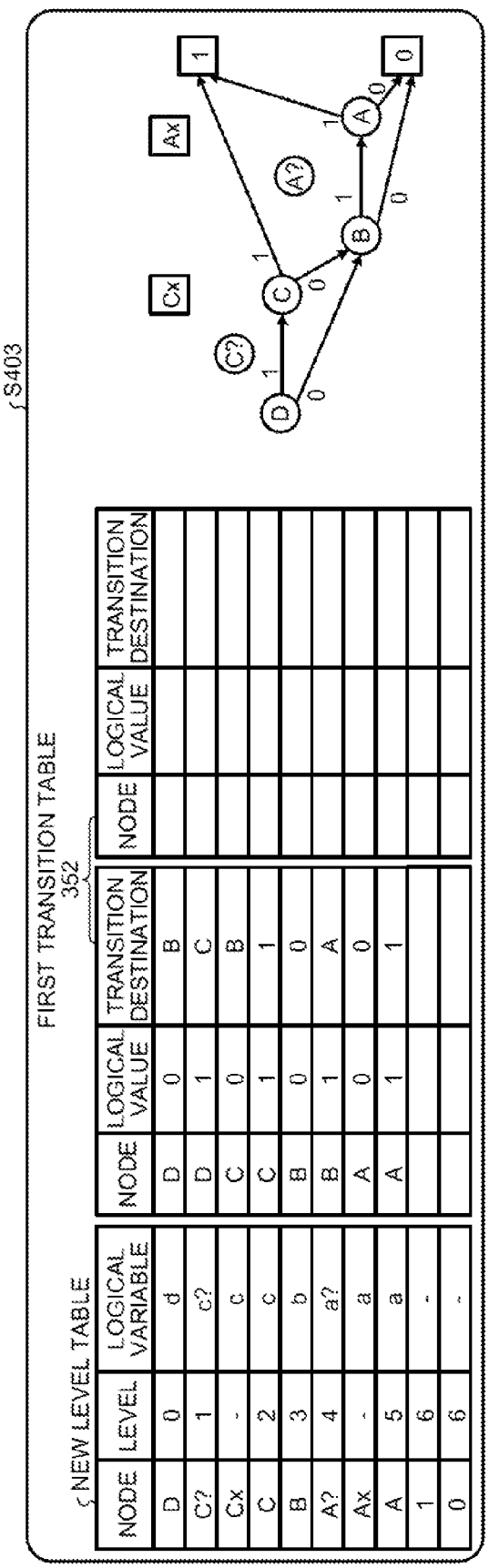

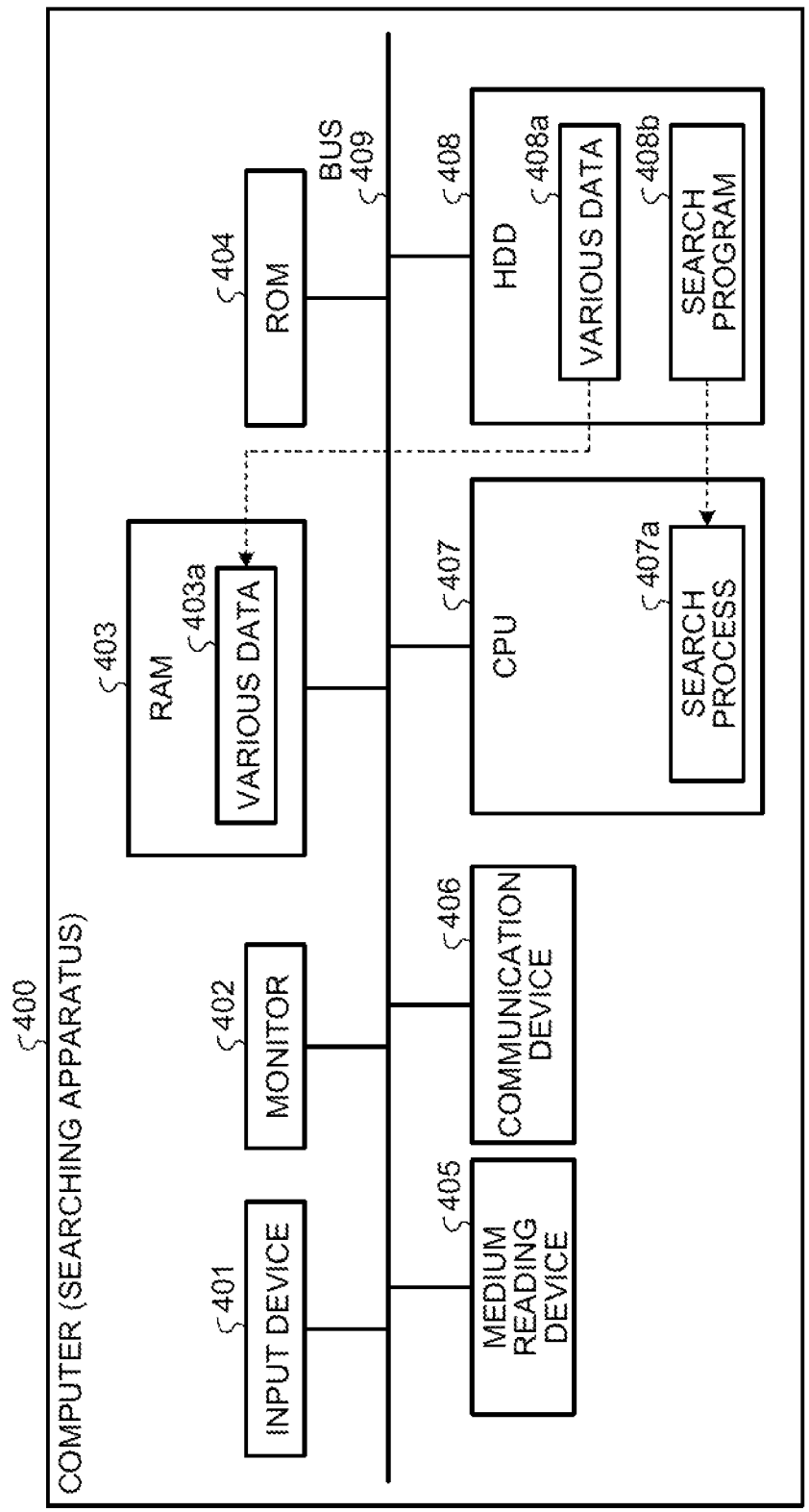

TRUE/FALSE DECISION METHOD FOR DECIDING WHETHER SEARCH QUERY CONTAINING LOGICAL EXPRESSION IS TRUE OR FALSE

CROSS-REFERENCE TO RELATED APPLICATION(S)

This application is based upon and claims the benefit of priority of the prior Japanese Patent Application No. 2008-207367, filed on Aug. 11, 2008, the entire contents of which are incorporated herein by reference.

FIELD

The present invention relates to a true/false decision method of a searching apparatus for deciding whether a search query containing a logical expression is true or false, and searching document data having a hierarchical structure for relevant data.

BACKGROUND

In recent years, document data is created in a markup language, such as Extensible Markup Language (XML) (hereinafter, such document data is referred to as an XML data), and is used on various computers. Since XML can facilitate a supply of structured documents and structured data via, for example, the Internet, the use of XML is increasing even among different systems.

To designate a specific check position in XML data, a search query is used. This search query is a standard query language for XML data, and has a capability of describing a search formula for a complex tree structure of XML data.

Also in recent years, for searching XML data by using a search query, there is a technique of using a Binary Decision Diagrams (BDD) method to represent the search query with a binary tree and evaluating whether data relevant to the search query is present in the XML data.

Japanese Laid-open Patent Publication No. 2000-330786 discloses a technology of using a JUMP instruction to represent a BDD for writing into an instruction memory when a logical-circuit simulation is performed, thereby allowing a substitution operation at high speed.

However, to evaluate a complex search query with a plurality of logical variables and logical operators being combined together based on the BDD method, a process has to be performed for each logical variable, thereby disadvantageously increasing a processing time required for evaluation.

That is, when a complex search query is evaluated based on the BDD method, reducing the processing time required for evaluation is an important issue.

SUMMARY

According to an aspect of the invention, a true/false decision method is performed by a searching apparatus. The method includes: accepting a search condition including a logical condition formed of a plurality of variables; transforming each piece of search target data stored in a storage device to a logical bit string based on a true/false decision result of each of the variables; creating a transition table by using a BDD method for the search condition, the transition table in which a combination of a bit string indicative of true or false of a variable at each level for arriving from a starting-point variable to an arrival variable at a level equal to or higher than a predetermined level and the starting-point variable is associated with the arrival variable; and making a true/false decision on the search condition of the search target data by, with an arrival variable of a transition destination being taken as the starting-point variable, extracting a bit string of a predetermined number of digits from the starting-point variable from among logical bit strings of the search target data and specifying the arrival variable as the transition destination based on the combination of the starting-point variable and the bit string and the transition table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 is a drawing for explaining BDD according to known technology;

FIG. 6 is a drawing of an example of the data structure of a split-search query according to the first embodiment;

FIG. 7 is a drawing of an example of the data structure of a search query according to the first embodiment;

FIG. 8 is a drawing of an example of the data structure of an extraction result table according to the first embodiment;

FIG. 9 is a drawing of an example of the data structure of a logical value table according to the first embodiment;

FIG. 33 is a drawing of an example of a monitor screen with an output of search result data;

FIG. 47 is a drawing of an example of the data structure of second diagram data according to the second embodiment;

FIG. 57 is a drawing for explaining general outlines and features of a searching apparatus according to a third embodiment;

FIG. 59 is a drawing of an example of the data structure of a calculation-amount estimation table according to the third embodiment;

FIG. 60 is a drawing of an example of the data structure of a calculation amount table according to the third embodiment;

FIG. 62 is a second drawing for explaining the process of the BDD constructing unit according to the third embodiment;

FIG. 71 is a drawing of a hardware configuration of a computer forming the searching apparatus according to the embodiments.

DESCRIPTION OF EMBODIMENT(S)

Figure 2:
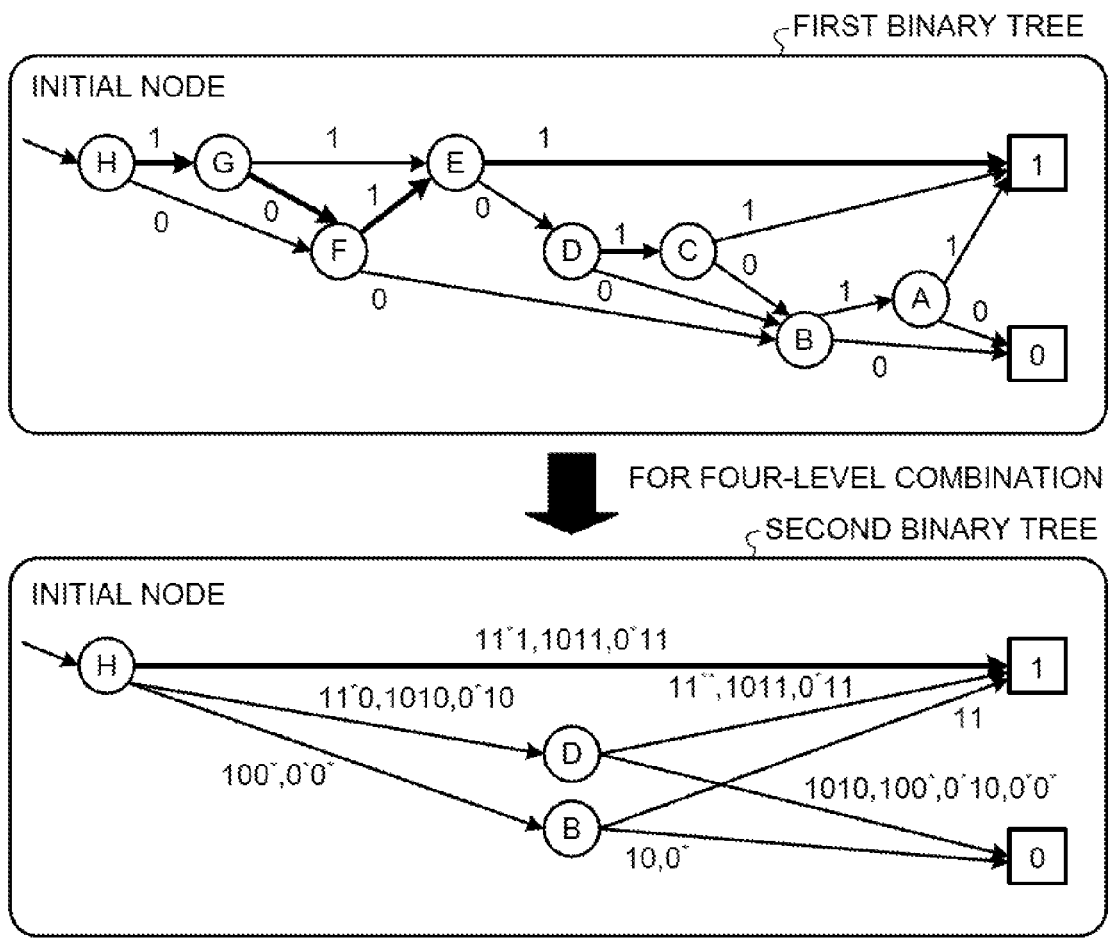
FIG. 2 is a drawing for explaining general outlines and features of a searching apparatus according to a first embodiment.

With reference to the attached drawings, preferred embodiments of the true/false decision method according to the present invention are explained in detail below.

[a] First Embodiment

First, the BDD method according to a known technology is explained. In this BBD method, by defining an input ordering of logical variables, a logical expression of a search query is represented as a binary tree to evaluate whether data as a search target of the search query is present. FIG. 1 is a drawing for explaining BDD according to known technology.

For example, a logical expression "a and b or c and d" can be represented as it is as a binary tree 20. As depicted in FIG. 1, this binary tree 20 has nodes "A to D" corresponding to logical variables "a to d" of the logical expression. Note that the structure of the binary tree 20 is defined by a level table 20a and a transition table 20b.

The level table 20a is a table for managing a level of each node and a logical value corresponding to the node. For example, in the first row of the level table 20a, information is registered indicating that the level of the node "D" is "0" and the logical variable corresponding to the node "D" is "d". Also, the level assigned to each node indicates the input ordering (in the example depicted in FIG. 1, the input ordering is d, c, b, and then a).

The transition table 20b is a table for managing a logical value of each node and a transition destination of the node corresponding to the logical value. For example, in the first row of the transition table 20b, information is registered indicating that a transition is made to the node "B" when the logical value of the node "D" is "0".

When it is assumed that the logical values of the logical variables a to d have already been calculated as those in a logical value table 10a, the logical values of the logical variables for a document identification (ID) "0" are "a=0, b=1, c=0, d=1". Therefore, from the binary tree 20, the evaluation result of the logical expression for the document data with the document ID "0" is "0" (false), meaning that data as a search target of the search query is not present in the document data with the document ID "0".

On the other hand, the logical values of the logical variables of the document data with the document ID "1" are "a=1, b=1, c=1, d=0". Therefore, from the binary tree 20, the evaluation result of the logical expression for the document data with the document ID "1" is "1" (true), meaning that data as a search target of the search query is present in the document data with the document ID "1".

However, in the conventional technology, as depicted in FIG. 1, "a logical value of a logical variable corresponding to a node is read, a transition to the next node is made based on the read logical value, and then a logical value of a logical variable corresponding to the transition-destination node is read". In this manner, a process is performed for each logical variable, thereby causing a problem of increasing a processing time for evaluating a search query.

Next, general outlines and features of the searching apparatus according to the first embodiment are explained. FIG. 2 is a drawing for explaining the general outlines and features of the searching apparatus according to the first embodiment. As depicted in FIG. 2, the searching apparatus according to the first embodiment generates a first binary tree based on the BDD method when obtaining a search query (by way of example, the logical expression of the search query is assumed to be "A and B or (C and D or E) and (F or G and H)") to evaluate the search query. This first binary tree has nodes "A to H" corresponding to logical variables "A to H".

The searching apparatus then transforms the first binary tree to generate a second binary tree (a lower part of FIG. 2) capable of deciding a node transition destination for every multiple bits (in the example depicted in FIG. 2, four bits or two bits), and uses the second binary tree to evaluate the search query.

As such, the searching apparatus according to the first embodiment generates a second binary tree from the first binary tree to decide a node transition destination for every multiple bits. Therefore, even when a complex search query is evaluated based on the BDD method, the processing time required for evaluation can be reduced.

Specifically, in the conventional technology, since the first binary tree is used as it is, a process has to be performed for each logical variable. Also, by deciding a node transition destination one by one based on each logical variable, the nodes have to be traced in sequence. For example, when the logical values of the variables are "H=1, G=0, F=1, E=1, D=0, C=0, B=1, A=0", to evaluate the search query, a node transition destination has to be decided four times at "the nodes H, G, F, and E".

On the other hand, the searching apparatus according to the first embodiment transforms the first binary tree to a second binary tree to perform a process for every multiple bits (in the example of FIG. 2, four bits). Therefore, the search query can be evaluated only by deciding a node transition destination once at the "node H" (when the logical values of the logical variables are "H=1, G=0, F=1, E=1, D=0, C=0, B=1, A=0").

It is assumed in FIG. 2 that the initial node is the node H and the input ordering of the logical variables A to H is defined as the ordering of the logical variables H to A. That is, when a process is performed for every four bits, a node transition destination is decided based on a logical value "1011" corresponding to the logical variables "H, G, F, E", and then a node transition destination is decided based on a logical value "0010" corresponding to the logical variables "D, C, B, A". Also, "*" included in the multiple bits of the second binary tree may indicate 1 or 0. For example, "11*1" corresponds to "1101" or "1111".

Figure 3:
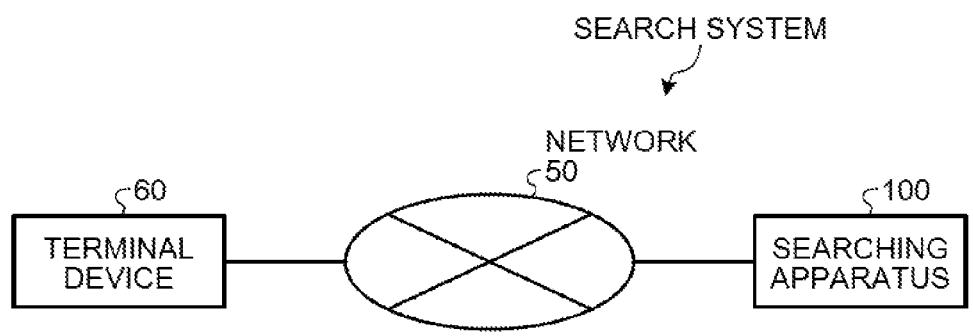
FIG. 3 is a drawing of the configuration of a search system according to the first embodiment.

Next, the configuration of a search system including the searching apparatus according to the first embodiment is explained. FIG. 3 is a drawing of the configuration of the search system according to the first embodiment. As depicted in FIG. 3, this search system includes a terminal device 60 and a searching apparatus 100. The terminal device 60 and the searching apparatus 100 are connected with each other via a network 50.

The terminal device 60 is a device that transmits a search query input from a user via an input device (not depicted) to the searching apparatus 100 and outputs the search result from the searching apparatus 100 to an output device (not depicted).

The searching apparatus 100 is a device that evaluates a search query received from the terminal device 60, searches XML data for relevant data, and transmits the search result to the terminal device 60. In the following, the configuration of the searching apparatus 100 according to the first embodiment is specifically explained.

Figure 4:
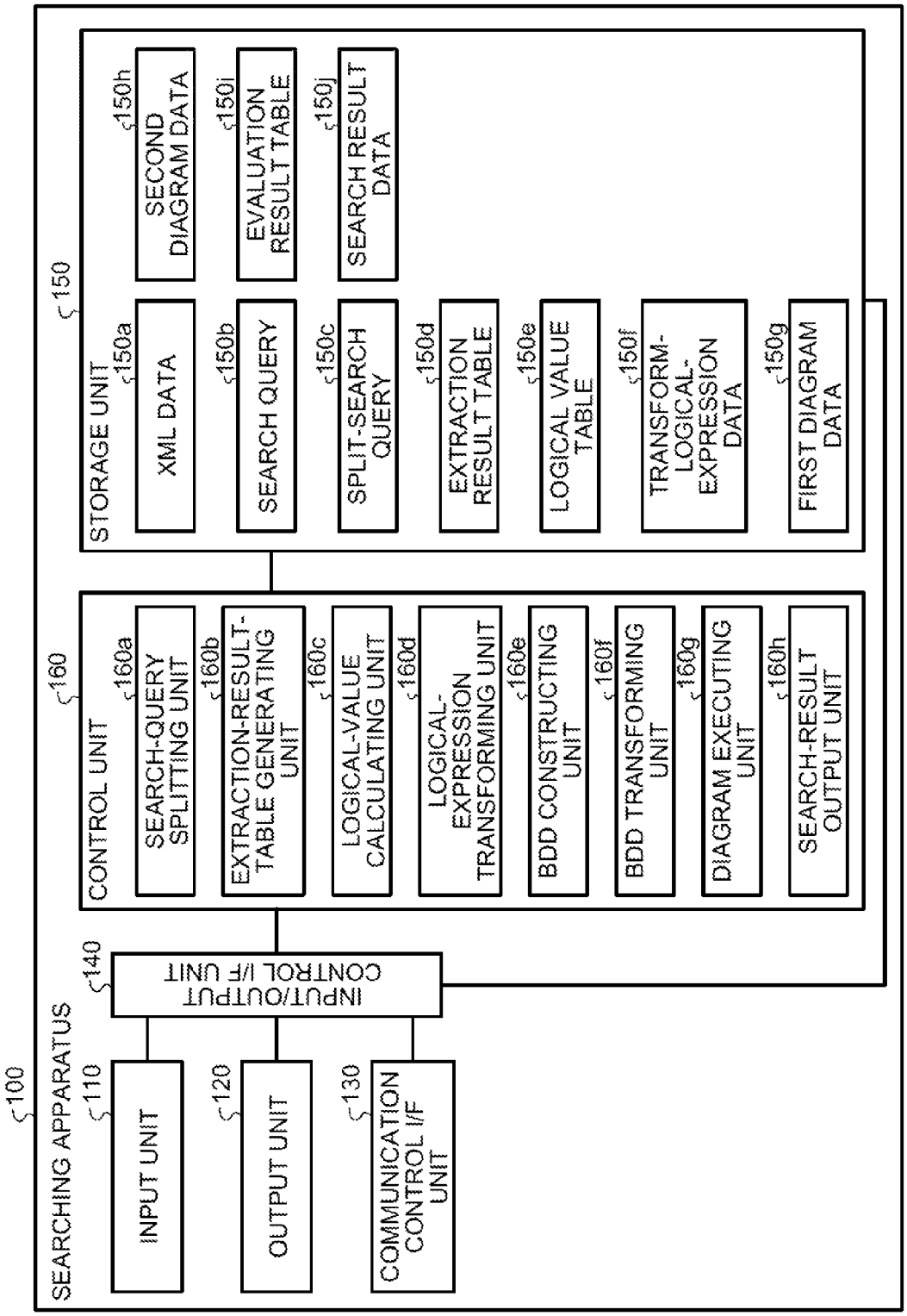
FIG. 4 is a functional block diagram of the configuration of the searching apparatus according to the first embodiment.

FIG. 4 is a functional block diagram of the configuration of the searching apparatus 100 according to the first embodiment. As depicted in FIG. 4, this searching apparatus 100 includes an input unit 110, an output unit 120, a wireless communication control interface (I/F) unit 130, an input/output control I/F unit 140, a storage unit 150, and a control unit 160.

The input unit 110 is a unit that is used to input various information, and is configured of, for example, a keyboard, a mouse, and a microphone. Note that a monitor (output unit 120), which will be explained below, also achieves a pointing device function in conjunction with the mouse.

The output unit 120 is a unit that outputs various information, and is configured of, for example, a monitor (or display or touch panel) and a loudspeaker. The communication control I/F unit 130 is a unit that mainly controls communication with the terminal device 60. The input/output control I/F unit 140 is a unit that controls inputs and outputs of data by the input unit 110, the output unit 120, the communication control I/F unit 130, the storage unit 150, and the control unit 160.

The storage unit 150 is a unit that stores therein data and programs required by the control unit 160 for various processes. In particular, in close association with the present invention, the storage unit 150 includes XML data 150a, a search query 150b, a split-search query 150c, an extraction result table 150*d*, a logical value table 150*e*, transform-logical-expression data 150*f*, first diagram data 150*g*, second diagram data 150*h*, an evaluation result table 150*i*, and a search result data 150*j*.

Figure 5:
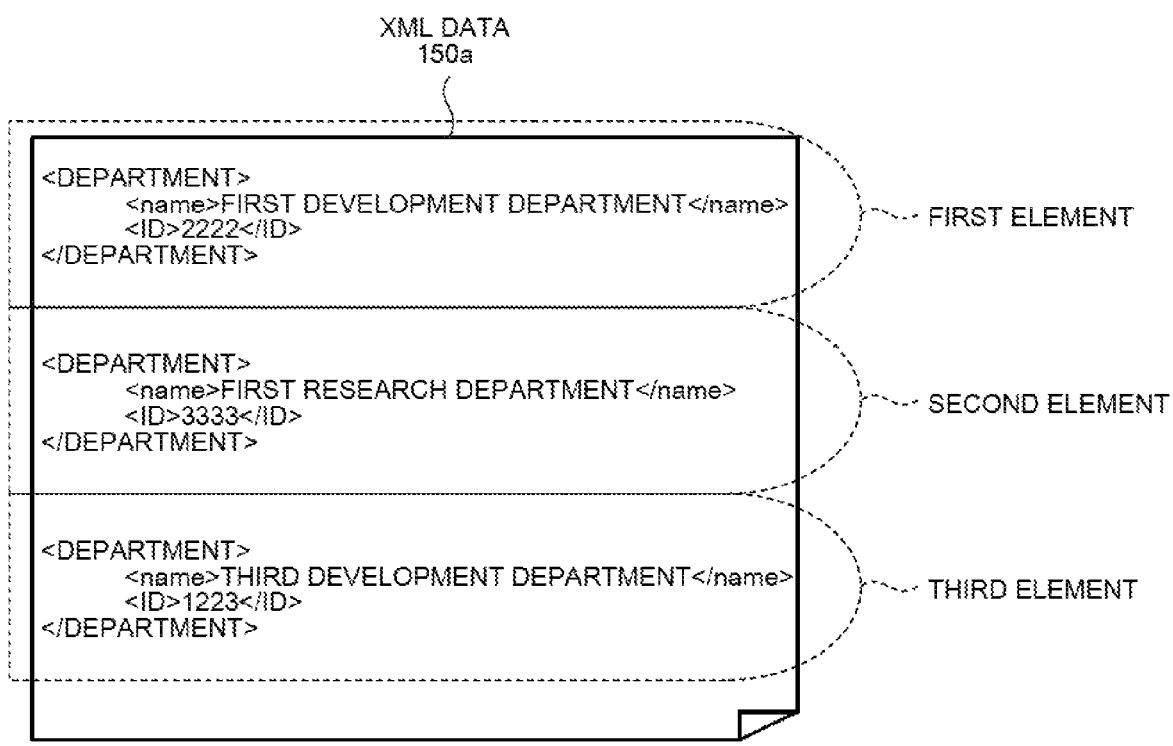
FIG. 5 is a drawing of an example of the data structure of XML data according to the first embodiment.

The XML data 150*a* is document data having a hierarchical structure with elements being divided with element identifiers "<'"", "</", and others. FIG. 5 is a drawing of an example of the data structure of the XML data 150*a* according to the first embodiment. Here, in the example depicted in FIG. 5, there are three types of element divided with "<department>" and "</department>" (hereinafter, "department" elements). Here, for convenience of explanation, a "department" element having "first development department" as a "name" element and "2222" as an "ID" element is assumed to be a first element. Also, a "department" element having "first research department" as a "name" element and "3333" as an "ID" element is assumed to be a second element, and a "department" element having "third development department" as a "name" element and "1223" as an "ID" element is assumed to be a third element.

The search query 150*b* represents data for retrieving data at a check position from the XML data 150*a*. FIG. 6 is a drawing of an example of the data structure of the search query 150*b* according to the first embodiment. The search query 150*b* depicted in FIG. 6 is a search query for selecting an element containing "development department" as a "name" element and "1.*3" (a sequence with the first number being 1 and the last numerical value being 3) as an "ID" element among the elements of "department" and designating document data registered in "name" of the selected element as a search target.

For example, when the search query 150*b* depicted in FIG. 6 is designated for the XML data 150*a* depicted in FIG. 5, the third element, that is, a "department" element having "third development department" as a "name" element and "1223" as an "ID" element, satisfies the condition for the search query 150*b*. Therefore, document data "third development department" registered in "name" of the third element is search target data.

The split-search query 150*c* is data obtained as a result of splitting the search query 150*b* by a search-query splitting unit 160*a* (which will be explained further below). FIG. 7 is a drawing of an example of the data structure of the split-search query 150*c* according to the first embodiment.

As depicted in FIG. 7, the split-search query 150*c* includes a logical expression "Q=q1 and q2" representing the search query 150*b* (refer to FIG. 6) by logical variables and logical operators, evaluation expressions "q1./department/name="development department"" and "q2./department/ID="1.*3"" for logical variables q1 and q2, and a definition expression "Return/department/name/text( )" at the time of transmitting the search result.

Here, for the logical variables q1 and q2, a logical variable "1 (true)" or "0 (false)" is calculated according to the evaluation result of the evaluation expression. For example, when the first element is evaluated with the evaluation expression "q1./department/name="development department"" for q1, the "name" element contains department, and therefore the evaluation result is "1". On the other hand, when the first element is evaluated with the evaluation expression "q2./department/ID="1.*3"" for q2, the "ID" element does not contain the relevant document data, and therefore the evaluation result is "0".

The extraction result table 150*d* is a table for managing information as an evaluation target of the evaluation expression (refer to q1 and q2 in FIG. 7) and an item for reply to the terminal device 60 when the evaluation result of the search query 150*b* is true. FIG. 8 is a drawing of an example of the data structure of the extraction result table 150*d* according to the first embodiment.

As depicted in FIG. 8, this extraction result table 150*d* includes a data type, first logical variable information, second logical variable information, and a reply item. Note that data types "Data 0 to Data 2" correspond to the information of the first to third elements depicted in FIG. 5.

For example, in the first row of FIG. 8, the first logical variable information of the data type "Data 0" (here, information indicating whether a document "development department" of the evaluation expression q1 is present) is represented by a circle (present), the second logical variable information (here, information as a comparison target of the evaluation expression q2) is represented by "2222", and the reply item is represented by "first development department".

The logical value table 150*e* is a table for managing the evaluation result of each evaluation expression. FIG. 9 is a drawing of an example of the data structure of the logical value table 150*e* according to the first embodiment. As depicted in FIG. 9, this logical value table 150*e* includes a data type, a first logical value, and a second logical value.

Here, the first logical value represents the evaluation result of a first logical variable from an evaluation expression (for example, the evaluation expression q1), and the second logical value represents the evaluation result of a second logical variable from an evaluation expression (for example, the evaluation expression q2).

The transform-logical-expression data 150*f* is data obtained by transforming the logical expression (refer to FIG. 7) to a reverse Polish notation by a logical-expression transforming unit 160*d* (which will be explained further below). The first diagram data 150*g* is data created by a BDD constructing unit 160*e* (which will be explained further below).

Figure 10:
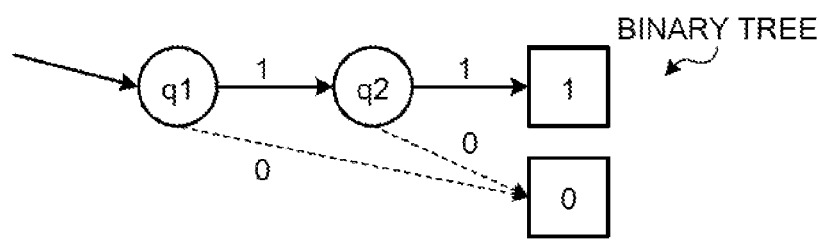
FIG. 10 is a drawing of an example of the data structure of first diagram data according to the first embodiment.

FIG. 10 is a drawing of an example of the data structure of the first diagram data 150*g* according to the first embodiment. As depicted in FIG. 10, this first diagram data 150*g* includes a first level table 151 and a first transition table 152.

The first level table 151 is a table for managing a level of each node and a logical variable corresponding to the node. For example, in the first row of the first level table 151, information is registered indicating that the level of the node "q1" is "0" and the logical variable corresponding to the node "q1" is "q1". Here, in the first level table 151, the node at a level "2" is a node at the final level, and a node "0" or a node "1" represents the evaluation result of the search query 150*b*.

The first transition table 152 is a table for managing a logical value of each node and a transition destination of the node corresponding to the logical value. For example, in the first row of the first transition table 152, information is registered indicating that a transition is made to the node "0" when the logical value of the node "q1" is "0". Note that the first level table 151 and the first transition table 152 depicted in FIG. 10 define a binary tree depicted in a lower part of FIG. 10.

The second diagram data 150*h* is data obtained by transforming the first diagram data 150*g* by a BDD transforming unit 160*f* (which will be explained further below). This second diagram data 150*h* includes a second level table and a second transition table. With a binary tree defined by the second level table and the second transition table, an evaluation can be performed for every multiple bits. The second level table and the second transition table will be explained further below.

Figures 11, 12:
FIG. 11 is a drawing of an example of the data structure of an evaluation result table according to the first embodiment.
FIG. 12 is a drawing of an example of the data structure of search result data according to the first embodiment.

The evaluation result table 150*i* is a table for managing the evaluation result for each of the data types (for example, Data 0 to Data 2). FIG. 11 is a drawing of an example of the data structure of the evaluation result table 150*i* according to the first embodiment. As depicted in FIG. 11, this evaluation result table 150*i* has stored therein a data type and the evaluation result in association with each other.

For example, in the first row of FIG. 11, information is registered indicating that the evaluation result of the logical expression for the data type "Data 0" is "0 (false)". Also, in the third row of FIG. 11, information is registered indicating that the evaluation result of the logical expression for the data type "Data 2" is "1 (true)".

The search result data 150*j* is data for storing the search result of the search query 150*b* with respect to the XML data 150*a*. FIG. 12 is a drawing of an example of the data structure of the search result data 150*j* according to the first embodiment. This search result data 150*j* stores a reply item of a data type for which the evaluation result of the evaluation result table 150*i* (refer to FIG. 11) is "1". With reference to FIG. 11, in this case, the evaluation result of the data type "Data 2" is "1". Therefore, a reply item of the data type "Data 2" is stored in the search result data 150*j*.

Referring back to explanation of FIG. 4, the control unit 160 has an internal memory for storing therein programs and control data that define various process procedures, and executes various processes with these programs and control data. In particular, in close association with the present invention, as depicted in FIG. 4, the control unit 160 includes the search-query splitting unit 160*a*, an extraction-result-table generating unit 160*b*, a logical-value calculating unit 160*c*, the logical-expression transforming unit 160*d*, the BDD constructing unit 160*e*, the BDD transforming unit 160*f*, a diagram executing unit 160*g*, and a search-result output unit 160*h*.

Among these units, the search-query splitting unit 160*a* is a unit that stores a search query received from the terminal device 60 in the storage unit 150 as the search query 150*b*, and uses a known technique to generate the split-search query 150*c* (refer to FIG. 7) from the search query 150*b* (refer to FIG. 6).

The extraction-result-table generating unit 160*b* is a unit that extracts first to n-th (n>1) logical variables and reply items from the XML data 150*a* based on an evaluation expression contained in the split-search query 150*c* to generate the extraction result table 150*d*.

For example, for an evaluation expression "department/name="development department"", the extraction-result-table generating unit 160*b* decides whether the "name" element with a "department" element as a parent contains "development department". When it contains "development department", a circle is registered in the extraction result table 150*d*. When it does not contain "development department", a cross is registered in the extraction result table 150*d*.

Also, for an evaluation expression "/department/ID="1.*3"", the extraction-result-table generating unit 160*b* extracts from the XML data 150*a* a sequence contained in an "ID" element with a "department" element as a parent, and then registers the extracted sequence in the extraction result table 150*d*.

The logical-value calculating unit 160*c* is a unit that compares the evaluation expression of the split-search query 150*c* with the extraction result table 150*d* to calculate a logical value of the evaluation expression. The logical-value calculating unit 160*c* registers the calculation result in the logical value table 150*e* (refer to FIG. 9). It is assumed herein that, when a logical value of the evaluation expression q1 is to be found, the logical value is "1" when the first logical variable information is represented by a circle, and the logical value is "0" when the first logical variable information is represented by a cross.

The logical-expression transforming unit 160*d* is a unit that transforms the logical expression (for example, Q=q1 and q2) of the search query by using the reverse Polish notation. When the logical-expression transforming unit 160*d* uses the reverse Polish notation to transform the logical expression "q1&q2", "q1q2&" is obtained. The logical-expression transforming unit 160*d* then stores the transformed logical expression data in the storage unit 150 as the transform-logical-expression data 150*f*.

The BDD constructing unit 160*e* is a unit that generates the first diagram data 150*g* based on the transform-logical-expression data 150*f*. The BDD constructing unit 160*e* sequentially reads characters of the transform-logical-expression data 150*f* (logical expression in reverse Polish notation) from the head, and registers various information in the first level table 151 and the first transition table 152 according to the read characters (such as logical operators and logical variables).

In the following, a process of the BDD constructing unit 160*e* when reading a logical variable, a process thereof when reading NOT (~), a process thereof when reading AND (&), a process thereof when reading OR (|), and then a process thereof at the time of termination (a process after reading the last character) are explained in this order. It is assumed herein that the BDD constructing unit 160*e* retains a Top stack, a True stack, and a False stack.

(Process when Reading a Logical Variable)

When reading a logical variable, the BDD constructing unit 160*e* defines a new node variable, and adds to the first level table 151 an entry formed of the defined node variable, the current level, and the read logical variable.

Also, the BDD constructing unit 160*e* pushes the defined node variable onto the Top stack (registers the node variable in a temporary storage unit <stack>; the same applies the following), pushes a set formed of one defined node variable onto the True stack and the False stack, and also adds 1 to the current level.

(Process when Reading NOT "~")

When reading NOT, the BDD constructing unit 160*e* newly defines unique node variables T and F, pops data from the True stack (extracts information registered last in the temporary storage unit <stack>; the same applies the following) and, for each node variable in the popped set, adds to the first transition table 152 an entry formed of the node variable, a logical value 1, and a transition-destination node variable F.

Also, the BDD constructing unit 160*e* pops data from the False stack and, for each node variable in the popped set, adds to the first transition table 152 an entry formed of the node variable, a logical value 0, and a transition-destination node variable T. The BDD constructing unit 160*e* pushes a set formed of the node variable T onto the True stack, and pushes a set formed of the node variable F onto the False stack.

(Process when Reading and "&")

When reading AND, the BDD constructing unit 160*e* pops data from the Top stack, and takes the popped node variable as A. The BDD constructing unit 160*e* then pops data from the True stack twice, and pushes a set popped for the first time onto the True stack.

With each node variable in a set popped for the second time as a node item, the BDD constructing unit 160*e* adds to the first transition table 152 an entry obtained by combining a logical value 1 and the transition-destination node variable A. Also, the BDD constructing unit 160*e* pops data from the False stack twice, and pushes a set of all node variables in sets popped for the first and second times onto the False stack.

(Process when Reading or "|")

When reading OR, the BDD constructing unit 160e pops data from the Top stack, and takes the popped node variable as A. The BDD constructing unit 160e then pops data from the False stack twice, and pushes a set popped for the first time onto the False stack.

With each node variable in a set popped for the second time as a node item, the BDD constructing unit 160e adds to the first transition table 152 an entry obtained by combining a logical value 0 and the transition-destination node variable A. Also, the BDD constructing unit 160e pops data from the True stack twice, and pushes a set of all node variables in sets popped for the first time and the second time onto the True stack.

(Process at the Time of Termination)

The BDD constructing unit 160e defines new node variables 0 and 1, and adds to the first level table 151 an entry formed of the defined node variables, the current level, and a logical variable NULL. Also, the BDD constructing unit 160e pops data from the True stack and, for each node variable in the popped set, adds to the first transition table 152 an entry obtained by combining a logical value 1 and a transition-destination node variable 1.

The BDD constructing unit 160e pops data from the False stack and, for each node variable in the popped set, adds to the first transition table 152 an entry obtained by combining a logical value 0 and a transition-destination node variable 0. Then, in the first transition table 152, for all entries with the node variable T or F as a transition-destination item, the BDD constructing unit 160e deletes entries with their node variable T or F as a node item, and overwrites the transition-destination item of each deleted entry with the transition-destination node variable of the deleted entry.

Figure 13:
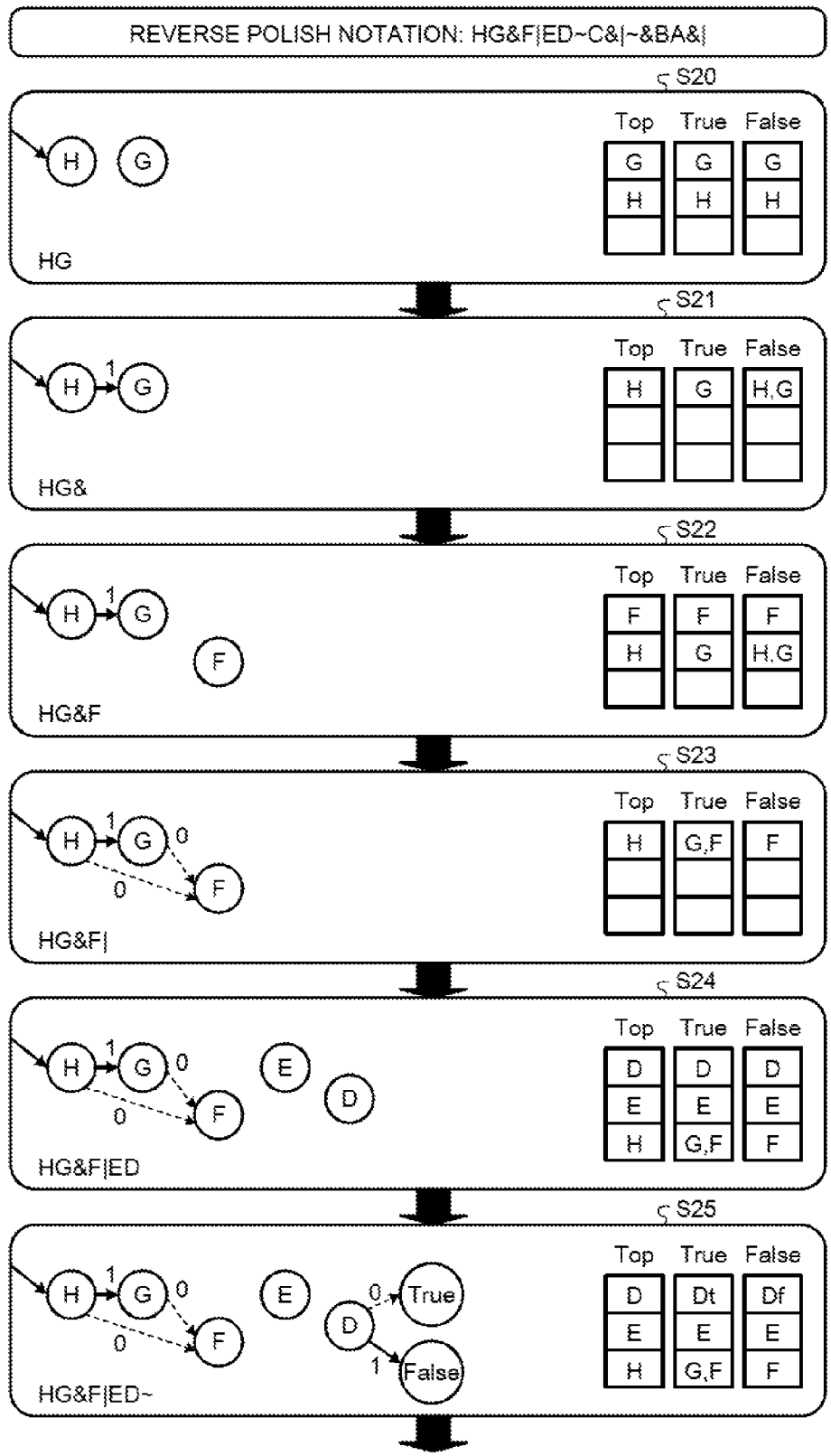
FIG. 13 is a first drawing that depicts state changes of a TOP stack, a True stack, and a False stack.
Figure 14:
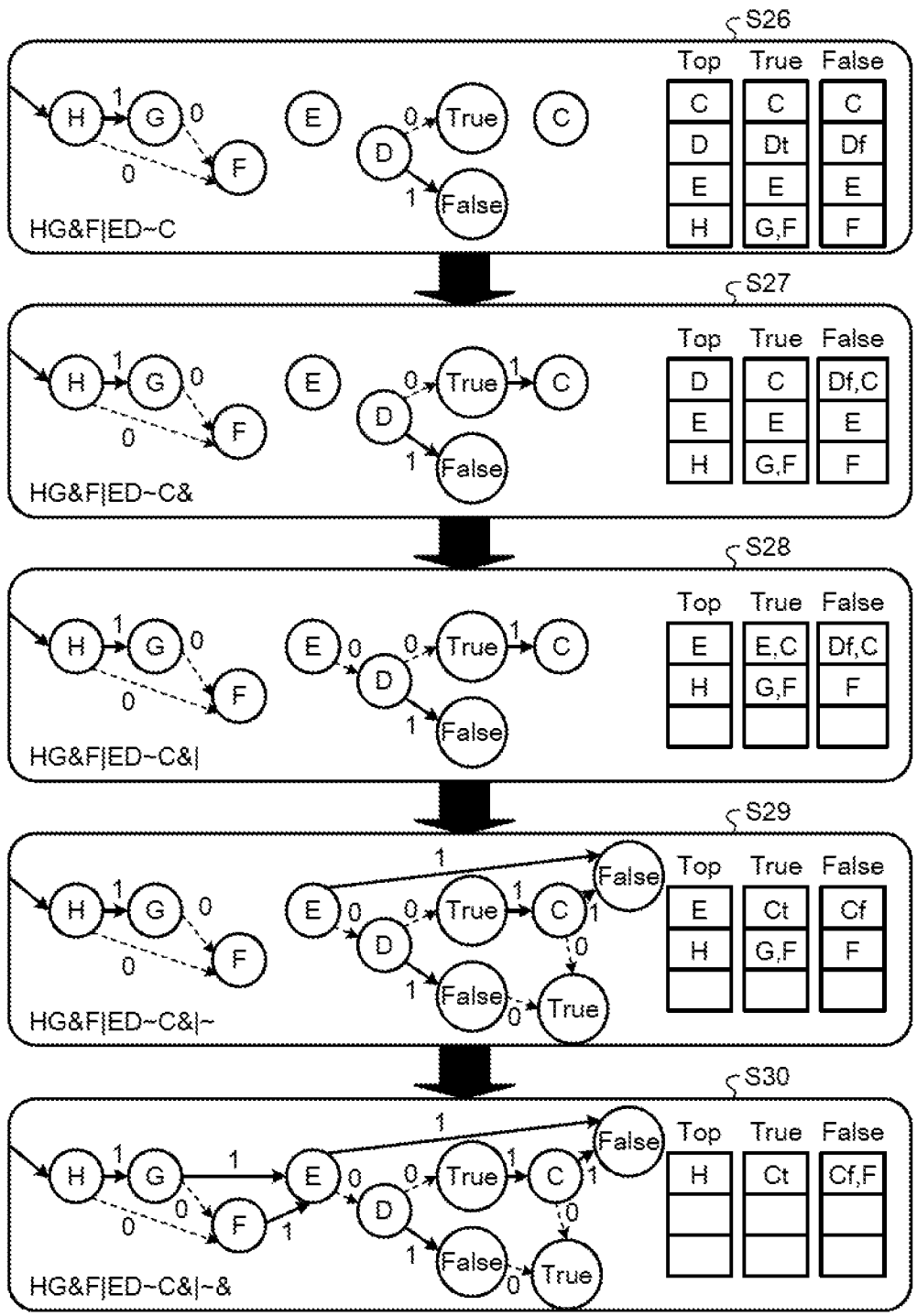
FIG. 14 is a second drawing that depicts state changes of the TOP stack, the True stack, and the False stack.
Figure 15:
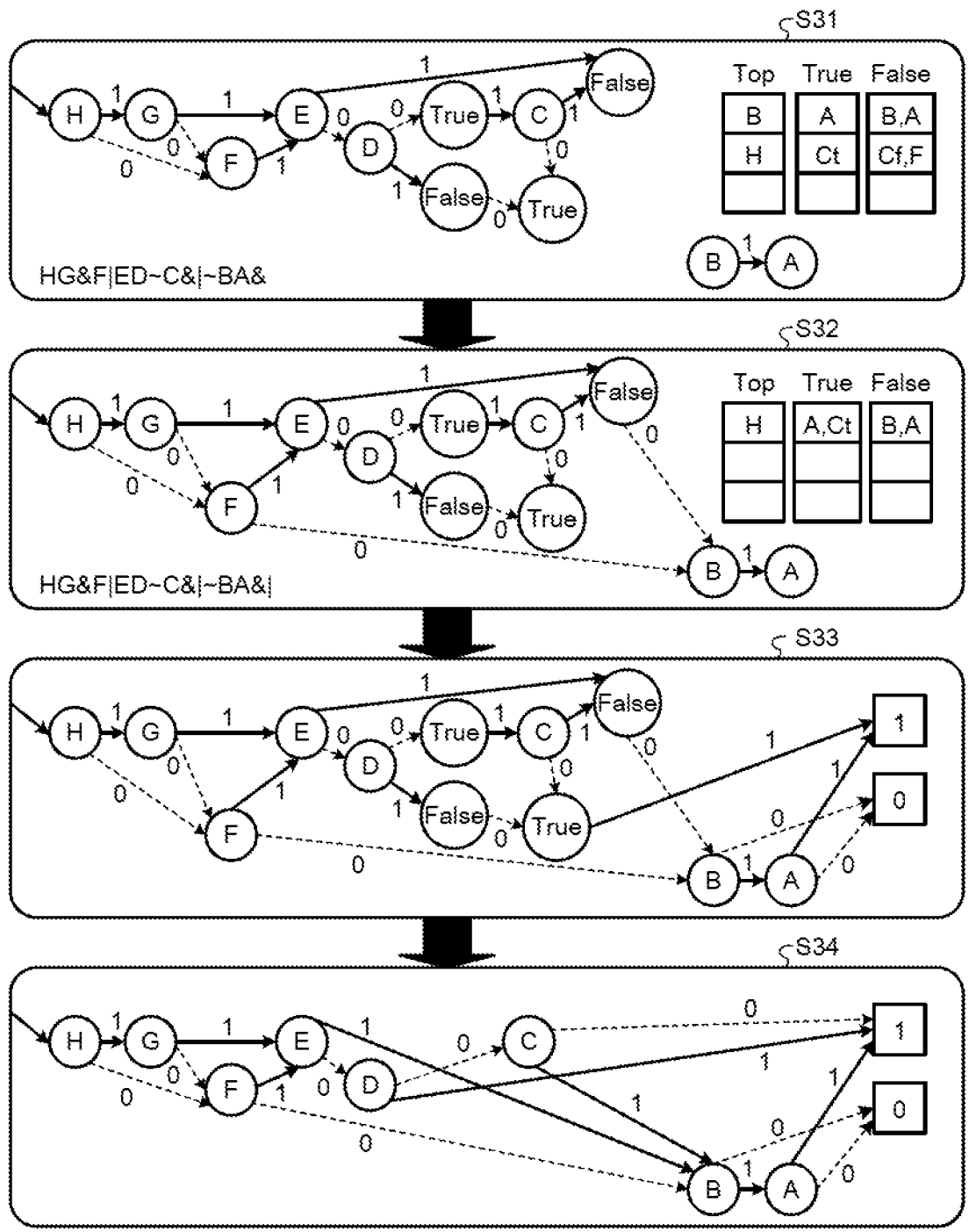
FIG. 15 is a third drawing that depicts state changes of the TOP stack, the True stack, and the False stack.

Next, a process of the BDD constructing unit 160e is specifically explained. Here, by way of example, it is assumed that the transform-logical-expression data 150f represents "HG&F|ED~C&|~&BA&|". FIGS. 13 to 15 are drawings that depict state changes of the TOP stack, the True stack, and the False stack. FIGS. 16 to 24 are drawings that depict state changes of the first level table 151 and the first transition table 152.

("H"G&F|ED~C&|~&BA&|)

First, the BDD constructing unit 160e reads "H", adds (H<node>, 0<level>, H<logical variable>) to the first level table 151, and pushes "H" onto the Top stack, the True stack, and the False stack. Also, the BDD constructing unit 160e adds 1 to the current level "0".

(H"G"&F|ED~C&|~&BA&|)

The BDD constructing unit 160e reads "G", Adds (G, 1, G) to the first level table 151, and pushes "G" onto the Top stack, the True stack, and the False stack. Also, the BDD constructing unit 160e adds 1 to the current level "1" (refer to Step S20 in FIG. 13 and a left part of FIG. 16).

(HG"&"F|ED~C&|~&BA&|)

The BDD constructing unit 160e reads "&", and pops "G" from the Top stack. The BDD constructing unit 160e then pops data from the True stack twice, and pushes a set "G" popped for the first time onto the True stack.

Figure 16:
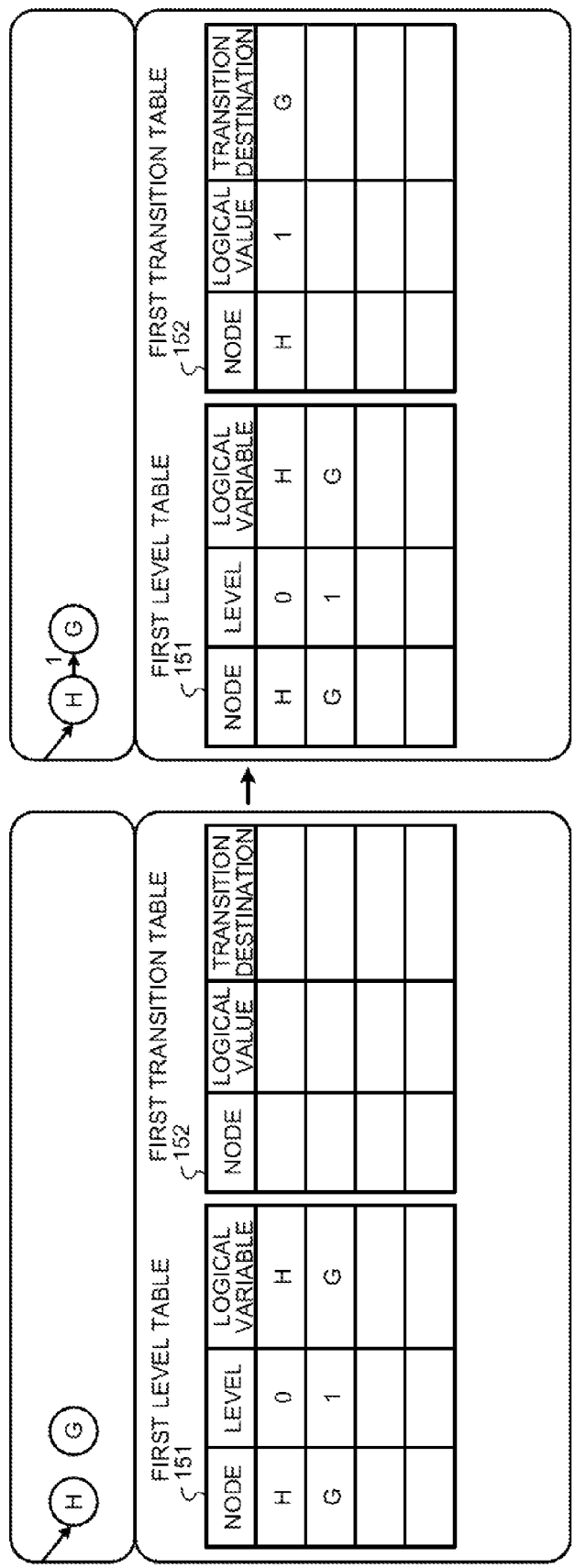
FIG. 16 is a first drawing that depicts state changes of a first level table and a first transition table.

Also, since the node variable of a set "H" popped for the second time is "H", the BDD constructing unit 160e adds (H<node>, 1<logical value>, G<transition destination>) to the first transition table 152 (refer to a right part of FIG. 16). The BDD constructing unit 160e pops data from the False stack twice, and pushes a set "H, G" formed of all node variables in the sets popped for the first time and the second time onto the False stack (Step S21 in FIG. 13).

(HG&"F"|ED~C&|~&BA&|)

Figure 17:
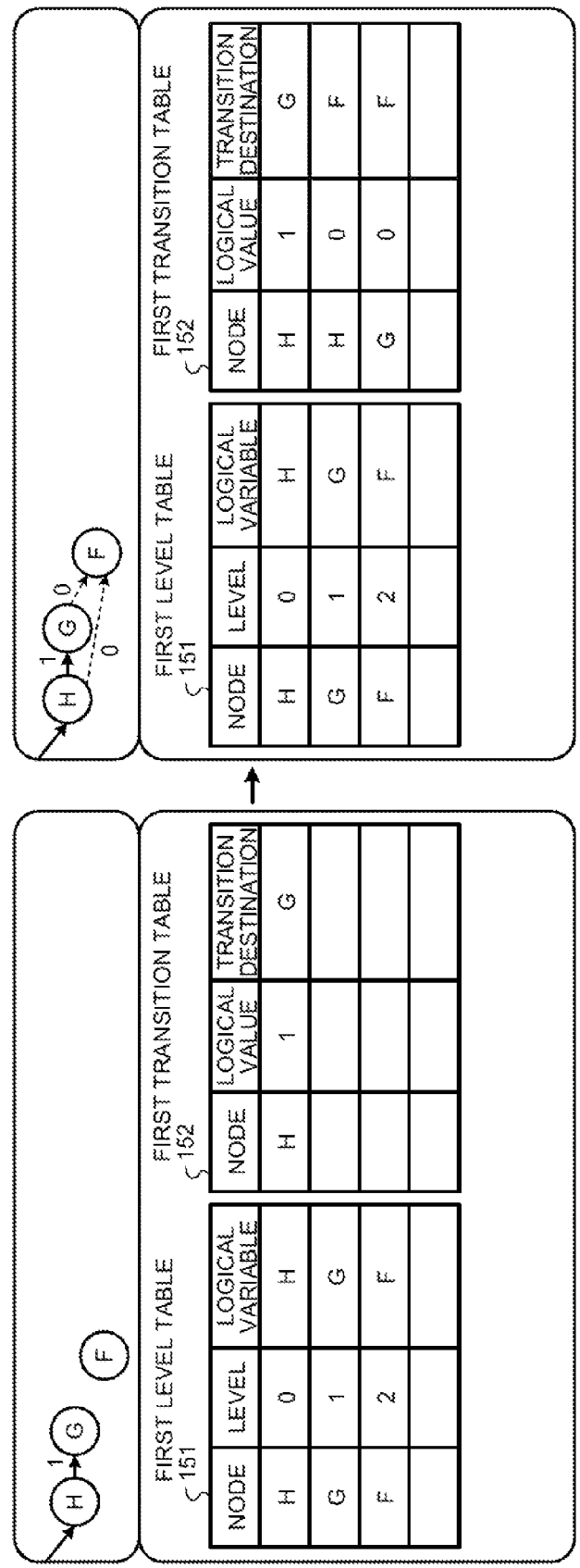
FIG. 17 is a second drawing that depicts state changes of the first level table and the first transition table.

The BDD constructing unit 160e reads "F", adds (F, 2, F) to the first level table 151, and pushes "F" onto the Top stack, the True stack, and the False stack (refer to Step S22 in FIG. 13 and a left part of FIG. 17). Also, the BDD constructing unit 160e adds 1 to the current level "2".

(HG&F"|"ED~C&|~&BA&|)

The BDD constructing unit 160e reads "|", and pops "F" from the Top stack. The BDD constructing unit 160e then pops data from False stack twice, and pushes a set "F" popped for the first time onto the False stack.

With each node variable in a set "H, G" popped for the second time as a node item, the BDD constructing unit 160e adds to the first transition table 152 an entry obtained by combining a logical value 0 and a transition-destination node variable "F" (refer to a right part of FIG. 17).

The BDD constructing unit 160e pops data from the True stack twice, and pushes a set "G, F" formed of all node variables in the sets popped for the first time and the second time onto the True stack (Step S23 in FIG. 13).

(HG&F|"E"D~C&|~&BA&|)

The BDD constructing unit 160e reads "E", adds (E, 3, E) to the first level table 151, and pushes "E" onto the Top stack, the True stack, and the False stack. Also, the BDD constructing unit 160e adds 1 to the current level "3".

(HG&F|E"D"~C&|~&BA&|)

The BDD constructing unit 160e reads "D", Adds (D, 4, D) to the first level table 151, and pushes "D" onto the Top stack, the True stack, and the False stack. Also, the BDD constructing unit 160e adds 1 to the current level "4" (refer to Step S24 in FIG. 13 and a left part of FIG. 18).

(HG&F|ED"~"C&|~&BA&|)

The BDD constructing unit 160e reads "~" defines unique nodes "Dt" and "Df", pops data from the True stack and, for a node variable "D" in the popped set, adds to the first transition table 152 an entry formed of the node variable "D", a logical value "1", and a transition-destination node variable "Df".

Figure 18:
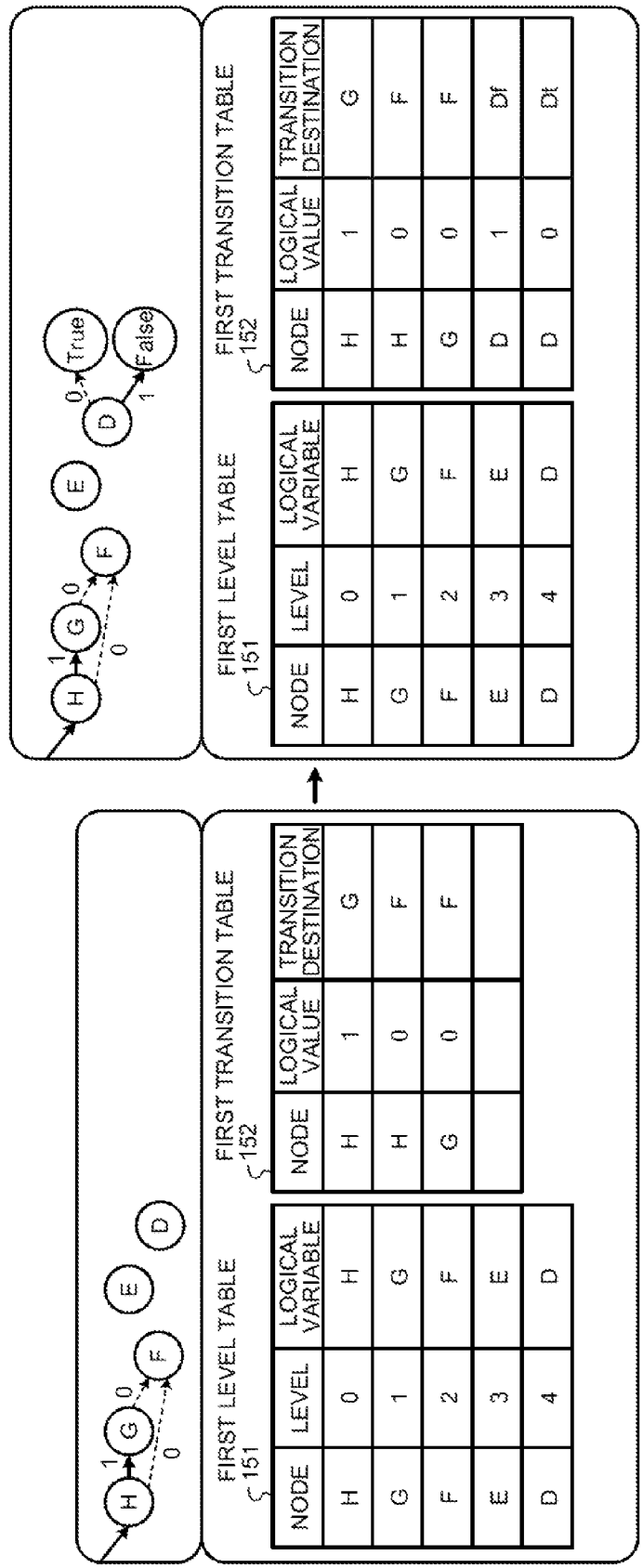
FIG. 18 is a third drawing that depicts state changes of the first level table and the first transition table.

The BDD constructing unit 160e pops data from the False stack and, for a node variable "D" in the popped set, adds to the first transition table 152 an entry formed of the node variable "D", a logical value "0", and a transition-destination node variable "Dt" (refer to a right part of FIG. 18). Also, the BDD constructing unit 160e pushes "Dt" onto the True stack and "Df" onto the False stack (Step S25 in FIG. 13).

(HG&F|ED~"C"&|~&BA&|)

The BDD constructing unit 160e reads "C", adds (C, 5, C) to the first level table 151, and pushes "C" onto the Top stack, the True stack, and the False stack. Also, the BDD constructing unit 160e adds 1 to the current level "5" (refer to Step S26 in FIG. 14 and a left part of FIG. 19).

(HG&F|ED~C"&"|~&BA&|)

The BDD constructing unit 160e reads "&", and pops "C" from the Top stack. The BDD constructing unit 160e then pops data from the True stack twice, and pushes a set of "C" popped for the first time onto the True stack.

Figure 19:
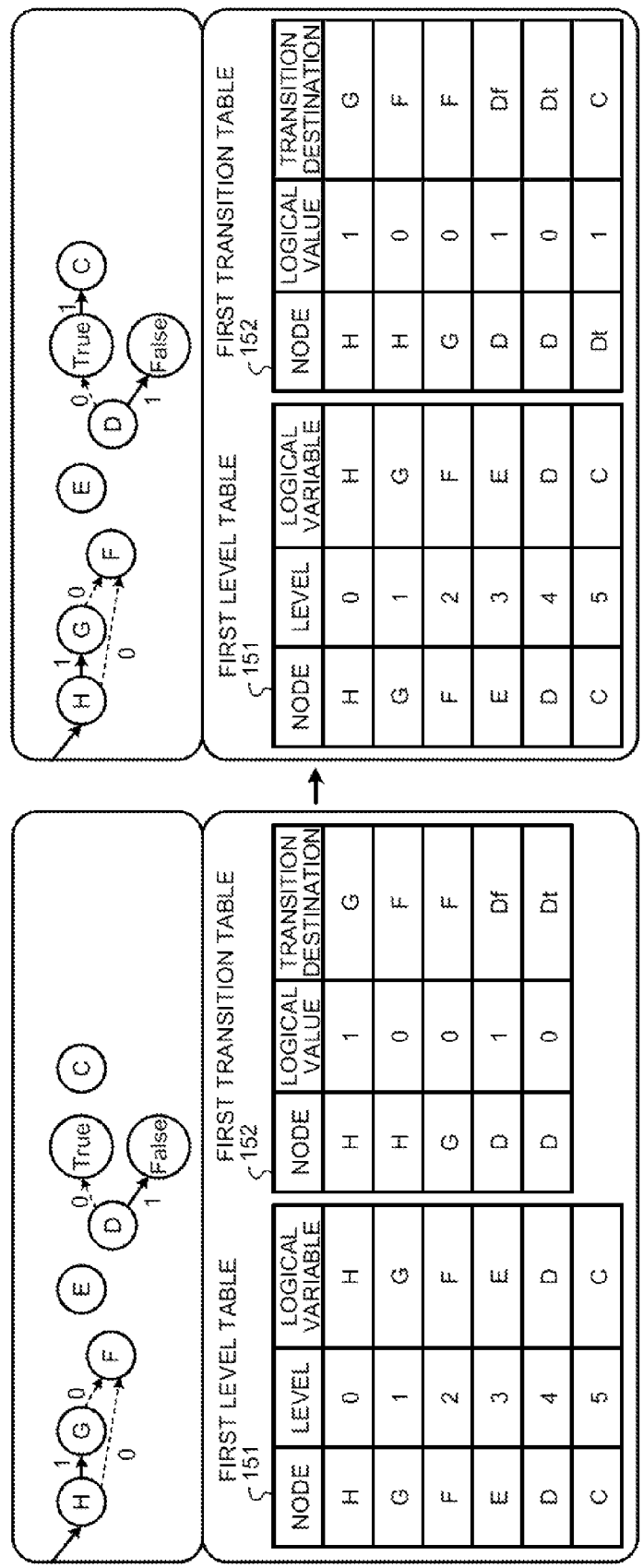
FIG. 19 is a fourth drawing that depicts state changes of the first level table and the first transition table.

Also, since the node variable of a set "Dt" popped for the second time is "Dt", the BDD constructing unit 160e adds (Dt, 1, C) to the first transition table 152 (refer to a right part of FIG. 19). The BDD constructing unit 160e pops data from the False stack twice, and pushes a set "Df, C" formed of all node variables in the sets popped for the first time and the second time onto the False stack (Step S27 in FIG. 14).

(HG&F|ED~C&"|"~&BA&|)

The BDD constructing unit 160e reads "1", and pops "D" from the Top stack. The BDD constructing unit 160e then pops data from the False stack twice, and pushes a set "Df, C" popped for the first time onto the False stack.

Figure 20:
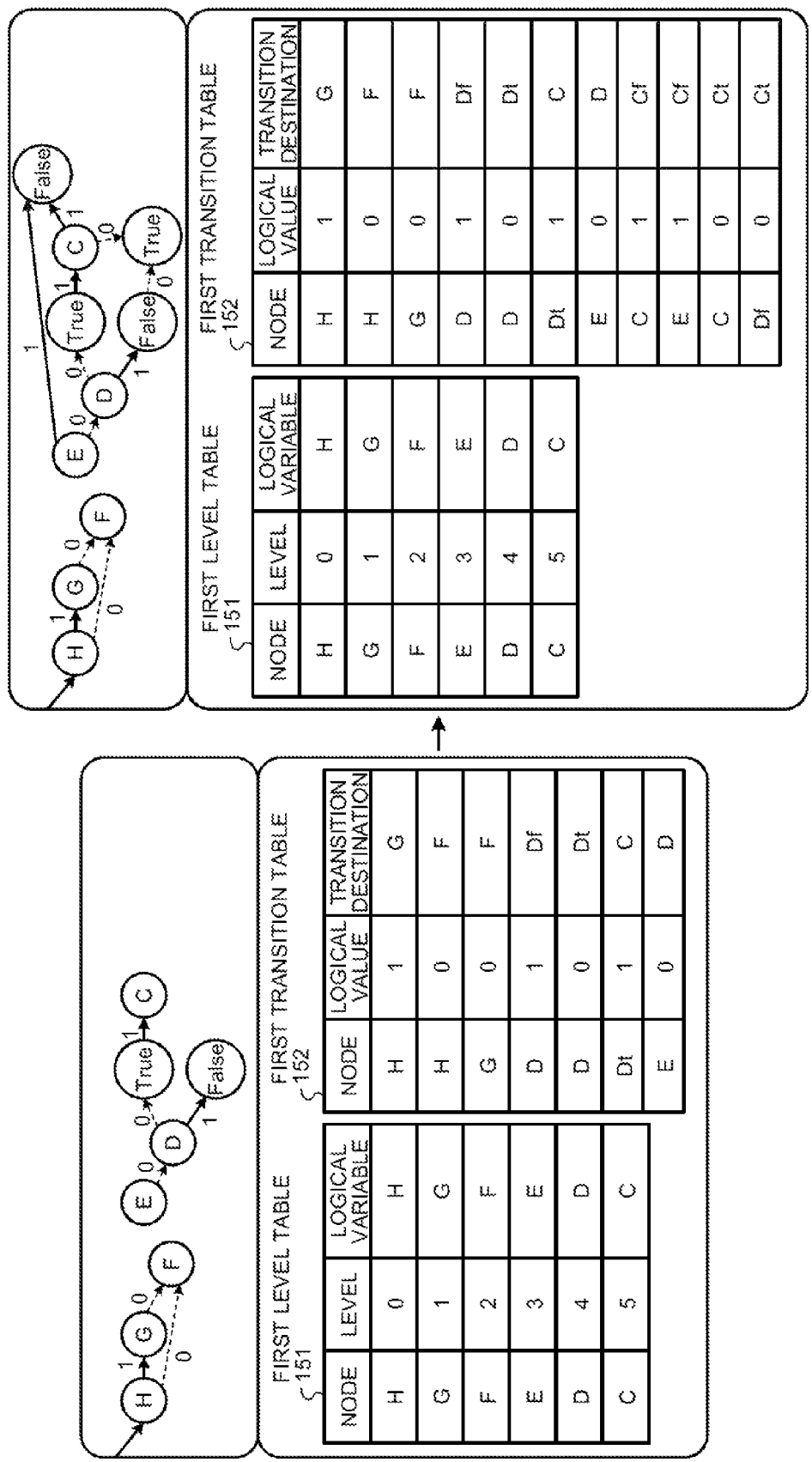
FIG. 20 is a fifth drawing that depicts state changes of the first level table and the first transition table.

With a node variable in a set "E" popped for the second time as a node item, the BDD constructing unit 160e adds to the first transition table 152 an entry obtained by combining a logical value 0 and a transition-destination node variable "D" (refer to a left part of FIG. 20).

The BDD constructing unit 160e pops data from the True stack twice, and pushes a set "E, C" formed of all node variables in the sets popped for the first time and the second time onto the True stack (Step S28 in FIG. 14).

(HG&F|ED~C&|"~"~&BA&|)

The BDD constructing unit 160e reads "~" defines unique nodes "Ct" and "Cf", pops data from the True stack and, for node variables "E, C" in the popped set, adds to the first transition table 152 an entry formed of a node variable "C", a logical value "1", and a transition-destination node variable "Cf".

The BDD constructing unit 160e pops data from the False stack and, for node variables "Df, C" in the popped set, adds to the first transition table 152 an entry formed of the node variable "C", a logical value "0", and a transition-destination node variable "Ct", and also adds to the first transition table 152 an entry formed of the node variable "Df", a logical value "0", and a transition-destination node variable "Ct" (refer to a right part of FIG. 20). Also, the BDD constructing unit 160e pushes "Ct" onto the True stack and "Cf" onto the False stack (Step S29 in FIG. 14).

(HG&F|ED~C&|~"&"BA&|)

The BDD constructing unit 160e reads "&", and pops "E" from the Top stack. The BDD constructing unit 160e then pops data from the True stack twice, and pushes a set "Ct" popped for the first time onto the True stack.

Figure 21:
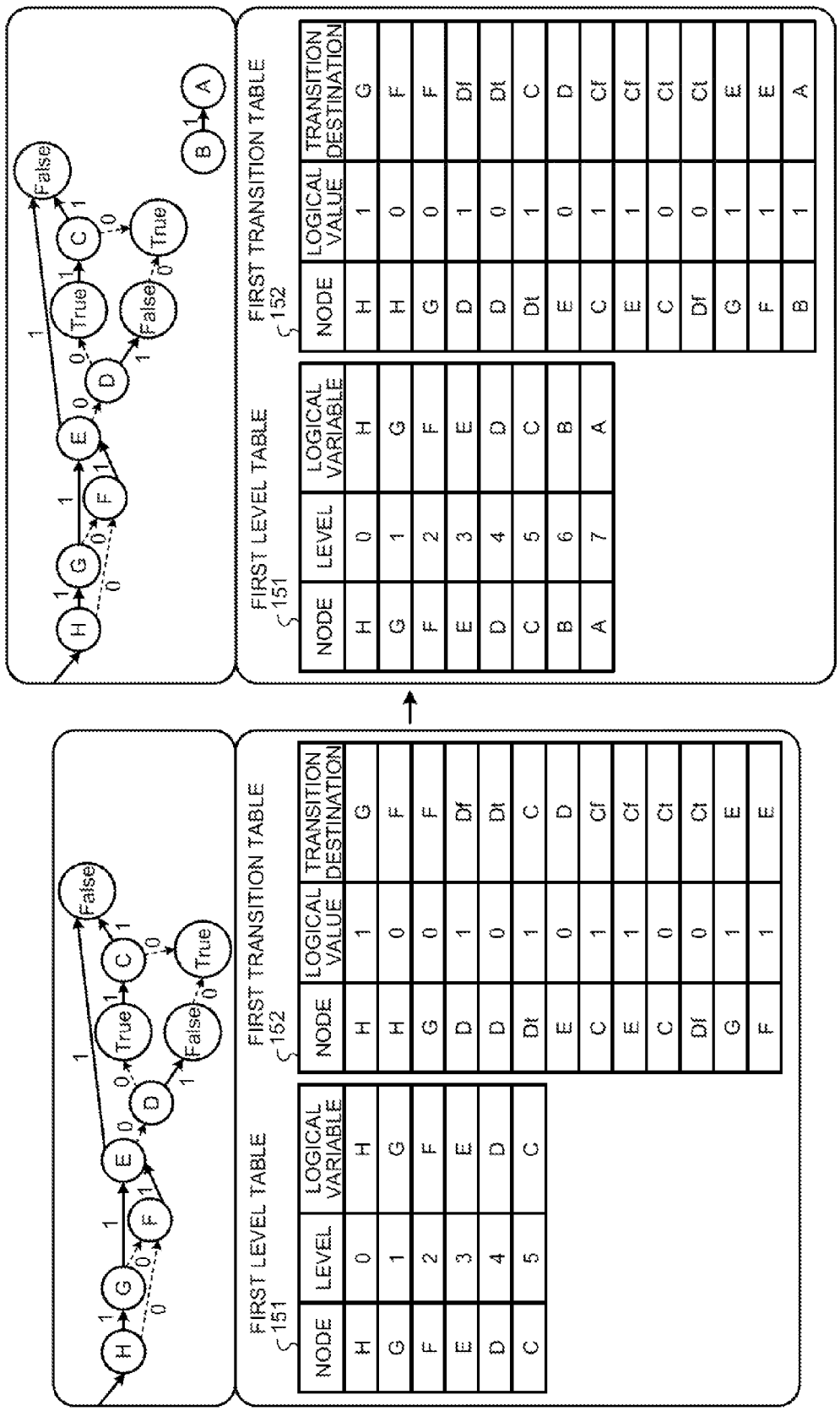
FIG. 21 is a sixth drawing that depicts state changes of the first level table and the first transition table.

Also, since the node variables of a set "G, F" popped for the second time are "G, F", the BDD constructing unit 160e adds (G, 1, E) and (F, 1, E) to the first transition table 152 (refer to a left part of FIG. 21). The BDD constructing unit 160e pops data from the False stack twice, and pushes a set "Cf, F" formed of all node variables in the sets popped for the first time and the second time onto the False stack (Step S30 in FIG. 14).

(HG&F|ED~C&|~&"B"A&|)

The BDD constructing unit 160e reads "B", registers (B, 6, B) in the first level table 151, and pushes "B" onto the Top stack, the True stack, and the False stack. Also, the BDD constructing unit 160e adds 1 to the current level "6".

(HG&F|ED~C&|~&B"A"&|)

The BDD constructing unit 160e reads "A", registers (A, 7, A) in the first level table 151, and pushes "A" onto the Top stack, the True stack, and the False stack. Also, the BDD constructing unit 160e adds 1 to the current level "7".

(HG&F|ED~C&|~&BA"&"|)

The BDD constructing unit 160e reads "&", and pops "A" from the Top stack. The BDD constructing unit 160e then pops data from the True stack twice, and pushes a set "A" popped for the first time onto the True stack.

Also, since the node variable of a set "B" popped for the second time is "B", the BDD constructing unit 160e adds (B, 1, A) to the first transition table 152 (refer to a right part of FIG. 21). The BDD constructing unit 160e pops data from the False stack twice, and pushes a set "B, A" formed of all node variables in the sets popped for the first time and the second time onto the False stack (Step S31 in FIG. 15).

(HG&F|ED~C&|~&BA&"|")

The BDD constructing unit 160e reads "|", and pops "B" from the Top stack. The BDD constructing unit 160e then pops data from False stack twice, and pushes a set "B, A" popped for the first time onto the False stack.

Figure 22:
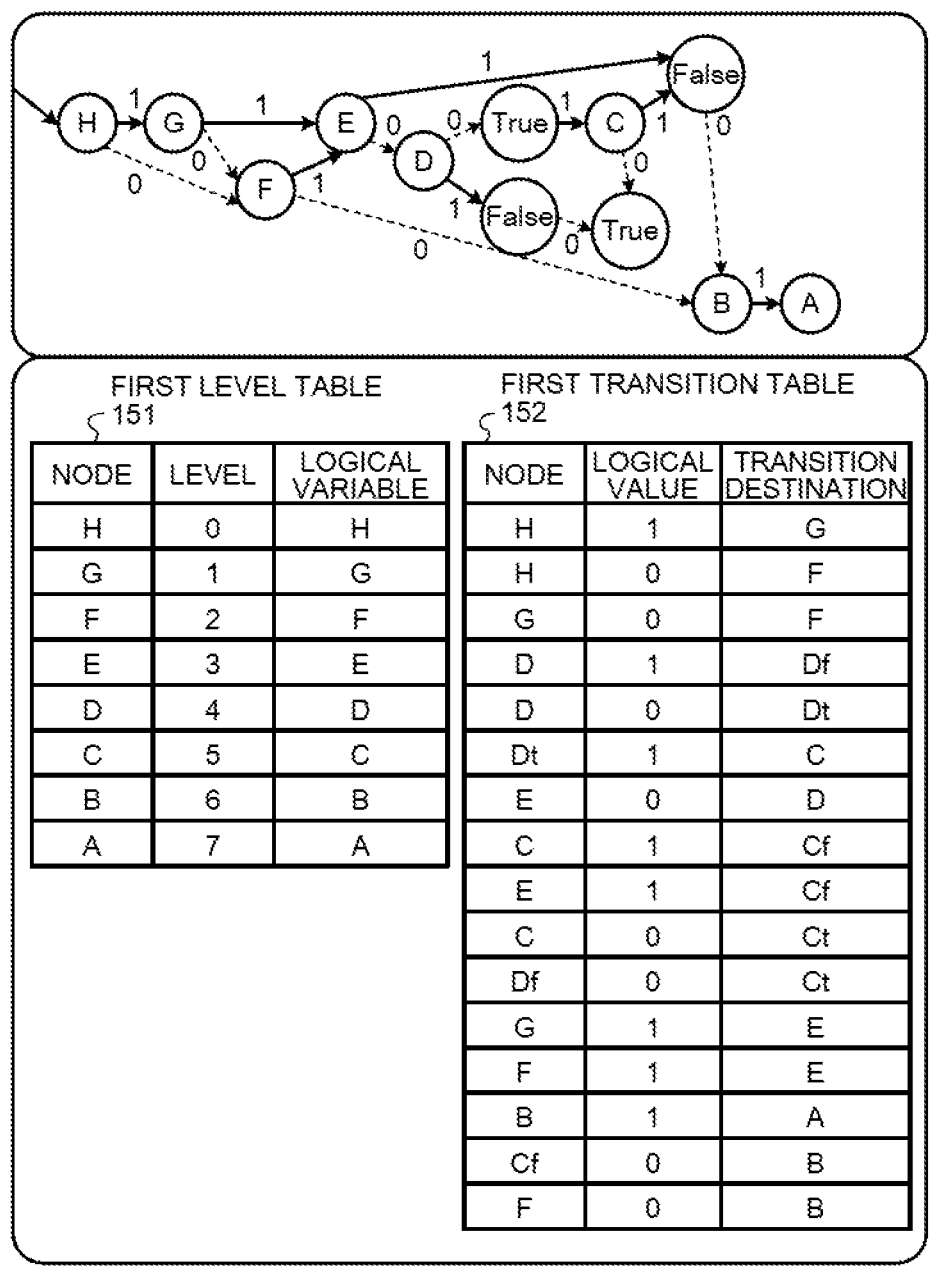
FIG. 22 is a seventh drawing that depicts state changes of the first level table and the first transition table.

With each node variable in a set "Cf, F" popped for the second time as a node item, the BDD constructing unit 160e adds to the first transition table 152 a node variable "Cf", a logical value 0 and a transition-destination node variable "B", and a node variable "F", a logical value 0, and a transition-destination node variable "B" (refer to FIG. 22).

The BDD constructing unit 160e pops data from the True stack twice, and pushes a set "A, Ct" formed of all node variables in the sets popped for the first time and the second time onto the True stack (Step S32 in FIG. 15).

(Process at the Time of Termination)

The BDD constructing unit 160e defines new node variables "0" and "1", and adds to the first level table 151 an entry formed of the defined node variables, the current level, and a logical variable NULL. Also, the BDD constructing unit 160e pops data from the True stack and, for each node variable in the popped set "A, Ct", adds to the first transition table 152 entries (Ct, 1, 1) and (A, 1, 1) obtained by combining a logical value 1 and a transition-destination node variable 1.

Figure 23:
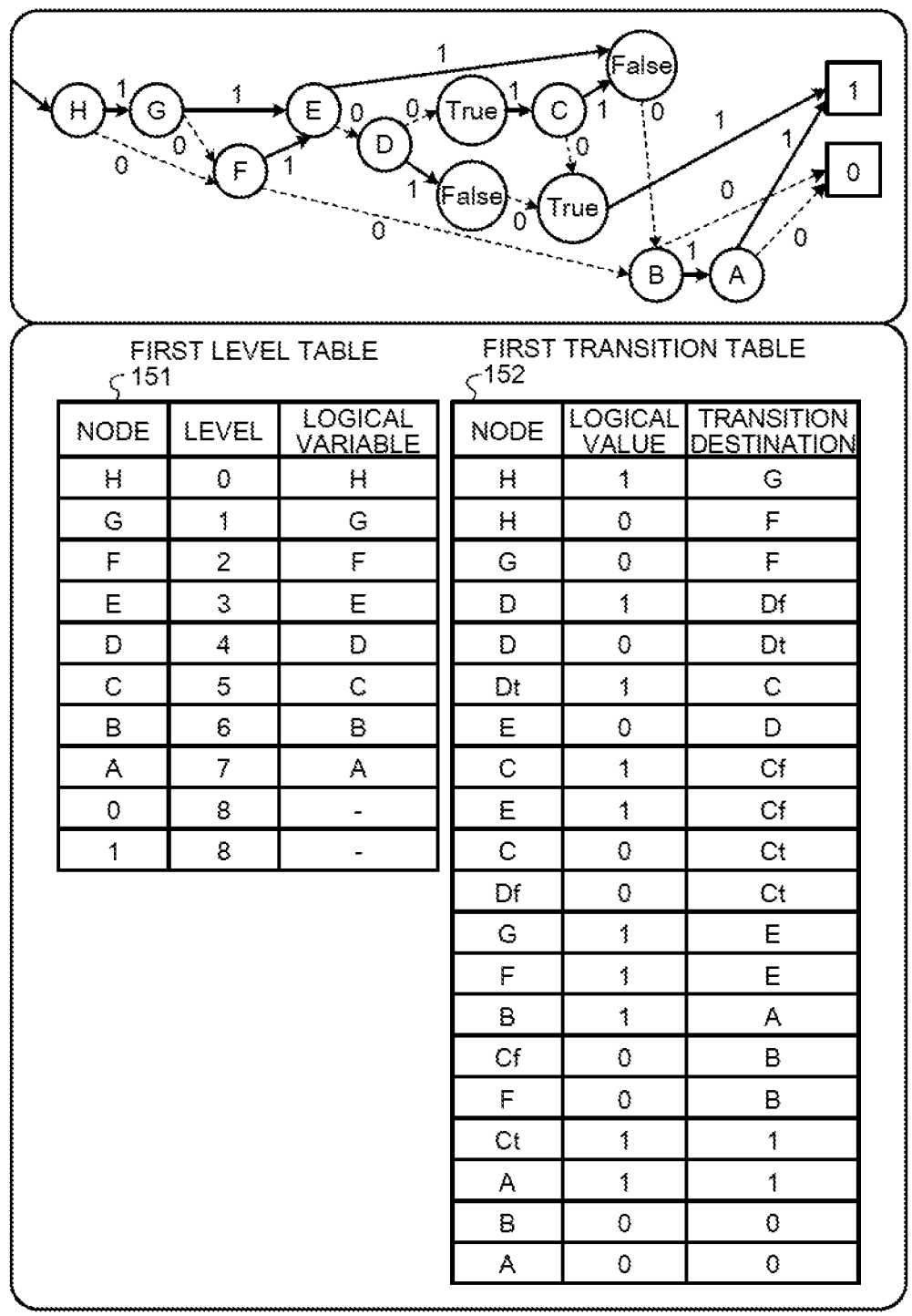
FIG. 23 is an eighth drawing that depicts state changes of the first level table and the first transition table.

The BDD constructing unit 160e pops data from the False stack and, for each node variable in the popped set "B, A", adds to the first transition table 152 entries (B, 0, 0) and (A, 0, 0) obtained by combining a logical value 0 and a transition-destination node variable 0 (refer to Step S33 in FIG. 15 and FIG. 23).

Figure 24:
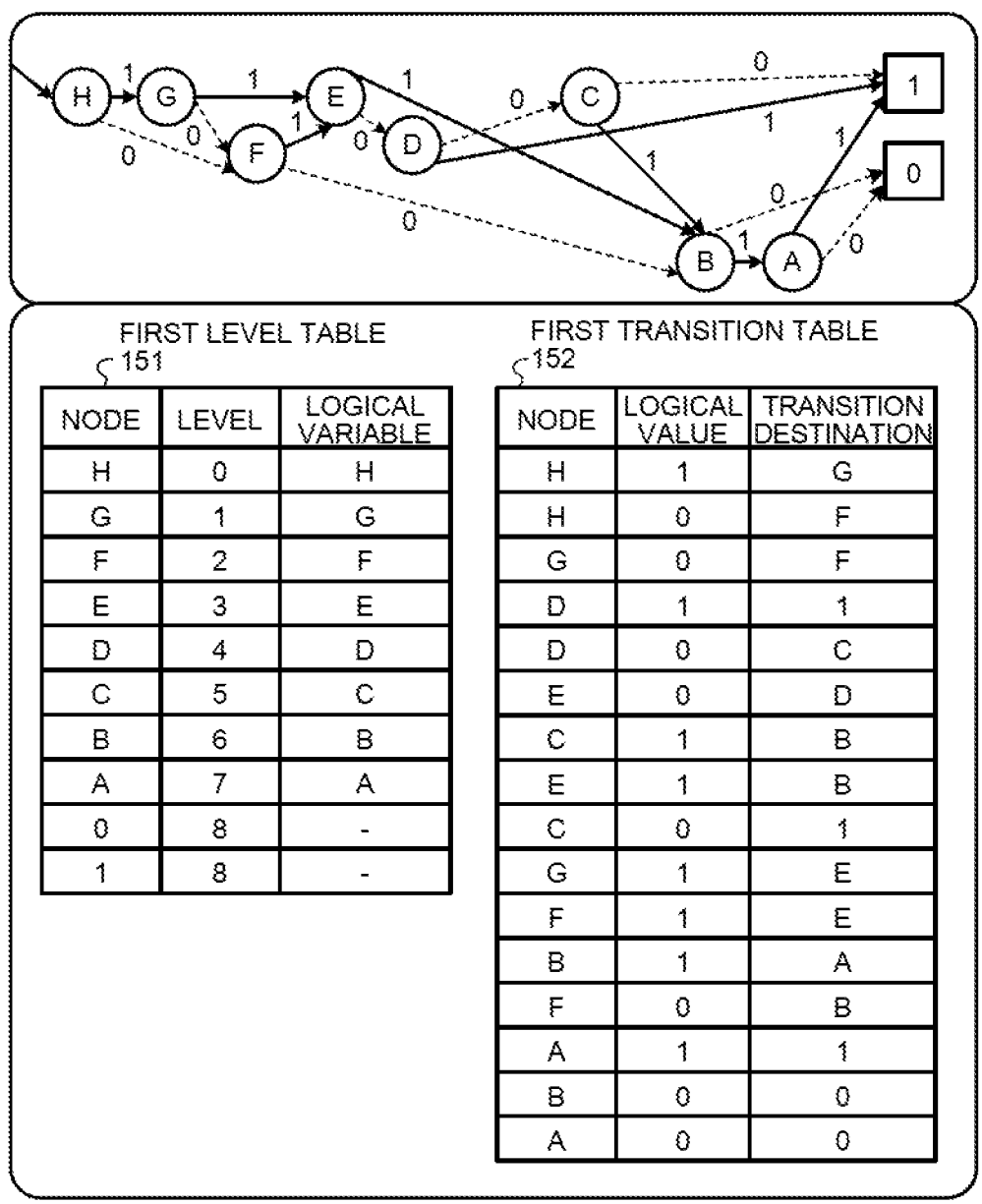
FIG. 24 is a ninth drawing that depicts state changes of the first level table and the first transition table.

In the first transition table 152 (refer to FIG. 23), for all entries of node variables (for example, Dt, Df, Ct, Cf) with the node variable T or F as a transition destination, the BDD constructing unit 160e deletes entries with their node variable as a node item, and overwrites the transition-destination node variable of each deleted entry with the transition-destination item of the entry (refer to Step S34 in FIG. 15 and FIG. 24).

For example, the BDD constructing unit 160e transforms:
(E, 1, Cf), (Cf, 0, B) to (E, 1, B);
(D, 0, Dt), (Dt, 1, C) to (D, 0, C);
(D, 1, Df), (Df, 0, Ct) to (D, 1, Ct);
(D, 1, Ct), (Ct, 1, 1) to (D, 1, 1); and
(C, 0, Ct), (Ct, 1, 1) to (D, 1, 1).

The BDD transforming unit 160f is a unit that transforms the first diagram data 150g to generate the second diagram data 150h so as to transform the first binary tree to a second binary tree (as for the first and second binary trees, refer to FIG. 2). The BDD transforming unit 160f makes a bit-string notation of true/false condition of a variable of each level from a node as a starting point to an arrival node at a level by predetermined plural levels further, thereby creating the second diagram data 150h.

Figure 25:
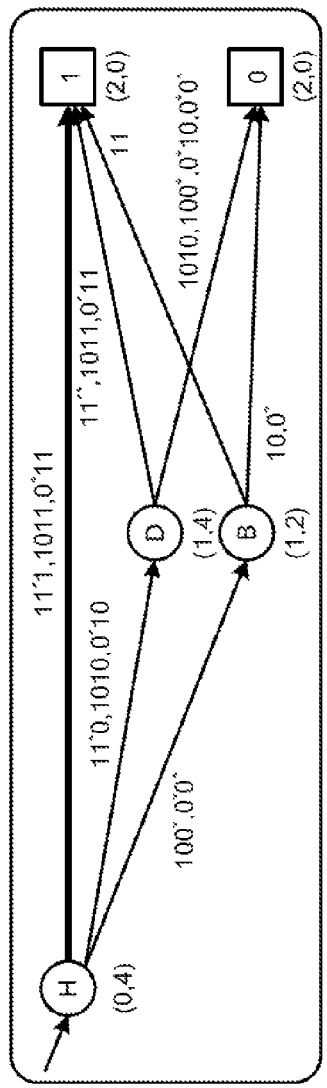
FIG. 25 is a drawing of an example of the data structure of second diagram data according to the first embodiment.
Figure 26:
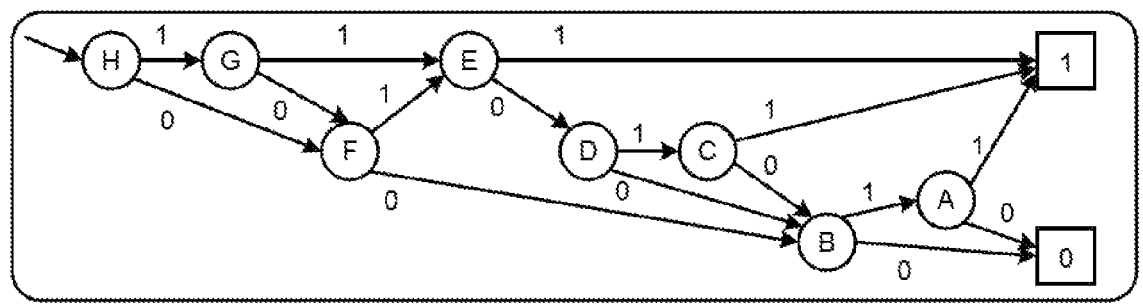
FIG. 26 is a drawing of first diagram data for explaining a process of a BDD transforming unit.

FIG. 25 is a drawing of an example of the data structure of the second diagram data 150h according to the first embodiment. Note that the second diagram data 150h depicted in FIG. 25 is obtained by transforming the first diagram data 150g depicted in FIG. 26. FIG. 26 is a drawing of the first diagram data 150g for explaining a process of the BDD transforming unit 160f.

As depicted in FIG. 25, this second diagram data 150h includes a second level table 153 and a second transition table 154. The second level table 153 is a table for managing nodes, the level of each node, and the number of input bits to be input to each node. For example, in the first row of the second level table 153, information is registered indicating that the level of a node "H" is "0" and the number of bits to be input to the node "H" (the number of logical values for comparison at the node H) is "4".

The second transition table 154 is a table for managing nodes, a logical value to be input to each node, and a transition destination of the node corresponding to the logical value. For example, in the first row of the second transition table 154, information is registered indicating that a transition is made to a node "1" when the bit string input at the node "H" is "11*1 (1101 or 1111)". Note that the binary tree (second binary tree) depicted in an upper part of FIG. 25 is defined by the second level table 153 and the second transition table 154 depicted in FIG. 25.

Next, by using a specific example, a process of the BDD transforming unit 160f is explained. FIGS. 27 to 30 are drawings for explaining the process of the BDD transforming unit 160f according to the first embodiment. With the process explained with reference to FIGS. 27 to 30 being performed, the second diagram data 150h depicted in FIG. 25 is created from the first diagram data 150g depicted in FIG. 26, thereby deciding a transition-destination node for every multiple bits. Here, the first diagram data 150g as a transformation target is explained by using the first diagram data 150g (the first level table 151 and the first transition table 152) depicted in FIG. 26.

First, the BDD transforming unit 160f sets a current level at "0", and adds the node "H" in a BDD initial state to a set of starting-point nodes. For the node "H" in an initial state, the BDD transforming unit 160f registers a level "0" and the number of input bits "N" (N is a natural number; it is assumed herein by way of example that N=4) in the second level table 153.

Figure 27:
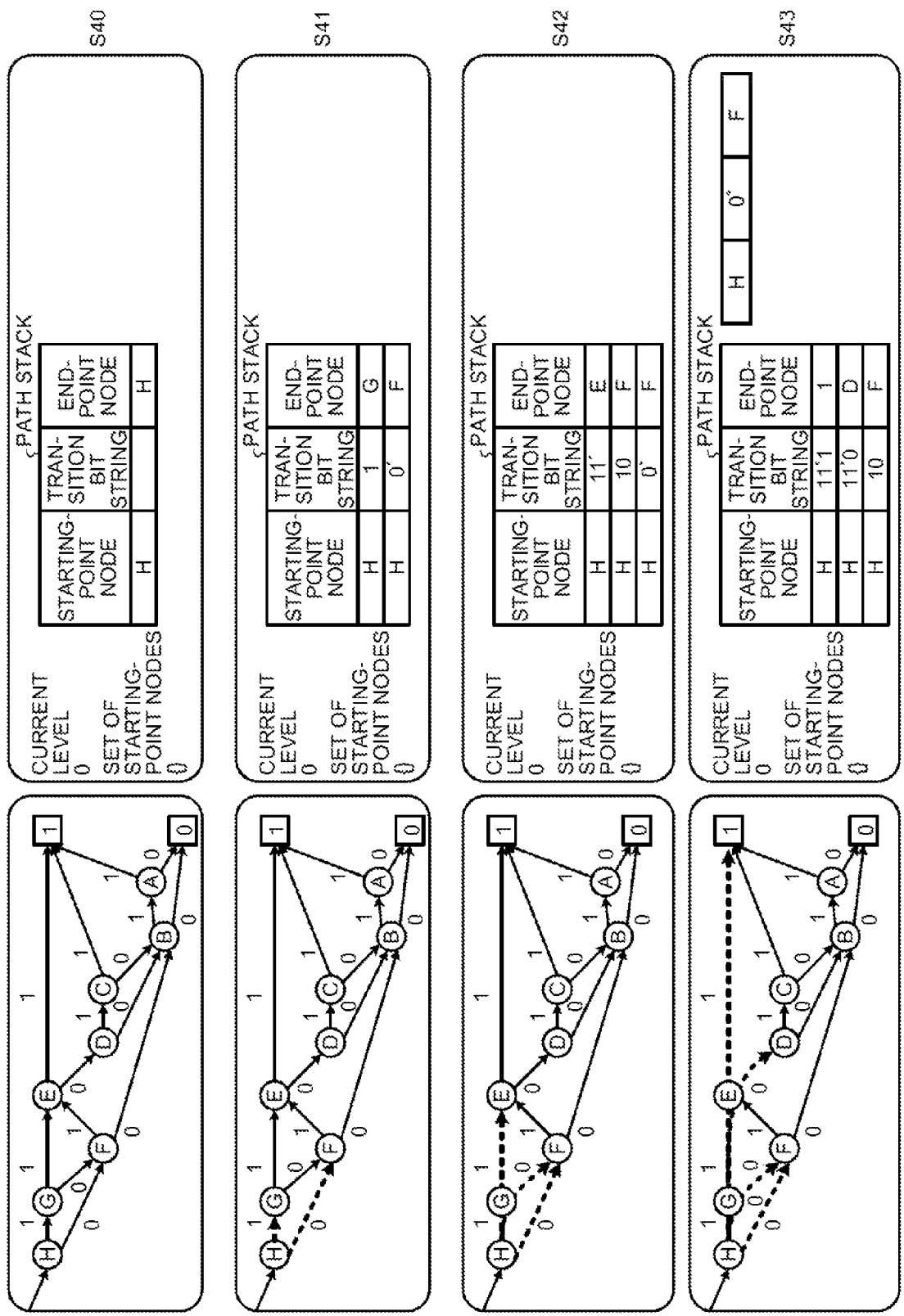
FIG. 27 is a first drawing for explaining a process of the BDD transforming unit according to the first embodiment.
Figure 28:
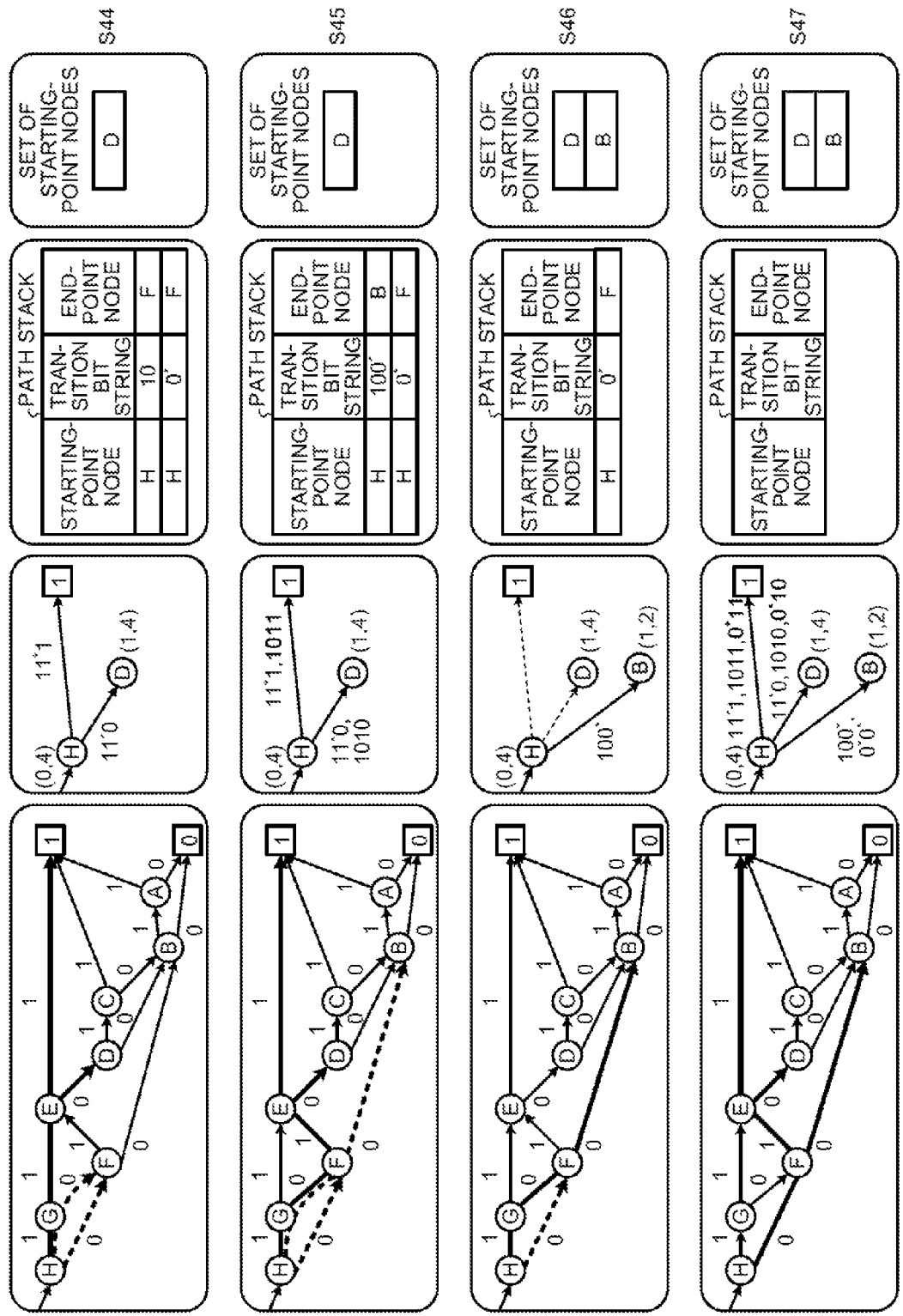
FIG. 28 is a second drawing for explaining the process of the BDD transforming unit according to the first embodiment.
Figure 29:
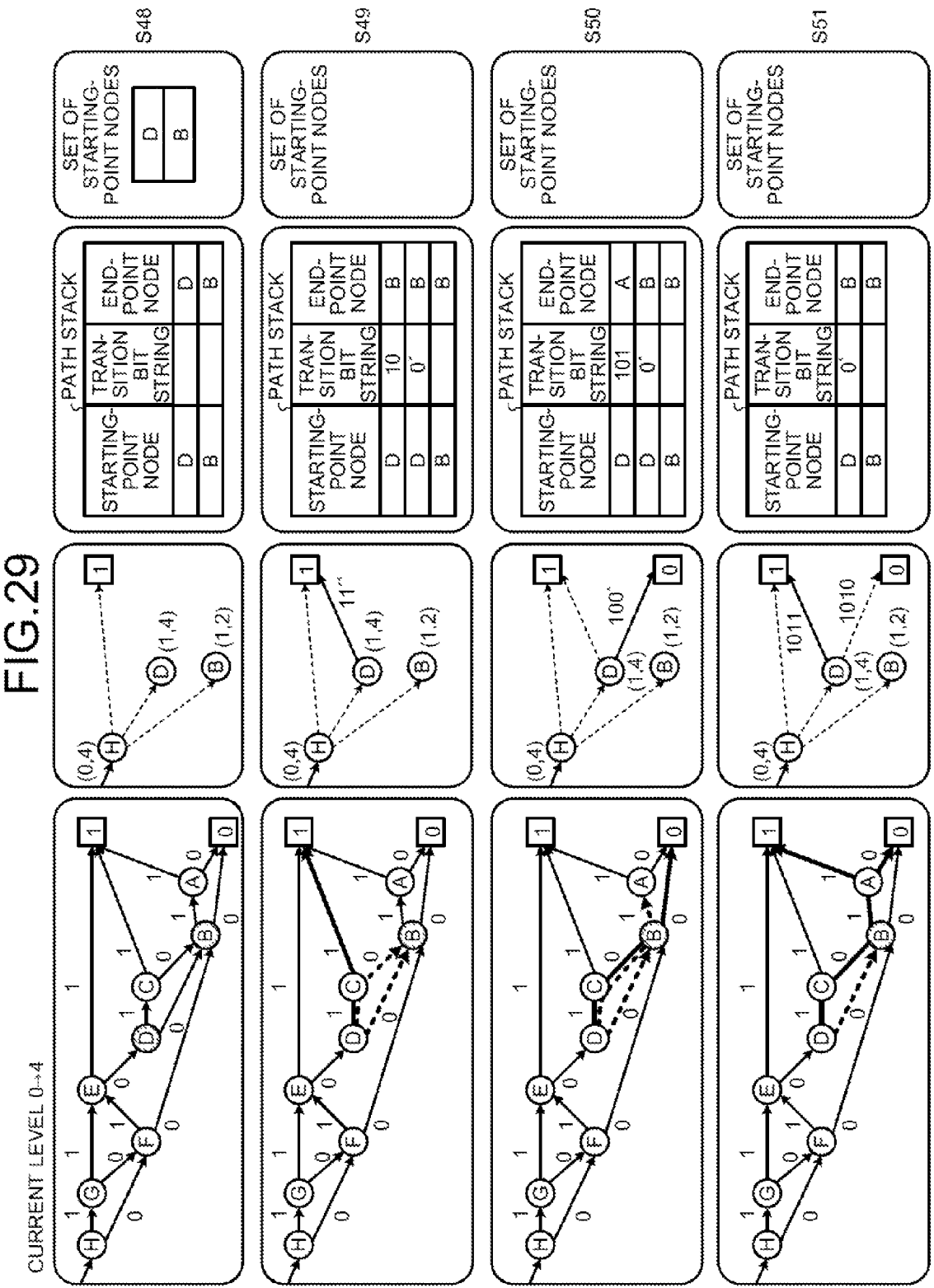
FIG. 29 is a third drawing for explaining the process of the BDD transforming unit according to the first embodiment.
Figure 30:
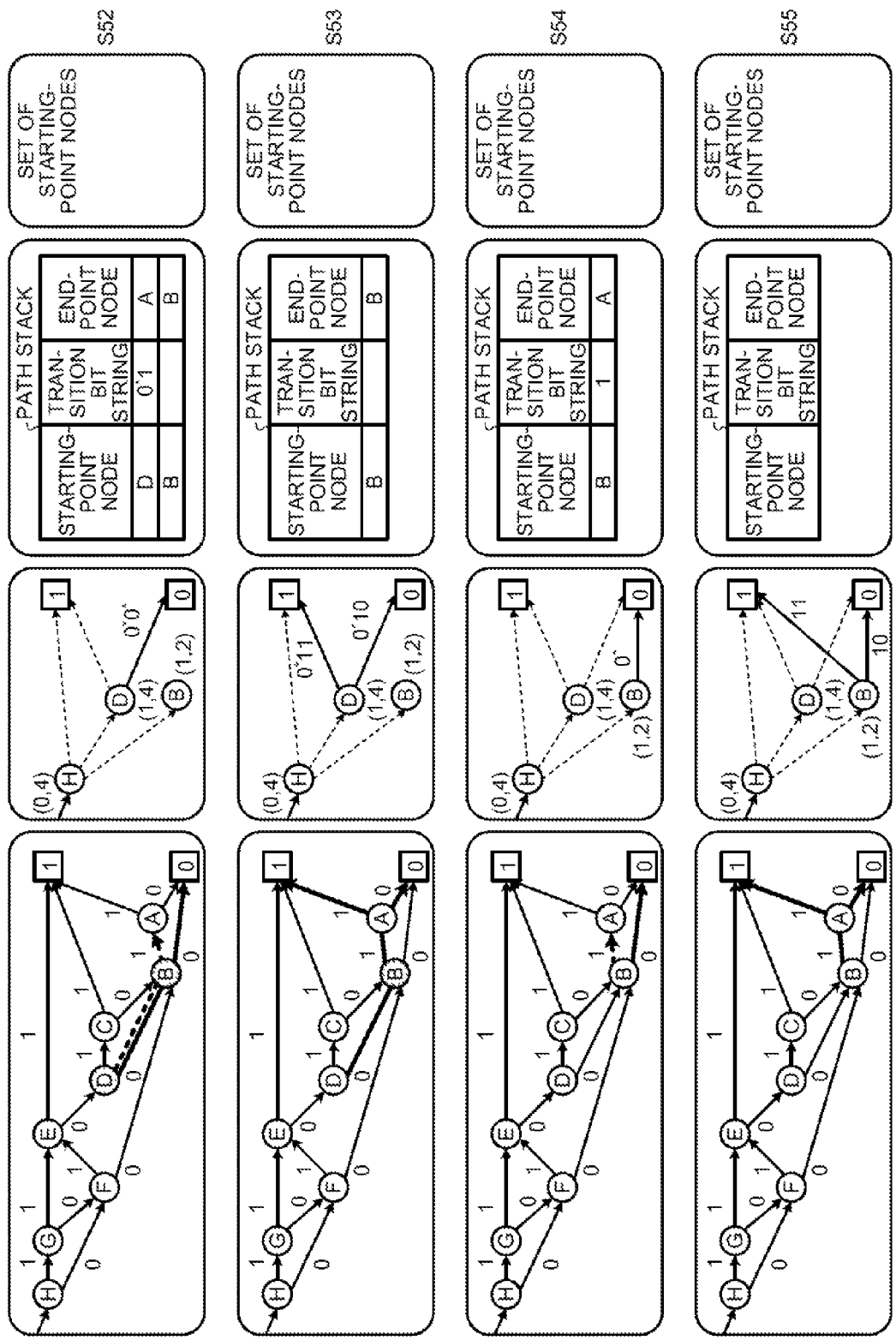
FIG. 30 is a fourth drawing for explaining the process of the BDD transforming unit according to the first embodiment.

For a starting-point node of the set of starting-point nodes "H", the BDD transforming unit 160f stacks the starting-point node "H" as a starting-point node, an empty string as a transition bit string, and the starting-point node "H" as an end-point node on a path stack, and empties the set of starting-point nodes (Step S40 in FIG. 27). Here, the path stack is retained in the BDD transforming unit 160f, where the starting-point node, the transition bit string, and the end-point node are stored in association with each other.

The BDD transforming unit 160f pops the starting-point node "H", the transition bit string "empty", and the end-point node "H" from the path stack, duplicates the transition bit string, and adds 0 and 1 to each transition bit string. Also, the BDD transforming unit 160f refers to the first transition table 152 to obtain transition-destination nodes "G" and "F" for logical values "0" and "1" of the popped end-point node "H", and adds n"*"s to each transition bit string, where n is given by [(the level of the transition-destination node)−(the level of the end-point node "H")−1]. When a level "0" of the end-point node "H" is subtracted from a level "2" of the transition-destination node "F", "2" is obtained. Therefore, one "*" is added to the last of the bit string "0". Then, the starting-point node "H", the bit string "0*", and the end-point node "F" are stacked on the path stack.

On the other hand, when the BDD transforming unit 160f subtracts a level "0" of the end-point node "H" from a level "1" of the transition-destination node "G", "1" is obtained. Therefore, zero "*"s are added to the last of the bit string "1". Then, the starting-point node "H", the bit string "1", and the end-point node "G" are stacked on the path stack (Step S41 in FIG. 27).

The BDD transforming unit 160f pops the starting-point node "H", the transition bit string "1", and the end-point node "G" from the path stack, duplicates the transition bit string, and adds 0 and 1 to each transition bit string. Also, the BDD transforming unit 160f refers to the first transition table 152 to obtain transition-destination nodes "E" and "F" for logical values "0" and "1" of the transition-destination node of the popped end-point node "G", and adds n"*"s to each transition bit string, where n is given by [(the level of the transition-destination node)−(the level of the end-point node "G")−1]. When the level "1" of the end-point node "G" is subtracted from the level "2" of the transition-destination node "F", "1" is obtained. Therefore, zero "*"s are added to the last of the bit string "10". Then, the starting-point node "H", the bit string "10", and the end-point node "F" are stacked on the path stack.

On the other hand, when the BDD transforming unit 160f subtracts the level "1" of the end-point node "G" from a level "3" of the transition-destination node "E", "2" is obtained. Therefore, one "*" is added to the last of the bit string "11". Then, the starting-point node "H", the bit string "11*", and the end-point node "E" are stacked on the path stack (Step S42 in FIG. 27).

The BDD transforming unit 160f pops the starting-point node "H", the transition bit string "11*", and the end-point node "E" from the path stack, duplicates the transition bit string, and adds 0 and 1 to each transition bit string. Also, the BDD transforming unit 160f refers to the first transition table 152 to obtain transition-destination nodes "1" and "D" for logical values "0" and "1" of the transition-destination node of the popped end-point node "E", and adds n"*"s to each transition bit string, where n is given by [(the level of the transition-destination node)−(the level of the end-point node "E")−1]. When the level "3" of the end-point node "E" is subtracted from a level "4" of the transition-destination node "D", "1" is obtained. Therefore, zero "*"s are added to the last of the bit string "11*0". Then, the starting-point node "H", the bit string "11*0", and the end-point node "D" are stacked on the path stack.

On the other hand, when the BDD transforming unit 160f subtracts the level "3" of the end-point node "E" from a level "8" of the transition-destination node "1", "5" is obtained. Therefore, four "*"s are added to the last of the bit string "11*1". Then, the starting-point node "H", the bit string "11*1" (a fifth bit and thereafter from the head of a bit string is cut), and the end-point node "1" are stacked on the path stack (Step S43 in FIG. 27).

The BDD transforming unit 160f pops the starting-point node "H", the transition bit string "11*1", and the end-point node "1" from the path stack. Here, since [(the level of the end-point node "1")−(the current level "0")] is equal to or greater than N (4), the BDD transforming unit 160f registers the end-point node "1", a level "2", and the number of input bits "4" in the second level table 153. Also, the BDD transforming unit 160f registers the starting-point node "H", a logical value "11*1", and the transition destination (end-point node) "1" in the second transition table 154.

The BDD transforming unit 160f pops the starting-point node "H", the transition bit string "11*0", and the end-point node "D" from the path stack. Here, since [(the level of the end-point node "D")−(the current level "0")] is equal to or greater than N (4), the BDD transforming unit 160f registers the end-point node "D", a level "1", and the number of input bits "4" in the second level table 153. Also, the BDD transforming unit 160f registers the starting-point node "H", a logical value "11*0", and the transition-destination (end-point node) "D" in the second transition table 154. Here, since the end-point node "D" is not a node at a final level, the node "D" is registered in the set of starting-point nodes (Step S44 in FIG. 28).

The BDD transforming unit 160f pops the starting-point node "H", the transition bit string "10", and the end-point node "F" from the path stack, duplicates the transition bit string, and adds 0 and 1 to each transition bit string. Also, the BDD transforming unit 160f refers to the first transition table 152 to obtain transition-destination nodes "E" and "B" for logical values "0" and "1" of the transition-destination node of the popped end-point node "F", and adds n"*"s to each transition bit string, where n is given by [(the level of the transition-destination node)–(the level of the end-point node "F")–1]. When the level "2" of the end-point node "F" is subtracted from the level "3" of the transition-destination node "E", "1" is obtained. Therefore, zero "*"s are added to the last of the bit string "101". Then, the starting-point node "H", the bit string "101", and the end-point node "E" are stacked on the path stack.

Next, the BDD transforming unit 160f pops the starting-point node "H", the bit string "101", and the end-point node "E", duplicates the transition bit string, and adds 0 and 1 to each transition bit string. Also, the BDD transforming unit 160f refers to the first transition table 152 to obtain transition-destination nodes "D" and "1" for logical values "0" and "1" of the transition-destination node of the popped end-point node "E", and adds n"*"s to each transition bit string, where n is given by [(the level of the transition-destination node)–(the level of the end-point node "E")–1].

When the BDD transforming unit 160f subtracts a level "3" of the end-point node "E" from a level "4" of the transition-destination node "D", "1" is obtained. Therefore, zero "*"s are added to the last of the bit string "1010". Then, the starting-point node "H", the bit string "1010", and the end-point node "D" are stacked on the path stack.

The BDD transforming unit 160f pops the starting-point node "H", the transition bit string "1010", and the end-point node "D" from the path stack. Here, since [(the level of the end-point node "D")–(the current level "0")] is equal to or greater than N (4), the BDD transforming unit 160f registers the starting-point node "H", a logical value "1010", and the transition destination (end-point node) "D" in the second transition table 154.

Meanwhile, when the BDD transforming unit 160f subtracts the level "3" of the end-point node "E" from a level "8" of the transition-destination node "1", "5" is obtained. Therefore, four "*"s are added to the last of the bit string "1011". Then, the starting-point node "H", the bit string "1011" (a fifth bit and thereafter from the head of a bit string is cut), and the end-point node "1" are stacked on the path stack.

The BDD transforming unit 160f pops the starting-point node "H", the transition bit string "1011", and the end-point node "1" from the path stack. Here, since [(the level of the end-point node "1")–(the current level "0")] is equal to or greater than N (4), the BDD transforming unit 160f registers the starting-point node "H", a logical value "1011", and the transition destination (end-point node) "1" in the second transition table 154.

Also, when the BDD transforming unit 160f subtracts a level "2" of the end-point node "F" from a level "6" of the transition-destination node "B", "4" is obtained. Therefore, three "*"s are added to the last of the bit string "100". Then, the starting-point node "H", the bit string "100*" (a fifth bit and thereafter from the head of a bit string is cut), and the end-point node "B" are stacked on the path stack (Step S45 in FIG. 28).

The BDD transforming unit 160f pops the starting-point node "H", the transition bit string "100*", and the end-point node "B" from the path stack. Here, since [(the level of the end-point node "B")–(the current level "0")] is equal to or greater than N (4), the BDD transforming unit 160f registers the end-point node "B", a level "1", and the number of input bits "2" in the second level table 153. Also, the BDD transforming unit 160f registers the starting-point node "H", a logical value "100*", and the transition destination (end-point node) "B" in the second transition table 154. Here, since the end-point node "B" is not a node at a final level, the node "B" is registered in the set of starting-point nodes (Step S46 in FIG. 28).

The BDD transforming unit 160f pops the starting-point node "H", the transition bit string "0*", and the end-point node "F" from the path stack, duplicates the transition bit string, and adds 0 and 1 to each transition bit string. Also, the BDD transforming unit 160f refers to the first transition table 152 to obtain transition-destination nodes "E" and "B" for logical values "0" and "1" of the transition-destination node of the popped end-point node "F", and adds n"*"s to each transition bit string, where n is given by [(the level of the transition-destination node)–(the level of the end-point node "F")–1]. When a level "2" of the end-point node "F" is subtracted from the level "6" of the transition-destination node "B", "4" is obtained. Therefore, three "*"s are added to the last of the bit string "0*0". Then, the starting-point node "H", the bit string "0*0*" (a fifth bit and thereafter from the head of a bit string is cut), and the end-point node "B" are stacked on the path stack.

The BDD transforming unit 160f pops the starting-point node "H", the transition bit string "0*0*", and the end-point node "B" from the path stack. Here, since [(the level of the end-point node "B")–(the current level "0")] is equal to or greater than N (4), the BDD transforming unit 160f registers the starting-point node "H", a logical value "0*0*", and the transition destination (end-point node) "B" in the second transition table 154.

On the other hand, when the BDD transforming unit 160f subtracts a level "2" of the end-point node "F" from a level "3" of the transition-destination node "E", "1" is obtained. Therefore, zero "*"s are added to the last of the bit string "0*1". Then, the starting-point node "H", the bit string "0*1", and the end-point node "E" are stacked on the path stack.

The BDD transforming unit 160f pops the starting-point node "H", the bit string "0*1", and the end-point node "E" from the path stack, duplicates the transition bit string, and adds 0 and 1 to each transition bit string. Also, the BDD transforming unit 160f refers to the first transition table 152 to obtain transition-destination nodes "D" and "1" for logical values "0" and "1" of the transition-destination node of the popped end-point node "E", and adds n"*"s to each transition bit string, where n is given by [(the level of the transition-destination node)–(the level of the end-point node "E")–1]. When the level "3" of the end-point node "E" is subtracted from a level "4" of the transition-destination node "D", "1" is obtained. Therefore, zero "*"s are added to the last of the bit string "0*10". Then, the starting-point node "H", the bit string "0*10", and the end-point node "D" are stacked on the path stack.

The BDD transforming unit 160f pops the starting-point node "H", the bit string "0*10", and the end-point node "D" from the path stack. Here, since [(the level of the end-point node "D")–(the current level "0")] is equal to or greater than N (4), the BDD transforming unit 160f registers the starting-point node "H", a logical value "0*10", and the transition destination (end-point node) "D" in the second transition table 154.

On the other hand, when the BDD transforming unit 160f subtracts the level "3" of the end-point node "E" from a level "8" of the transition-destination node "1", "5" is obtained. Therefore, four "*"s are added to the last of the bit string "0*11". Then, the starting-point node "H", the bit string "0*11" (a fifth bit and thereafter from the head of a bit string is cut), and the end-point node "1" are stacked on the path stack.

The BDD transforming unit 160f pops the starting-point node "H", the bit string "0*11", and the end-point node "D" from the path stack. Here, since [(the level of the end-point node "1")−(the current level "0")] is equal to or greater than N (4), the BDD transforming unit 160f registers the starting-point node "H", a logical value "0*11", and the transition destination (end-point node) "1" in the second transition table 154 (Step S47 in FIG. 28).

Since the path stack is empty, the BDD transforming unit 160f adds N (4) to the current level "0", thereby setting the current level at "4". Also, the BDD transforming unit 160f stacks information on the path stack corresponding to the starting-point nodes "D" and "B" in the set of starting-point nodes. Specifically, the starting-point node "D", the transition bit string "empty", the end-point node "D", the starting-point node "B", the transition bit string "empty", and the end-point node "B" are stacked on the path stack (Step S48 in FIG. 29).

The BDD transforming unit 160f empties the set of starting-point nodes. The BDD transforming unit 160f pops the starting-point node "D", the transition bit string "empty", and the end-point node "D" from the path stack. The BDD transforming unit 160f then duplicates the popped transition bit string, and adds 0 and 1 to each transition bit string. Also, the BDD transforming unit 160f refers to the first transition table 152 to obtain transition-destination nodes "B" and "C" for logical values "0" and "1" of the popped end-point node "D", and adds n "*"s to each transition bit string, where n is given by [(the level of the transition-destination node)−(the level of the end-point node "D")−1].

When the BDD transforming unit 160f subtracts a level "4" of the end-point node "D" from a level "6" of the transition-destination node "B", "2" is obtained. Therefore, one "*" is added to the last of the bit string "0". Then, the starting-point node "D", the bit string "0*", and the end-point node "B" are stacked on the path stack.

Also, when the BDD transforming unit 160f subtracts the level "4" of the end-point node "D" from a level "5" of the transition-destination node "C", "1" is obtained. Therefore, zero "*"s are added to the last of the bit string "1". Then, the starting-point node "D", the bit string "1", and the end-point node "C" are stacked on the path stack.

The BDD transforming unit 160f pops the starting-point node "D", the bit string "1", and the end-point node "C" from the path stack. The BDD transforming unit 160f then duplicates the popped transition bit string, and adds 0 and 1 to each transition bit string. Also, the BDD transforming unit 160f refers to the first transition table 152 to obtain transition-destination nodes "B" and "1" for logical values "0" and "1" of the popped end-point node "C", and adds n "*"s to each transition bit string, where n is given by [(the level of the transition-destination node)−(the level of the end-point node "C")−1].

When the BDD transforming unit 160f subtracts a level "5" of the end-point node "C" from the level "6" of the transition-destination node "B", "1" is obtained. Therefore, zero "*"s are added to the last of the bit string "10". Then, the starting-point node "D", the bit string "10", and the end-point node "B" are stacked on the path stack.

On the other hand, when the BDD transforming unit 160f subtracts the level "5" of the end-point node "C" from a level "8" of the transition-destination node "1", "3" is obtained. Therefore, two "*"s are added to the last of the bit string "11". Then, the starting-point node "D", the bit string "11**", and the end-point node "1" are stacked on the path stack.

The BDD transforming unit 160f pops the starting-point node "D", the bit string "11", and the end-point node "1" from the path stack. Here, since (the level of the end-point node "1")−(the current level "4") is equal to or greater than N (4), the BDD transforming unit 160f registers the starting-point node "D", a logical value "11", and the transition destination (end-point node) "1" in the second transition table 154 (Step S49 in FIG. 29).

The BDD transforming unit 160f pops the starting-point node "D", the transition bit string "10", and the end-point node "B" from the path stack. The BDD transforming unit 160f then duplicates the popped transition bit string, and adds 0 and 1 to each transition bit string. Also, the BDD transforming unit 160f refers to the first transition table 152 to obtain transition-destination nodes "0" and "A" for logical values "0" and "1" of the popped end-point node "B", and adds n "*"s to each transition bit string, where n is given by [(the level of the transition-destination node)−(the level of the end-point node "B")−1].

When the BDD transforming unit 160f subtracts a level "6" of the end-point node "B" from a level "8" of the transition-destination node "0", "2" is obtained. Therefore, one "*" is added to the last of the bit string "100". Then, the starting-point node "D", the bit string "100*", and the end-point node "0" are stacked on the path stack.

The BDD transforming unit 160f pops the starting-point node "D", the bit string "100*", and the end-point node "0" from the path stack. Here, since [(the level of the end-point node "0")−(the current level "4")] is equal to or greater than N (4), the BDD transforming unit 160f registers the starting-point node "D", a logical value "100*", and the transition destination (end-point node) "0" in the second transition table 154.

On the other hand, when the BDD transforming unit 160f subtracts the level "6" of the end-point node "B" from a level "7" of the transition-destination node "A", "1" is obtained. Therefore, zero "*"s are added to the last of the bit string "101". Then, the starting-point node "D", the bit string "101", and the end-point node "A" are stacked on the path stack (Step S50 in FIG. 29).

The BDD transforming unit 160f pops the starting-point node "D", the transition bit string "101", and the end-point node "A" from the path stack, duplicates the transition bit string, and adds 0 and 1 to each transition bit string. Also, the BDD transforming unit 160f refers to the first transition table 152 to obtain transition-destination nodes "0" and "1" for logical values "0" and "1" of the popped end-point node "A". Since the BDD transforming unit 160f subtracts a level "7" of the end-point node "A" from a level "8" of the transition-destination node "0", "1" is obtained. Therefore, zero "*"s are added to the last of the bit string "1010". Then, the starting-point node "D", the bit string "1010", and the end-point node "0" are stacked on the path stack.

The BDD transforming unit 160f pops the starting-point node "D", the bit string "1010", and the end-point node "0" from the path stack. Here, since [(the level of the end-point node "0")−(the current level "4")] is equal to or greater than N (4), the BDD transforming unit 160f registers the starting-point node "D", a logical value "1010", and the transition destination (end-point node) "0" in the second transition table 154.

On the other hand, when the BDD transforming unit 160f subtracts the level "7" of the end-point node "A" from a level "8" of the transition-destination node "1", "1" is obtained. Therefore, zero "*"s are added to the last of the bit string "1011". Then, the starting-point node "D", the bit string "1011", and the end-point node "1" are stacked on the path stack.

The BDD transforming unit 160*f* pops the starting-point node "D", the bit string "1011", and the end-point node "1" from the path stack. Here, since [(the level of the end-point node "1")−(the current level "4")] is equal to or greater than N (4), the BDD transforming unit 160*f* registers the starting-point node "D", a logical value "1011", and the transition destination (end-point node) "1" in the second transition table 154 (Step S51 in FIG. 29).

The BDD transforming unit 160*f* pops the starting-point node "D", the transition bit string "0*", and the end-point node "B" from the path stack, duplicates the transition bit string, and adds 0 and 1 to each transition bit string. Also, the BDD transforming unit 160*f* refers to the first transition table 152 to obtain transition-destination nodes "0" and "A" for logical values "0" and "1" of the popped end-point node "B". When the BDD transforming unit 160*f* subtracts a level "6" of the end-point node "B" from the level "8" of the transition-destination node "0", "2" is obtained. Therefore, one "*" is added to the last of the bit string "0*0". Then, the starting-point node "D", the bit string "0*0*", and the end-point node "0" are stacked on the path stack.

The BDD transforming unit 160*f* pops the starting-point node "D", the bit string "0*0*", and the end-point node "0" from the path stack. Here, since [(the level of the end-point node "0")−(the current level "4")] is equal to or greater than N (4), the BDD transforming unit 160*f* registers the starting-point node "D", a logical value "0*0*", and the transition destination (end-point node) "0" in the second transition table 154.

On the other hand, when the BDD transforming unit 160*f* subtracts the level "6" of the end-point node "B" from a level "7" of the transition-destination node "A", "1" is obtained. Therefore, zero "*"s are added to the last of the bit string "0*1". Then, the starting-point node "D", the bit string "0*1", and the end-point node "A" are stacked on the path stack (Step S52 in FIG. 30).

The BDD transforming unit 160*f* pops the starting-point node "D", the transition bit string "0*1", and the end-point node "A" from the path stack, duplicates the transition bit string, and adds 0 and 1 to each transition bit string. Also, the BDD transforming unit 160*f* refers to the first transition table 152 to obtain transition-destination nodes "1" and "0" for logical values "0" and "1" of the popped end-point node "A". When the BDD transforming unit 160*f* subtracts the level "7" of the end-point node "A" from the level "8" of the transition-destination node "0", "1" is obtained. Therefore, zero "*"s are added to the last of the bit string "0*10". Then, the starting-point node "D", the bit string "0*10", and the end-point node "0" are stacked on the path stack.

The BDD transforming unit 160*f* pops the starting-point node "D", the bit string "0*10", and the end-point node "0" from the path stack. Here, since [(the level of the end-point node "0")−(the current level "4")] is equal to or greater than N (4), the BDD transforming unit 160*f* registers the starting-point node "D", a logical value "0*10", and the transition destination (end-point node) "0" in the second transition table 154.

On the other hand, when the BDD transforming unit 160*f* subtracts a level "7" of the end-point node "A" from a level "8" of the transition-destination node "1", "1" is obtained. Therefore, zero "*"s are added to the last of the bit string "0*11". Then, the starting-point node "D", the bit string "0*11", and the end-point node "1" are stacked on the path stack.

The BDD transforming unit 160*f* pops the starting-point node "D", the bit string "0*11", and the end-point node "1" from the path stack. Here, since [(the level of the end-point node "1")−(the current level "4")] is equal to or greater than N (4), the BDD transforming unit 160*f* registers the starting-point node "D", a logical value "0*11", and the transition destination (end-point node) "1" in the second transition table 154 (Step S53 in FIG. 30).

The BDD transforming unit 160*f* pops the starting-point node "B", the transition bit string "empty", and the end-point node "B" from the path stack, duplicates the transition bit string, and adds 0 and 1 to each transition bit string. Also, the BDD transforming unit 160*f* refers to the first transition table 152 to obtain transition-destination nodes "0" and "A" for logical values "0" and "1" of the popped end-point node "B". When the BDD transforming unit 160*f* subtracts the level "6" of the end-point node "B" from the level "7" of the transition-destination node "A", "1" is obtained. Therefore, zero "*"s are added to the last of the bit string "1". Then, the starting-point node "B", the bit string "1", and the end-point node "A" are stacked on the path stack.

On the other hand, when the BDD transforming unit 160*f* subtracts the level "6" of the end-point node "B" from the level "8" of the transition-destination node "0", "2" is obtained. Therefore, one "*" is added to the last of the bit string "0". Then, the starting-point node "B", the bit string "0*", and the end-point node "0" are stacked on the path stack.

The BDD transforming unit 160*f* pops the starting-point node "B", the bit string "0*", and the end-point node "0" from the path stack. Here, since [(the level of the end-point node "0")−(the current level "4")] is equal to or greater than N (4), the BDD transforming unit 160*f* registers the starting-point node "B", a logical value "0*", and the transition destination (end-point node) "0" in the second transition table 154 (Step S54 in FIG. 30).

The BDD transforming unit 160*f* pops the starting-point node "B", the transition bit string "1", and the end-point node "A" from the path stack, duplicates the transition bit string, and adds 0 and 1 to each transition bit string. Also, the BDD transforming unit 160*f* refers to the first transition table 152 to obtain transition-destination nodes "0" and "1" for logical values "0" and "1" of the popped end-point node "A". When the BDD transforming unit 160*f* subtracts the level "7" of the end-point node "A" from the level "8" of the transition-destination node "0", "1" is obtained. Therefore, zero "*"s are added to the last of the bit string "10". Then, the starting-point node "B", the bit string "10", and the end-point node "0" are stacked on the path stack.

The BDD transforming unit 160*f* pops the starting-point node "B", the bit string "10", and the end-point node "0" from the path stack. Here, since [(the level of the end-point node "0")−(the current level "4")] is equal to or greater than N (4), the BDD transforming unit 160*f* registers the starting-point node "B", a logical value "10", and the transition destination (end-point node) "0" in the second transition table 154.

On the other hand, when the BDD transforming unit 160*f* subtracts the level "6" of the end-point node "B" from the level "8" of the transition-destination node "1", "2" is obtained. Therefore, one "*" is added to the last of the bit string "11". Then, the starting-point node "B", the bit string "11", and the end-point node "1" are stacked on the path stack.

The BDD transforming unit 160*f* pops the starting-point node "B", the bit string "11", and the end-point node "1" from the path stack. Here, when [(the level of the end-point node "1")−(the current level "4")] is equal to or greater than N (4), the BDD transforming unit 160f registers the starting-point node "B", a logical value "11", and the transition destination (end-point node) "1" in the second transition table 154 (Step S55 in FIG. 30).

As such, the BDD transforming unit 160f performs the process from Steps S40 to S55, thereby the first diagram data 150g depicted in FIG. 26 is transformed to the second diagram data 150h depicted in FIG. 25.

Referring back to explanation of FIG. 4, the diagram executing unit 160g is a unit that compares the logical value table 150e with the second diagram data 150h to decide whether the final logical value is "1 (true)".

The diagram executing unit 160g then detects in the evaluation result table 150i a reply item corresponding to a data type for which the decision result is "1", and then stores the detected reply item in the storage unit 150 as the search result data 150j. For example, when the decision result of the data type "Data 2" is "1", a reply item "third development department" is stored as the search result data 150j.

Figure 31:
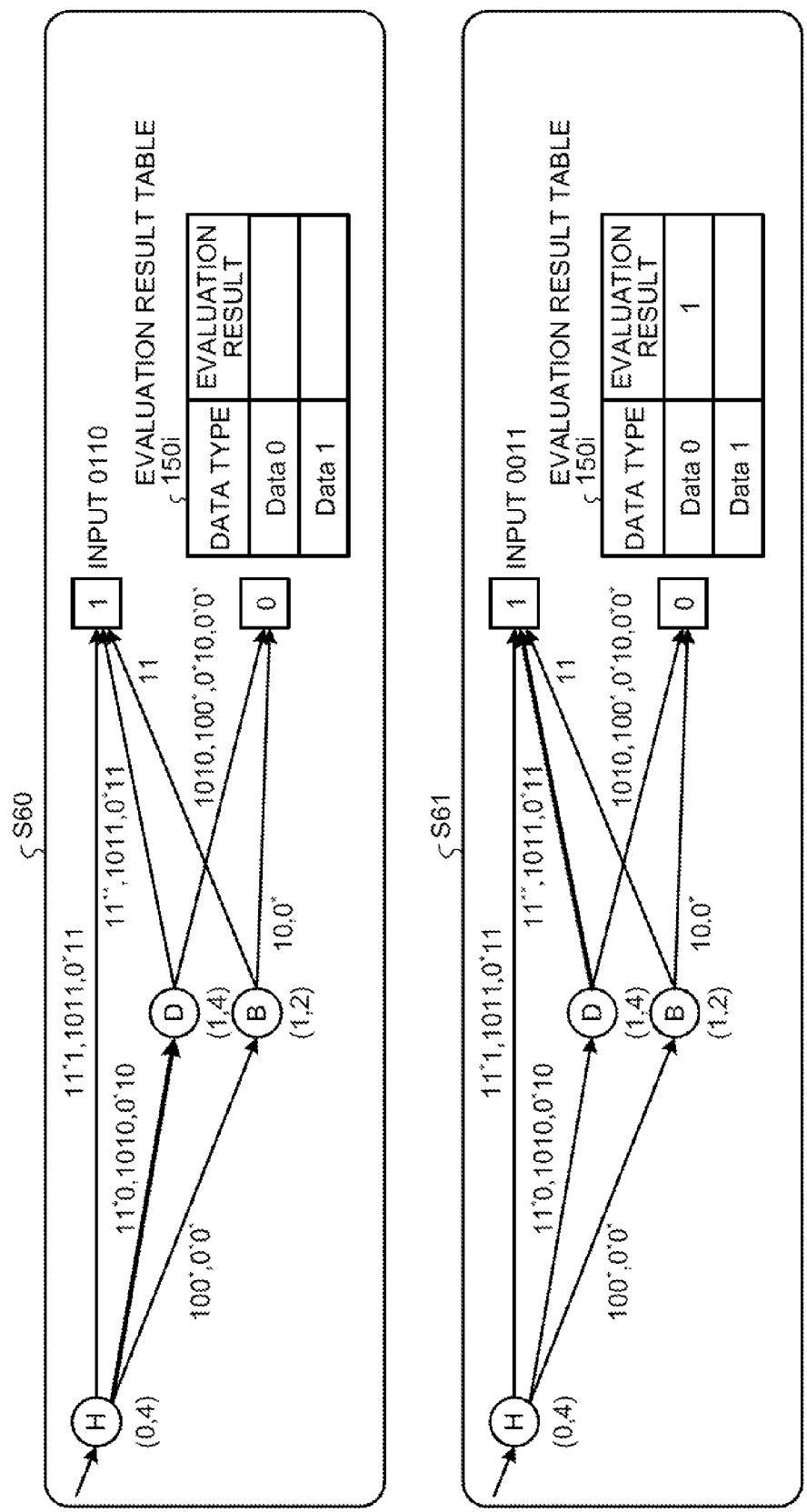
FIG. 31 is a first drawing for explaining a process of a diagram executing unit according to the first embodiment.
Figure 32:
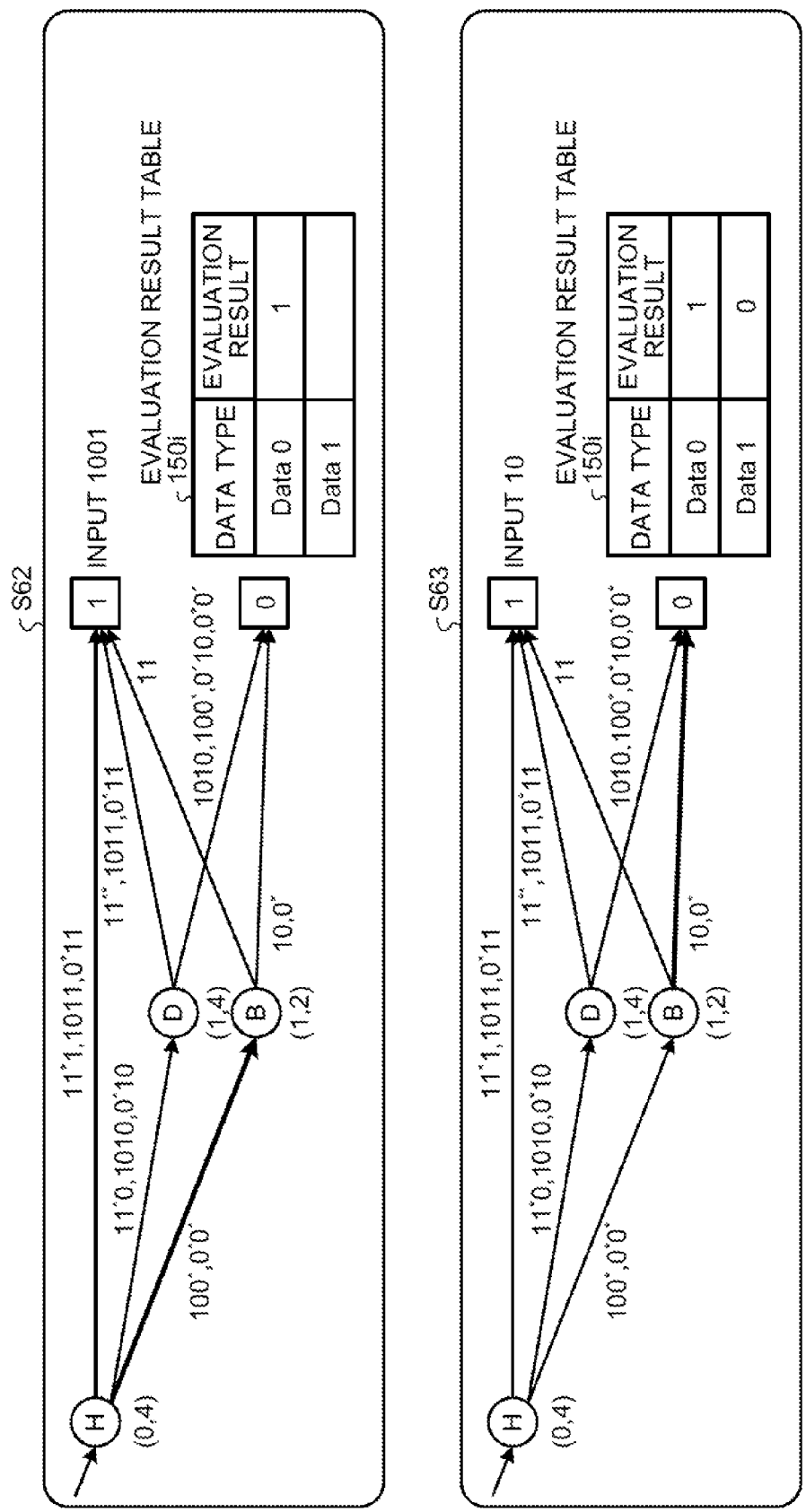
FIG. 32 is a second drawing for explaining the process of a diagram executing unit according to the first embodiment.

A process of the diagram executing unit 160g is now specifically explained. FIGS. 31 and 32 are drawings for explaining the process of the diagram executing unit 160g according to the first embodiment. It is postulated herein that the data structure depicted in FIG. 25 is taken as the data structure of the second diagram data 150h. It is also assumed herein that the data types are "Data 0" and "Data 1" and logical values of "Data 0" are "H=0, G=1, F=1, E=0, D=0, C=0, B=1, A=1" and logical values of "Data 1"! are "H=1, G=0, F=0, E=1, D=0, C=1, B=1, A=0". Furthermore, since the input ordering follows the level ordering of the first level table 151 (refer to FIG. 26), the ordering is "H, G, F, E, D, C, B, A".

First, the case is explained where the diagram executing unit 160g makes a true/false decision on "Data 0". Since the number of input bits of the node "H" as an initial node is "4" (refer to the second level table 153 in FIG. 25), the diagram executing unit 160g compares upper four bits "0110" in the bit string "01100011" of "Data 0" with the second transition table 154 to obtain a transition-destination node "D" (Step S60 in FIG. 31).

Then, since the number of input bits of the transition-destination node "D" is "4", the diagram executing unit 160g compares the remaining bit string "0011" with the second transition table 154 to obtain a transition-destination node "1 (true)". In the evaluation result table 150i, the diagram executing unit 160g registers "1 (true)" in the evaluation result corresponding to the data type "Data 0" (Step S61 in FIG. 31).

Next, the case is explained where the diagram executing unit 160g makes a true/false decision on "Data 1". Since the number of input bits of the node "H" as an initial node is "4", the diagram executing unit 160g compares upper four bits "1001" in the bit string "10010110" of "Data 1" with the second transition table 154 to obtain a transition-destination node "B" (Step S62 in FIG. 32).

Then, since the number of input bits of the transition-destination node "B" is "2", the diagram executing unit 160g compares lower two bits "10" in the remaining bit string "0110" with the second transition table 154 to obtain a transition-destination node "0 (false)". In the evaluation result table 150i, the diagram executing unit 160g registers "0 (false)" in the evaluation result corresponding to the data type "Data 1" (Step S63 in FIG. 32).

The search-result output unit 160h is a unit that transmits the search result data 150j stored in the storage unit 150 to the terminal device 60 (refer to FIG. 3). Upon receiving the search result data 150j, the terminal device 60 outputs the received search result data 150j onto a monitor screen. FIG. 33 is a drawing of an example of the monitor screen with an output of the search result data.

Figure 34:
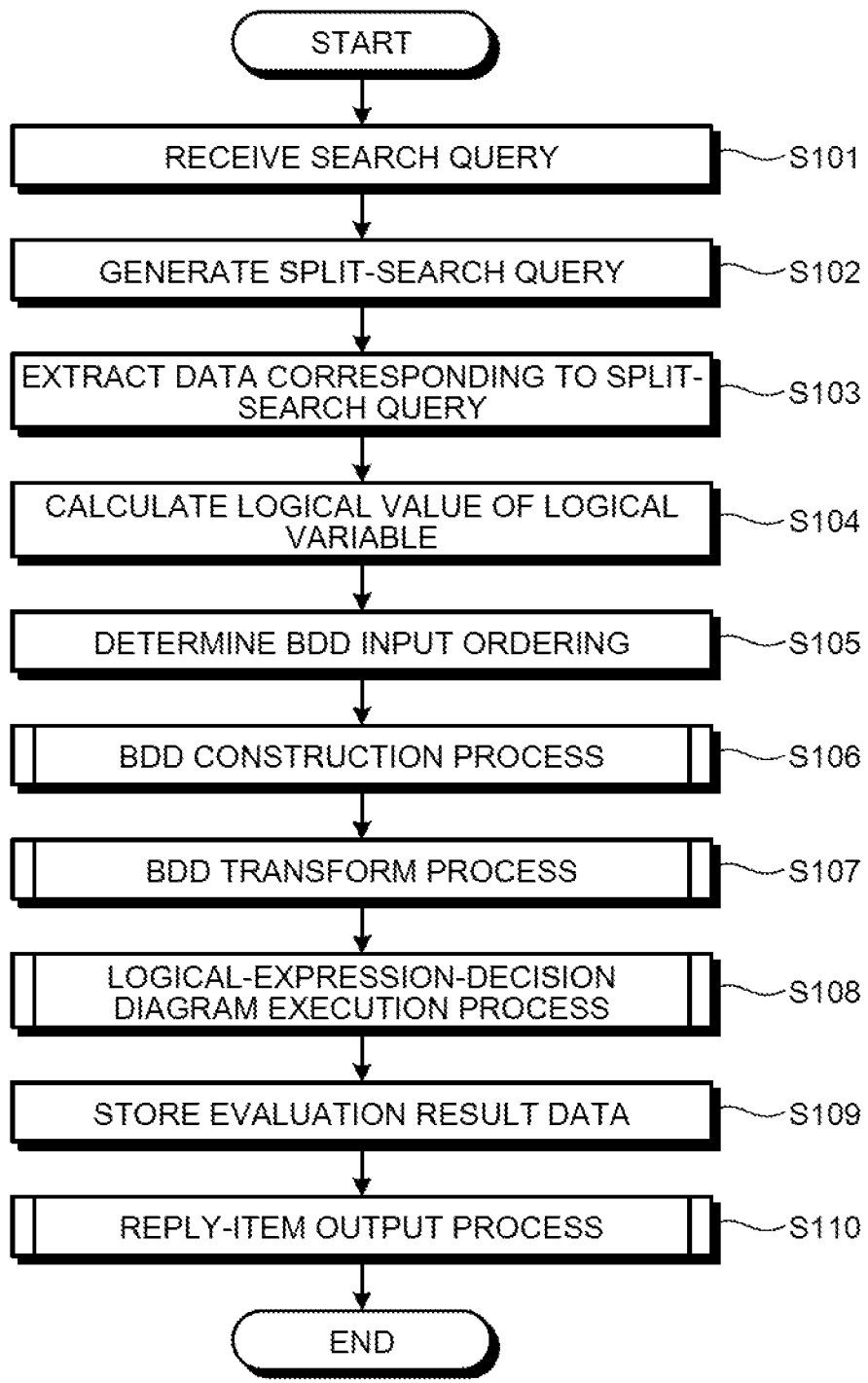
FIG. 34 is a flowchart of a process procedure of the searching apparatus according to the first embodiment.

Next, a process procedure of the searching apparatus 100 according to the first embodiment is explained. FIG. 34 is a flowchart of the process procedure of the searching apparatus 100 according to the first embodiment. As depicted in the drawing, the searching apparatus 100 receives a search query (Step S101), and the search-query splitting unit 160a generates the split-search query 150c (Step S102).

Subsequently, the extraction-result-table generating unit 160b extracts data corresponding to the split-search query 150c for registration in the extraction result table 150d (Step S103). The logical-value calculating unit 160c then calculates a logical value for registration in the logical value table 150e (Step S104).

The BDD constructing unit 160e then determines a BDD input ordering (Step S105) to perform a BDD construction process (Step S106). The BDD transforming unit 160f performs a BDD transform process to transform the first diagram data 150g to the second diagram data 150h (Step S107).

The diagram executing unit 160g performs a logical-expression-decision diagram execution process (Step S108) and stores the evaluation result data (Step S109). The search-result output unit 160h then performs a reply-item output process (Step S110).

Figure 35:
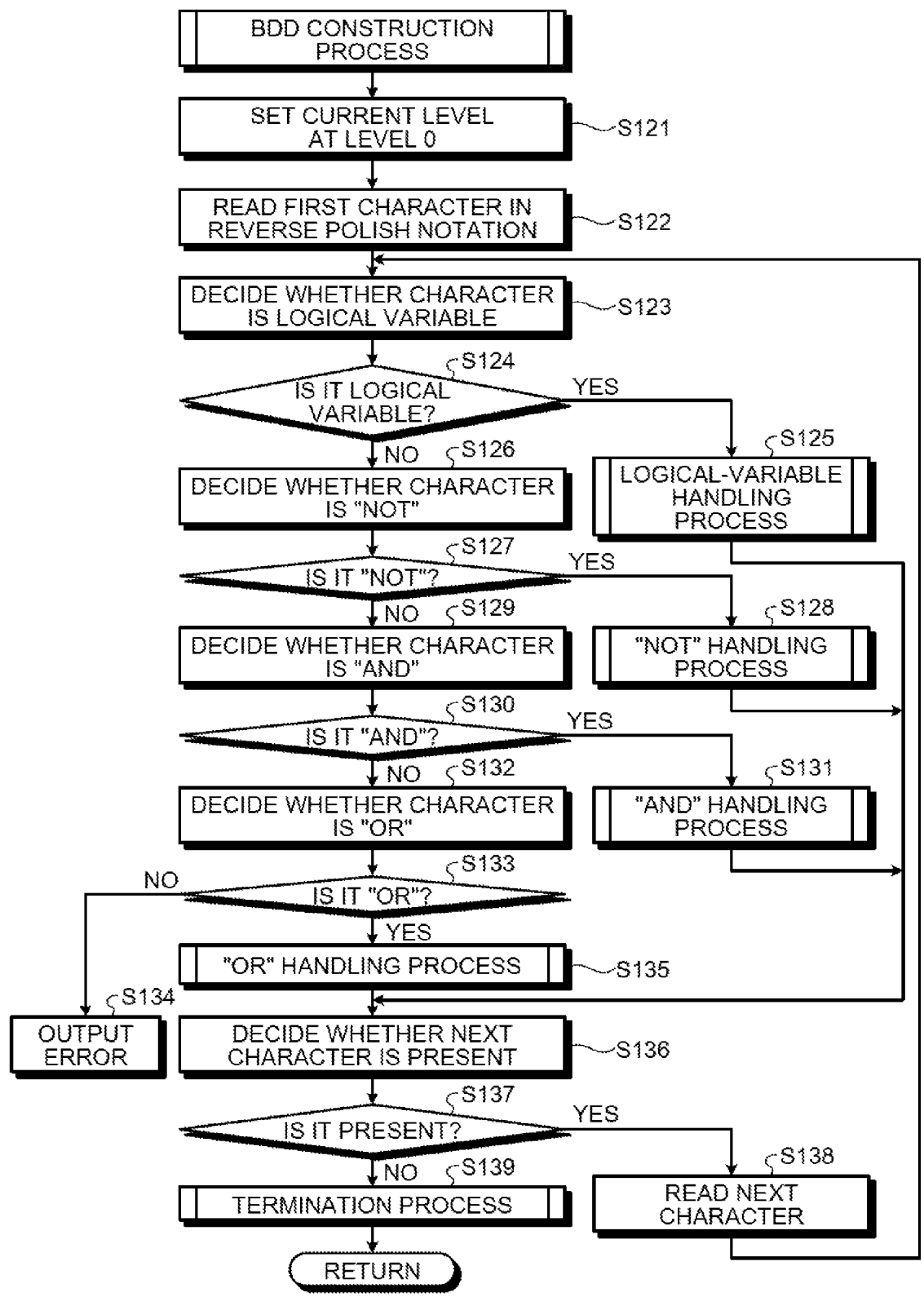
FIG. 35 is a flowchart of a procedure of a BDD construction process according to the first embodiment.

Next, the BDD construction process depicted at Step S106 in FIG. 34 is explained. FIG. 35 is a flowchart of a procedure of the BDD construction process according to the first embodiment. As depicted in FIG. 35, the BDD constructing unit 160e sets the current level at 0 (Step S121), reads the first character in reverse Polish notation (Step S122), and decides whether the read character is a logical variable (Step S123).

When the character is a logical variable (Yes at Step S124), the BDD constructing unit 160e performs a logical-variable handling process (Step S125), and then goes to Step S136. On the other hand, when the character is not a logical variable (No at Step S124), it is decided whether the character is "NOT" (Step S126).

When the character is "NOT" (Yes at Step S127), the BDD constructing unit 160e performs a NOT handling process (Step S128), and then goes to Step S136. On the other hand, when the character is not "NOT" (No at Step S127), it is decided whether the character is "AND" (Step S129).

When the character is "AND" (Yes at Step S130), the BDD constructing unit 160e performs an AND handling process (Step S131), and then goes to Step S136. On the other hand, when the character is not "AND" (No at Step S130), it is decided whether the character is "OR" (Step S132).

When the character is not "OR" (No at Step S133), the BDD constructing unit 160e outputs an error to the output unit 120 (Step S134). On the other hand, when the character is "OR" (Yes at Step S133), the BDD constructing unit 160e performs an OR handling process (Step S135).

Subsequently, the BDD constructing unit 160e decides whether the next character is present (Step S136). When the next character is present (Yes at Step S137), the BDD constructing unit 160e reads the next character (Step S138), and then goes to Step S123. On the other hand, when the next character is not present (No at Step S137), the BDD constructing unit 160e performs a termination process (Step S139).

Figure 36:
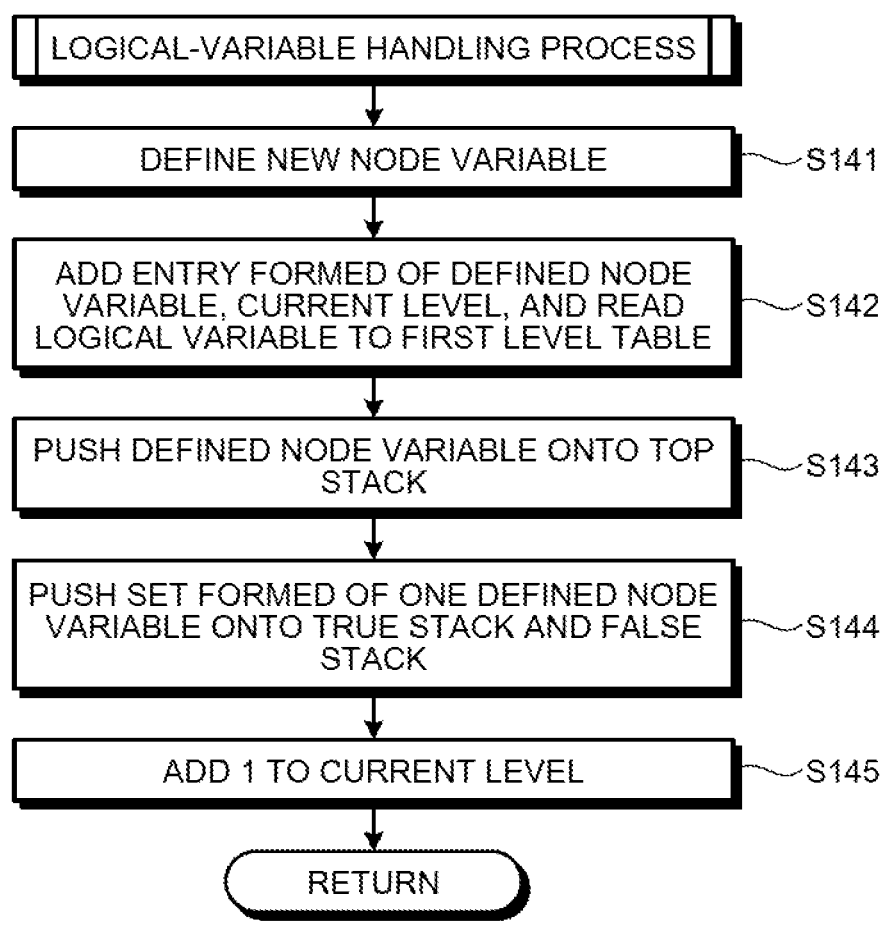
FIG. 36 is a flowchart of a procedure of a logical-variable handling process according to the first embodiment.

Next, the logical-variable handling process depicted at Step S125 in FIG. 35 is explained. FIG. 36 is a flowchart of a procedure of the logical-variable handling process according to the first embodiment. As depicted in FIG. 36, the BDD constructing unit 160e defines a new node variable (Step S141), and adds an entry formed of the defined node variable, the current level, and the read logical variable to the first level table 151 (Step S142).

The BDD constructing unit 160e then pushes the defined node variable onto the Top stack (Step S143), pushes a set formed of one defined node variable onto the True stack and the False stack (Step S144), and then adds 1 to the current level (Step S145).

Figure 37:
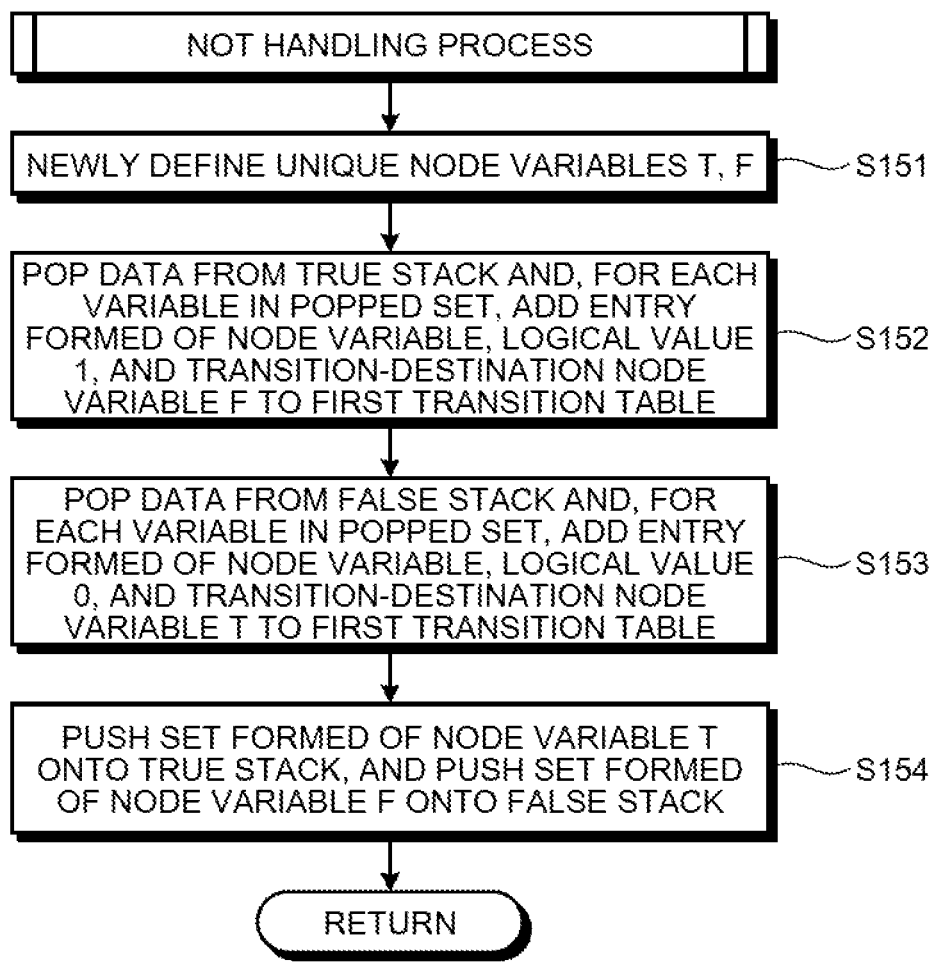
FIG. 37 is a flowchart of a procedure of a NOT handling process according to the first embodiment.

Next, the NOT handling process depicted at Step S128 in FIG. 35 is explained. FIG. 37 is a flowchart of a procedure of the NOT handling process according to the first embodiment. As depicted in FIG. 37, the BDD constructing unit 160e newly defines unique node variables T and F (Step S151), pops data from the True stack and, for each variable in the popped set, adds an entry formed of the node variable, a logical value 1, and a transition-destination node variable F to the first transition table 152 (Step S152).

The BDD constructing unit 160e then pops data from the False stack and, for each node variable in the popped set, adds an entry formed of the node variable, a logical value 0, and a transition-destination node variable T to the first transition table 152 (Step S153), and then pushes a set formed of the node variable T onto the True stack and a set formed of the node variable F onto the False stack (Step S154).

Figure 38:
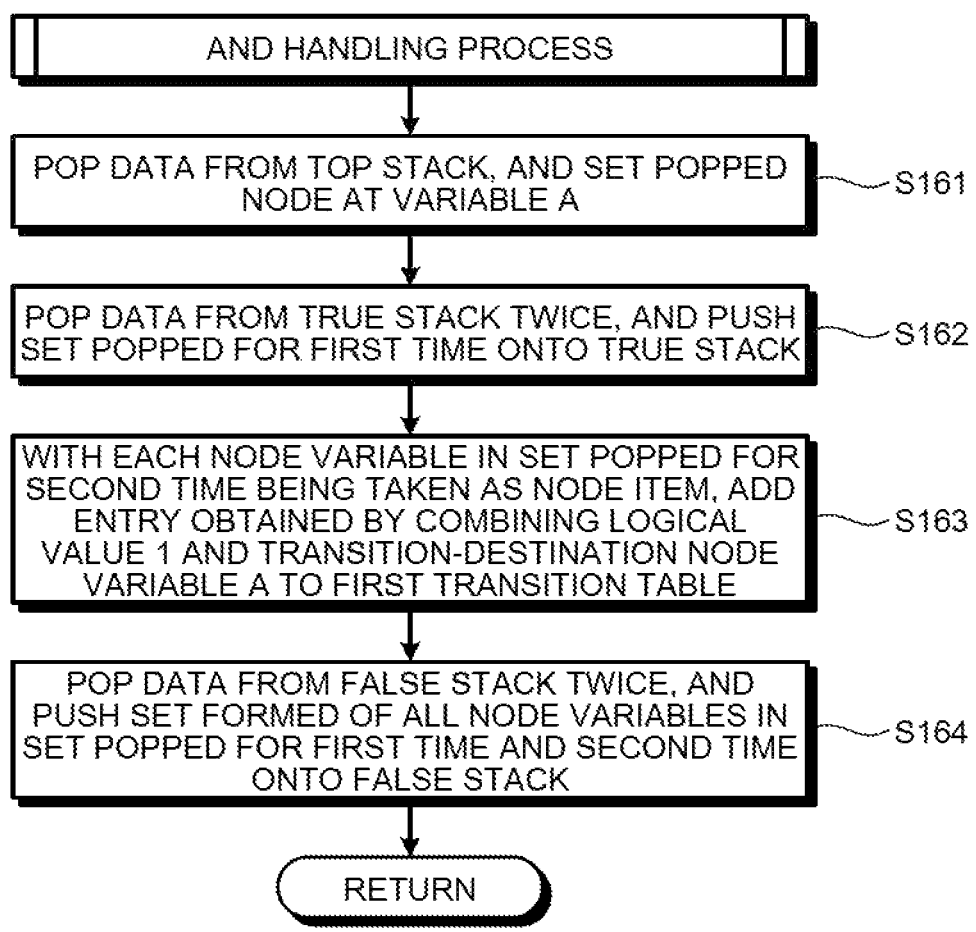
FIG. 38 is a flowchart of a procedure of an AND handling process according to the first embodiment.

Next, the AND handling process depicted at Step S131 in FIG. 35 is explained. FIG. 38 is a flowchart of a procedure of the AND handling process according to the first embodiment. As depicted in FIG. 38, the BDD constructing unit 160e pops data from the Top stack and sets the popped node at a variable A (Step S161). The BDD constructing unit 160e then pops data from the True stack twice, and pushes a set popped for the first time onto the True stack (Step S162).

Then, with each node variable in a set popped for the second time being taken as a node item, the BDD constructing unit 160e adds an entry obtained by combining of a logical value 1 and the transition-destination node variable A to the first transition table 152 (Step S163). The BDD constructing unit 160e then pops data from the False stack twice, and pushes a set formed of all node variables in a set popped for the first time and the second time onto the False stack (Step S164).

Figure 39:
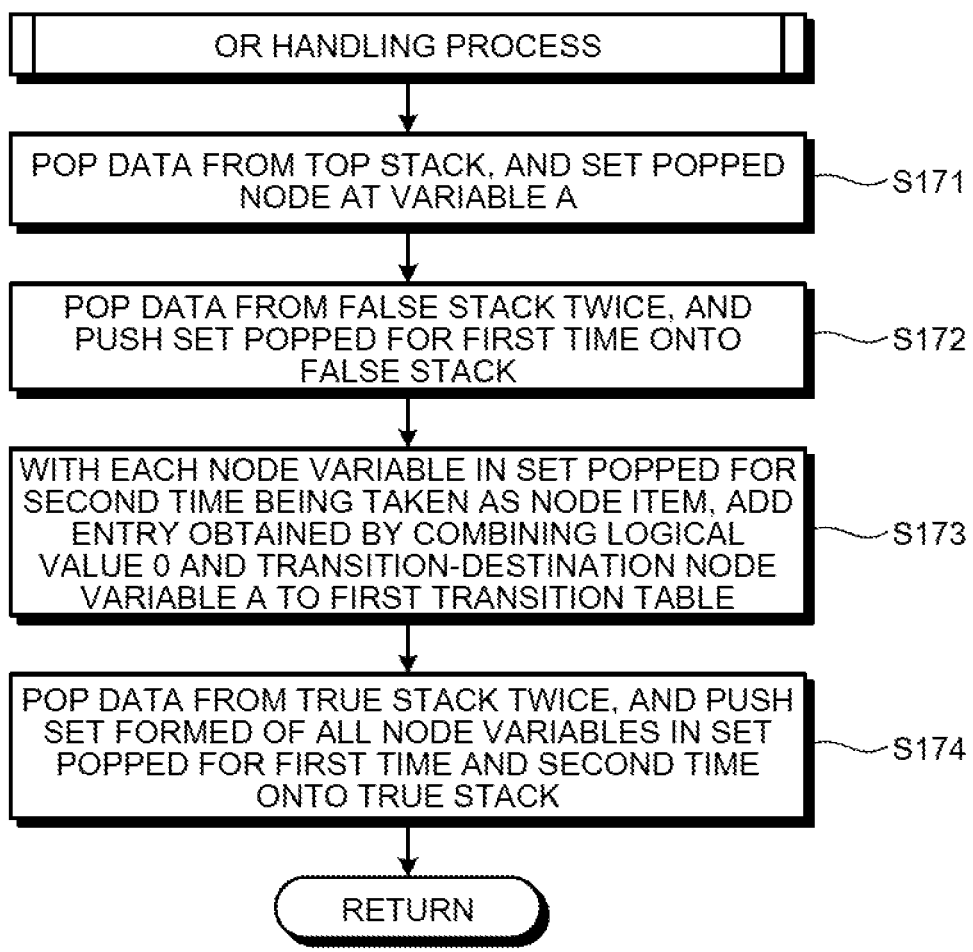
FIG. 39 is a flowchart of a procedure of an OR handling process according to the first embodiment.

Next, the OR handling process depicted at Step S135 in FIG. 35 is explained. FIG. 39 is a flowchart of a procedure of the OR handling process according to the first embodiment. As depicted in FIG. 39, the BDD constructing unit 160e pops data from the Top stack and sets the popped node at a variable A (Step S171). The BDD constructing unit 160e then pops data from the False stack twice, and pushes a set popped for the first time onto the False stack (Step S172).

Then, with each node variable in a set popped for the second time being taken as a node item, the BDD constructing unit 160e adds an entry obtained by combining of a logical value 0 and the transition-destination node variable A to the first transition table 152 (Step S173). The BDD constructing unit 160e then pops data from the True stack twice, and pushes a set formed of all node variables in a set popped for the first time and the second time onto the True stack (Step S174).

Figure 40:
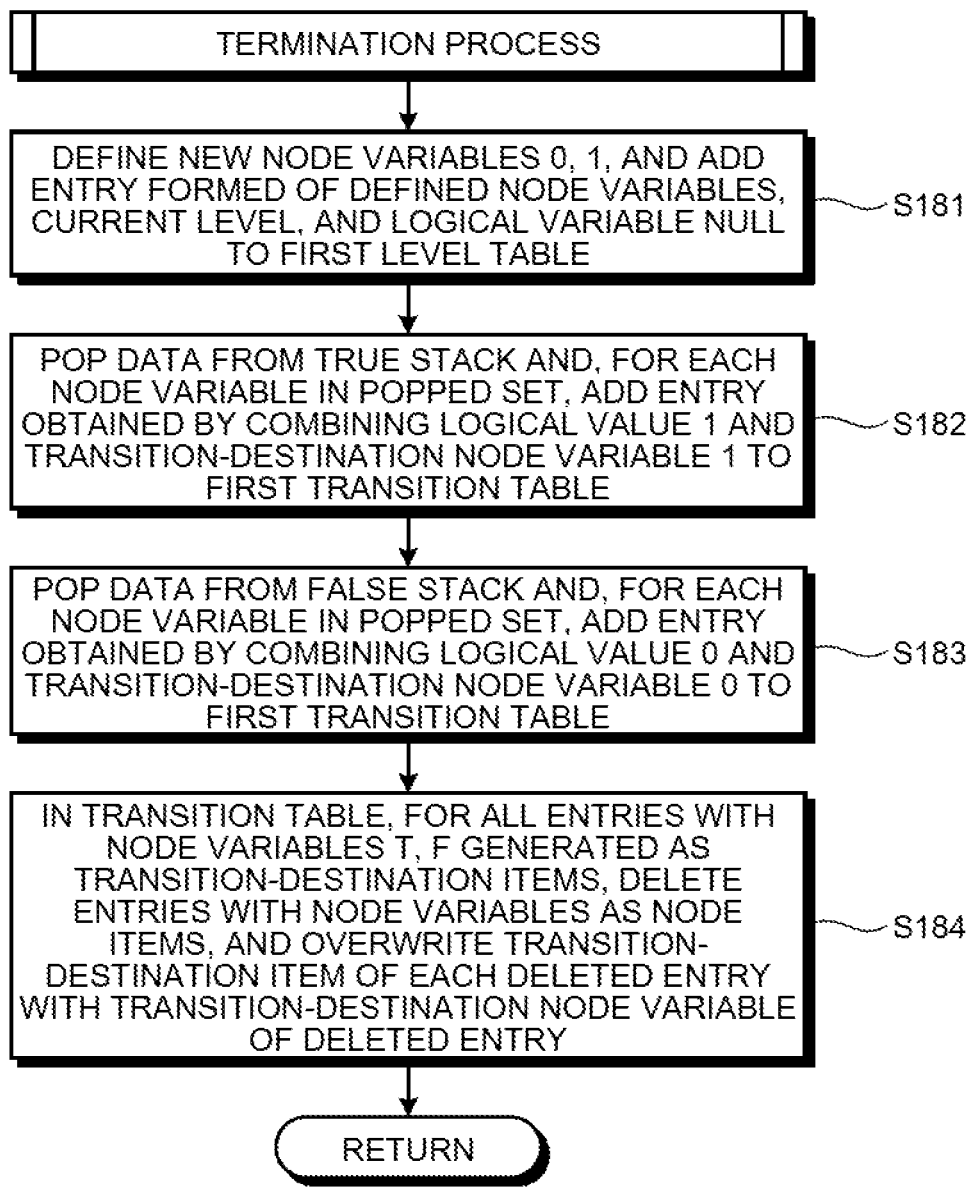
FIG. 40 is a flowchart of a procedure of a termination process according to the first embodiment.

Next, the termination process depicted at Step S139 in FIG. 35 is explained. FIG. 40 is a flowchart of the termination process according to the first embodiment. As depicted in FIG. 40, the BDD constructing unit 160e defines new node variables 0 and 1, and adds an entry formed of the defined node variables, the current level, and a logical variable NULL to the first level table 151 (Step S181). The BDD constructing unit 160e then pops data from the True stack and, for each node variable in the popped set, adds an entry obtained by combining a logical value 1 and a transition-destination node variable 1 to the first transition table 152 (Step S182).

The BDD constructing unit 160e then pops data from the False stack and, for each node variable in the popped set, adds an entry obtained by combining a logical value 0 and a transition-destination node variable 0 to the first transition table 152 (Step S183). In the first transition table 152, for all entries with node variables T and F generated as transition-destination items, the BDD constructing unit 160e deletes these entries with their node variables as node items, and then overwrites the transition-destination item of each deleted entry with the transition-destination node variable of the deleted entry (Step S184).

Figure 41:
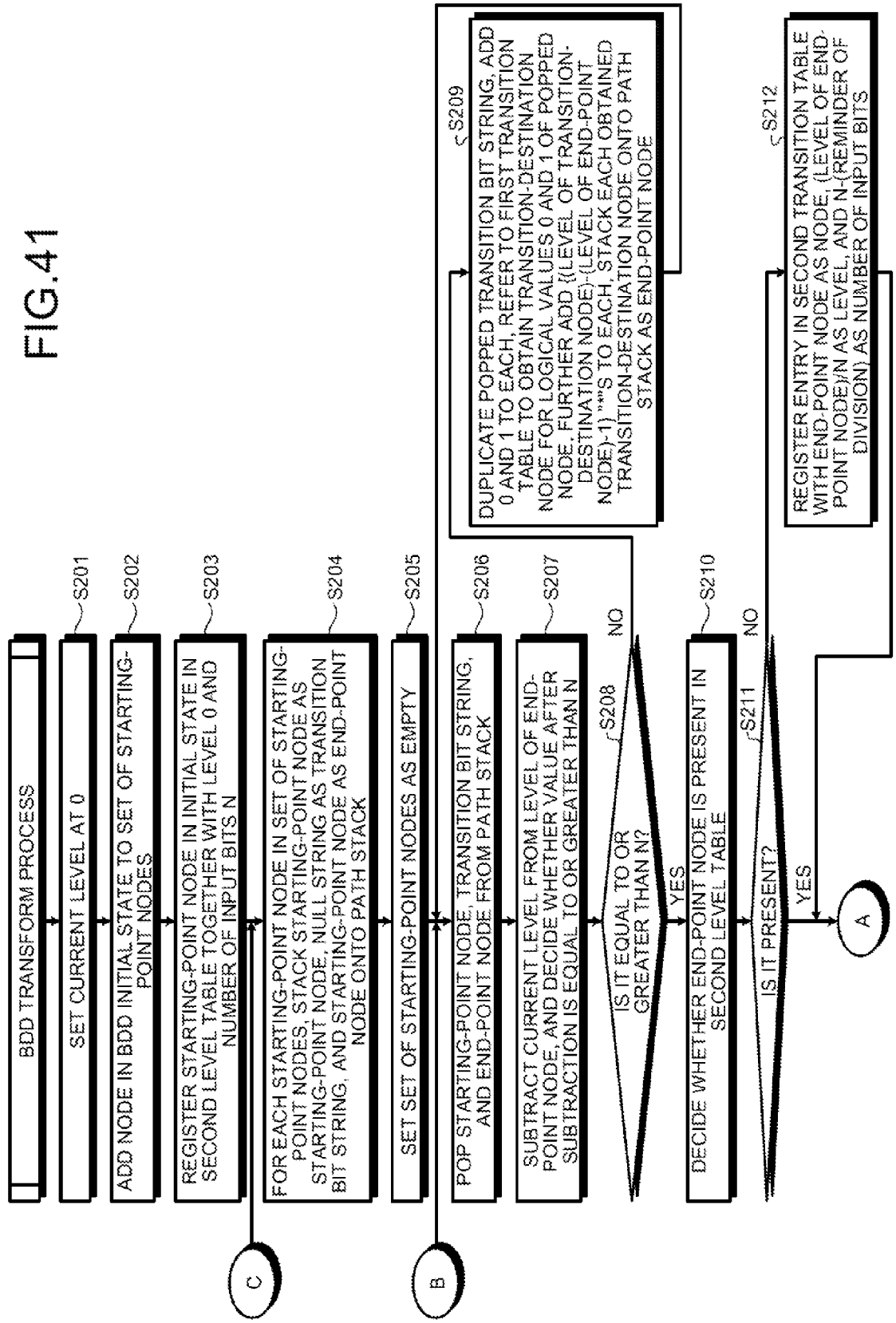
FIG. 41 is a first flowchart of a procedure of a BDD transform process according to the first embodiment.
Figure 42:
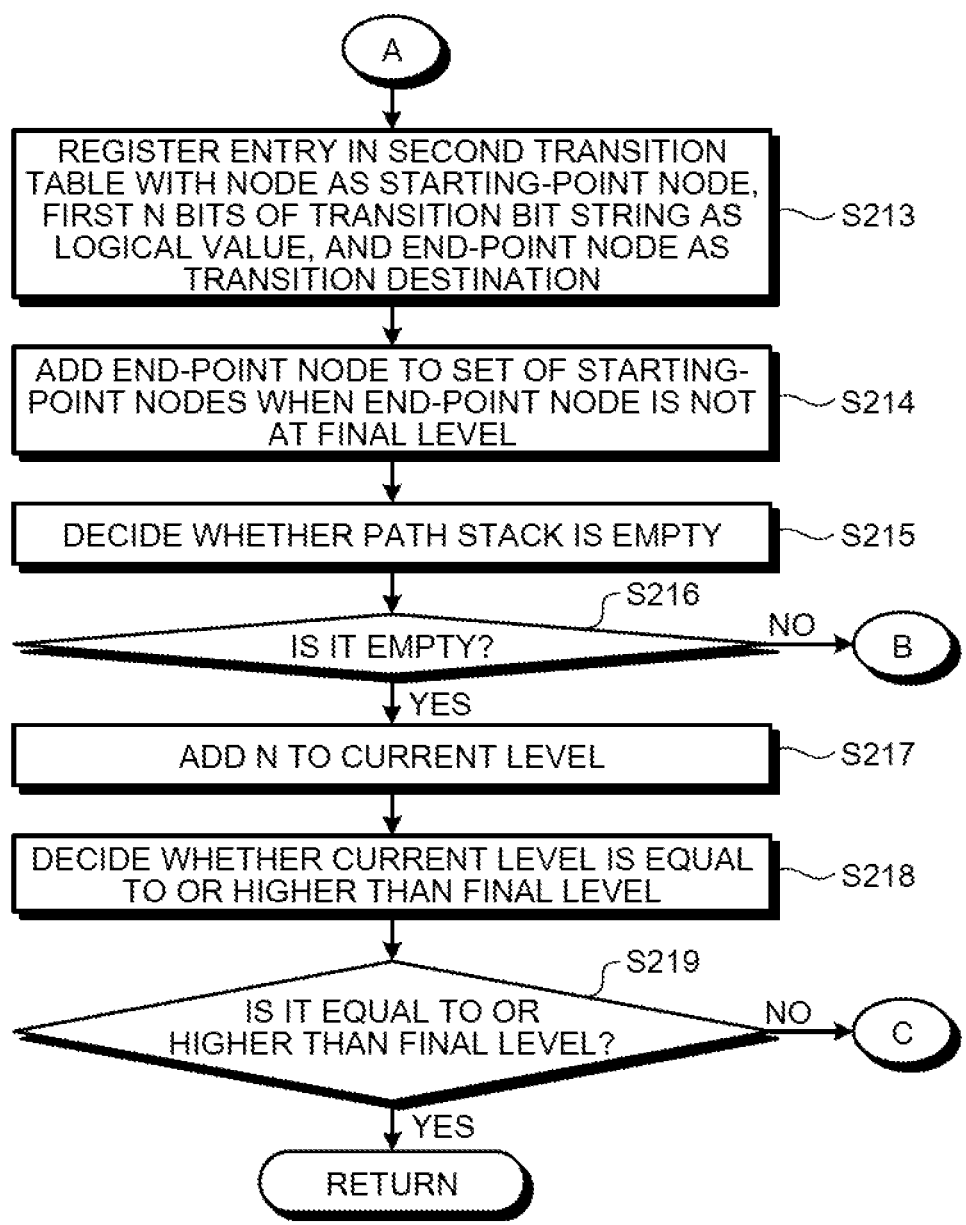
FIG. 42 is a second flowchart of the procedure of the BDD transform process according to the first embodiment.

Next, the BDD transform process depicted at Step S107 in FIG. 34 is explained. FIGS. 41 and 42 are flowcharts of a procedure of the BDD transform process according to the first embodiment. As depicted in FIG. 41, the BDD transforming unit 160f sets the current level at 0 (Step S201), and adds a node in a BDD initial state to the set of starting-point nodes (Step S202).

The BDD transforming unit 160f then registers the starting-point node in an initial state in the second level table 153 together with the level 0 and the number of input bits N (for example, 4) (Step S203). Then, for each starting-point node in the set of the starting-point nodes, the BDD transforming unit 160f stacks the starting-point node as a starting-point node, a null string as a transition bit string, and the starting-point node as an end-point node onto the path stack (Step S204), and sets the set of starting-point nodes as empty (Step S205).

Subsequently, the BDD transforming unit 160f pops the starting-point node, the transition bit string, and the end-point node from the path stack (Step S206), subtracts the current level from the level of the end-point node, and decides whether the value after subtraction is equal to or greater than N (Step S207).

When the value after subtraction is smaller than N (No at Step S208), the BDD transforming unit 160f duplicates the popped transition bit string, adds 0 and 1 to each transition bit string. The BDD transforming unit 160f then refers to the first transition table 152 to obtain transition-destination nodes for logical values 0 and 1 of the popped node, and adds n"*"s to each transition bit string, where n is given by [(the level of the transition-destination node)–(the level of the end-point node)–1]. The BDD transforming unit 160f then stacks each obtained transition-destination node onto the path stack as the end-point node (Step S209), and then goes to Step S206.

On the other hand, when the value after subtraction is equal to or greater than N (Yes at Step S208), it is decided whether the end-point node is present in the second level table 153 (Step S210). When the end-point is not present (No at Step S211), the BDD transforming unit 160f registers an entry in the second transition table 154 with the end-point node as a node in the second level table 153, (the level of the end-point node)/N as a level, and [N–(remainder of division)] as the number of input bits (Step S212), and then goes to Step S213.

On the other hand, when the end-point is present in the second level table 153 (Yes at Step S211), the BDD transforming unit 160f registers an entry in the second transition table 154 with the starting-point node as a node, first N bits of the transition bit string as a logical value, and the end-point node as a transition destination (Step S213).

When the end-point node is not at the final level, the BDD transforming unit 160f adds the end-point node to the starting-point nodes (Step S214), and decides whether the path stack is empty (Step S215). When the path stack is not empty (No at Step S216), the procedure goes to Step S206.

On the other hand, when the path stack is empty (Yes at Step S216), the BDD transforming unit 160*f* adds N to the current level (Step S217), and decides whether the current level is equal to or higher than the final level (Step S218). When the current level is lower than the final level (No at Step S219), the procedure goes to Step S204. On the other hand, when the current level is equal to or higher than the final level (Yes at Step S219), the BDD transforming unit 160*f* terminates the BDD transform process.

Figure 43:
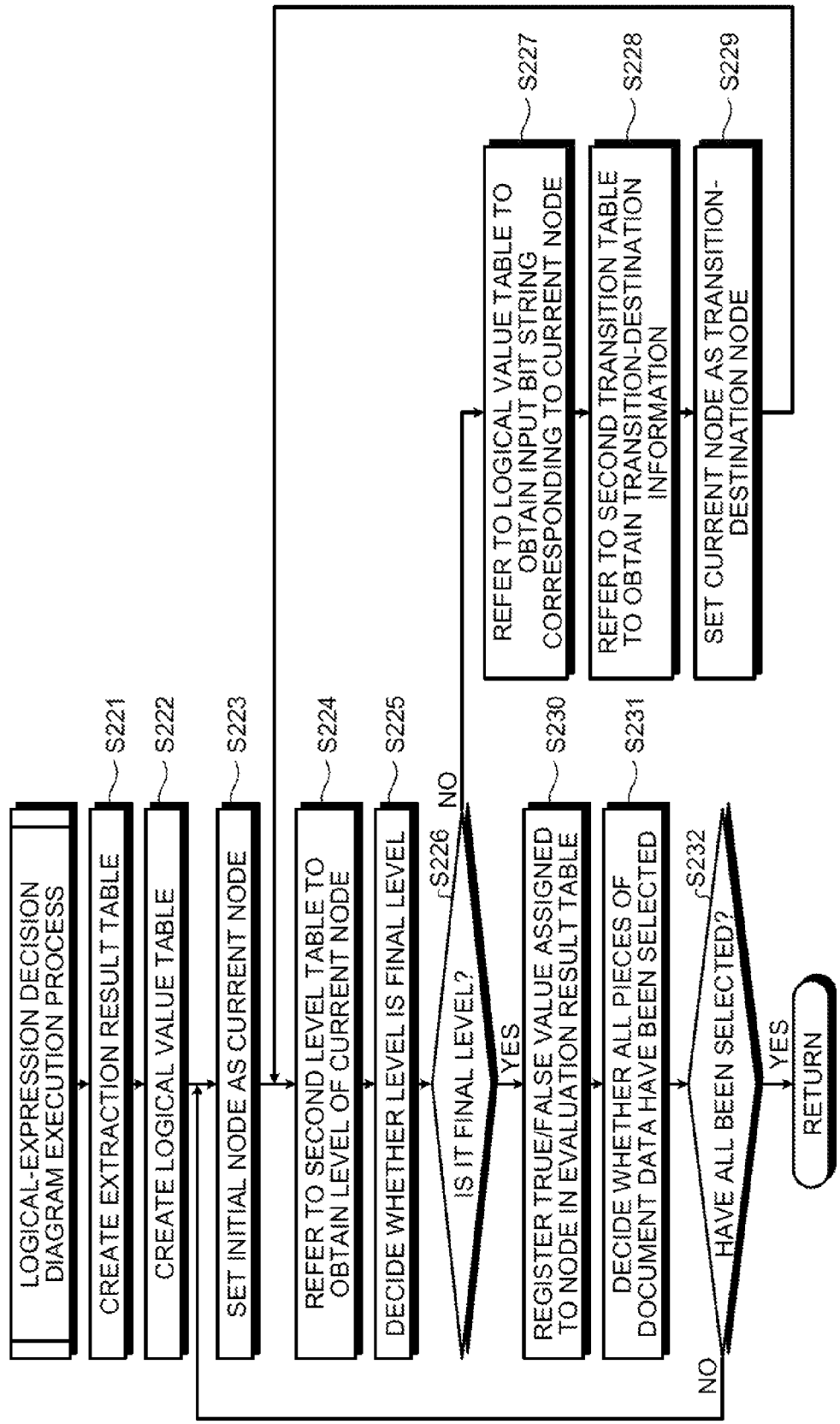
FIG. 43 is a flowchart of a procedure of a logical-expression decision diagram execution process according to the first embodiment.

Next, the logical-expression decision diagram execution process depicted at Step S108 in FIG. 34 is explained. FIG. 43 is a flowchart of a procedure of the logical-expression decision diagram execution process according to the first embodiment. As depicted in FIG. 43, the extraction-result-table generating unit 160*b* creates the extraction result table 150*d* (Step S221), and the logical-value calculating unit 160*c* creates the logical value table 150*e* (Step S222).

The diagram executing unit 160*g* then sets an initial node as the current node (Step S223), and refers to the second level table 153 to obtain the level of the current node (Step S224), thereby deciding whether the level is the final level (Step S225).

When the current level is not the final level (No at Step S226), the diagram executing unit 160*g* refers to the logical value table 150*e* to obtain an input bit string corresponding to the current node (Step S227). Also, the diagram executing unit 160*g* refers to the second transition table 154 to obtain transition-destination information (Step S228), sets the current node as a transition-destination node (Step S229), and then goes to Step S224.

On the other hand, when the current level is the final level (Yes at Step S226), the diagram executing unit 160*g* registers a true/false value assigned to the node in the evaluation result table 150*i* (Step S230). The diagram executing unit 160*g* then decides whether all pieces of document data have been selected (Step S231). If all pieces of document data have not been selected (No at Step S232), the procedure goes to Step S223. If all pieces of document data have been selected (Yes at Step S232), the logical-expression decision diagram execution process ends.

Figure 44:
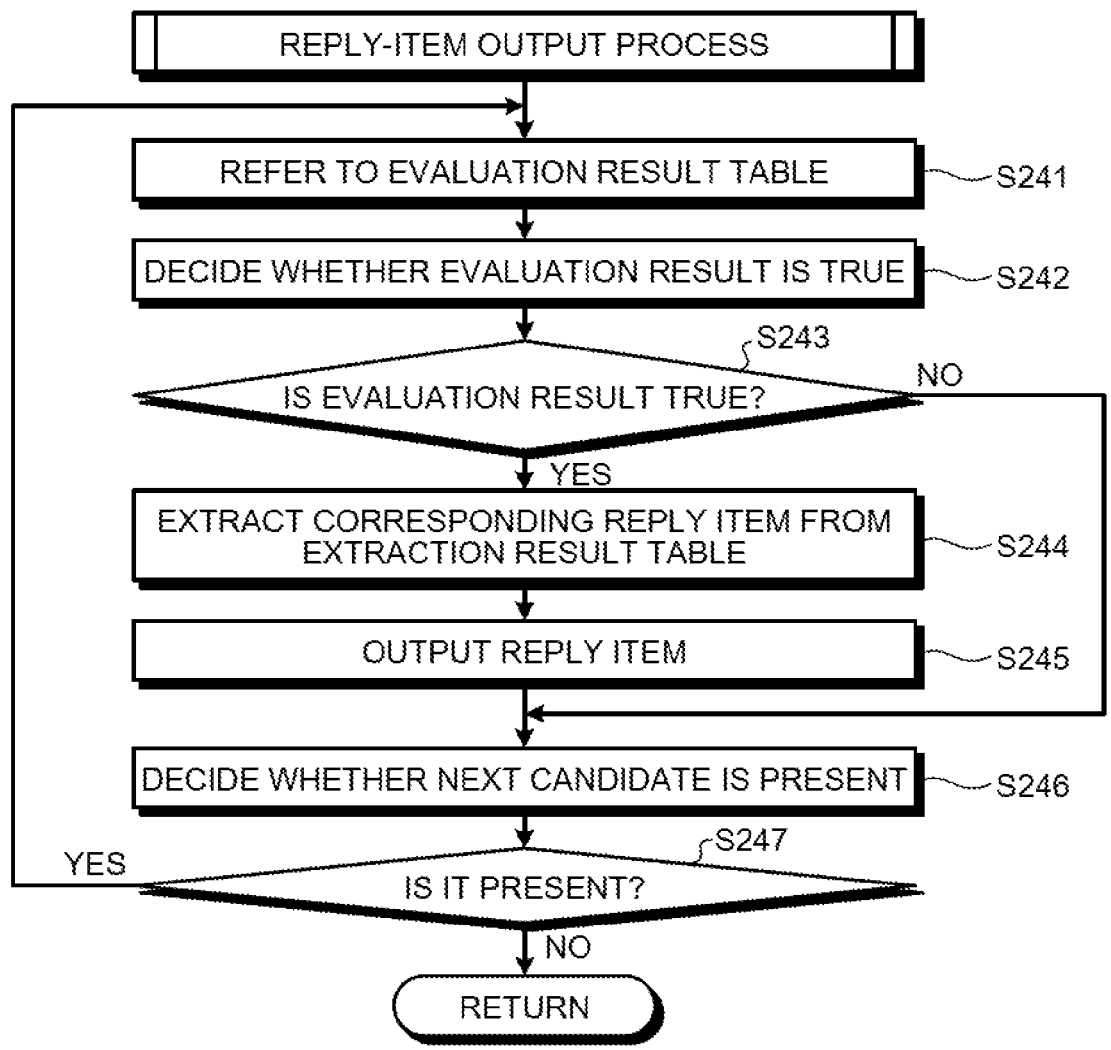
FIG. 44 is a flowchart of a procedure of a reply-item output process according to the first embodiment.

Next, the reply-item output process depicted at Step S110 in FIG. 34 is explained. FIG. 44 is a flowchart of a procedure of the reply-item output process according to the first embodiment. As depicted in FIG. 44, the search-result output unit 160*h* refers to the evaluation result table 150*i* (Step S241) to decide whether the evaluation result is true (1) (Step S242).

When the evaluation result is false (No at Step S243), the procedure goes to Step S246. On the other hand, when the evaluation result is true (Yes at Step S243), a corresponding reply item is extracted from the extraction result table 150*d* (Step S244), and the reply item is then output (Step S245).

The search-result output unit 160*h* then decides whether the next candidate is present (Step S246). When the next candidate is present (Yes at Step S247), the procedure goes to Step S241. On the other hand, when the next candidate is not present (No at Step S247), the reply-item output process ends.

As explained above, in the searching apparatus 100 according to the first embodiment, when a search query is accepted, the BDD constructing unit 160*e* creates the first diagram data 150*g* based on the BDD method. Then, based on the first diagram data 150*g*, the BDD transforming unit 160*f* creates the second diagram data 150*h* in which a bit-string notation of a true/false condition is made for a variable at each level from a node as a starting point to an arrival node at a level by predetermined plural levels further. The diagram executing unit 160*g* then compares the second diagram data 150*h* with the logical value table 150*e* to evaluate the search query. Therefore, a node transition destination can be decided for every multiple bits. Thus, the processing time required for evaluation can be reduced even when a complex search query is evaluated.

[b] Second Embodiment

Figure 45A:
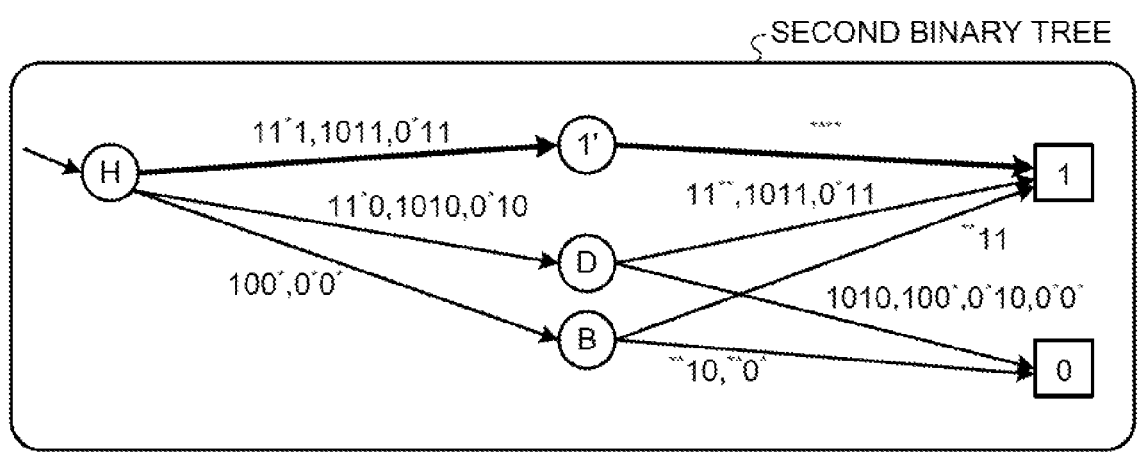
FIG. 45A is a drawing for explaining general outlines and features of a searching apparatus according to a second embodiment.

Next, general outlines and features of a searching apparatus according to a second embodiment is explained. FIG. 45A is a drawing for explaining the general outlines and features of a searching apparatus according to a second embodiment. As with the searching apparatus according to the first embodiment explained above, the searching apparatus according to the second embodiment transforms a first binary tree to generate a second binary tree capable of deciding a node transition destination for multiple bits (in the second embodiment, the digits of bit strings are fixed).

Furthermore, the searching apparatus according to the second embodiment inserts a dummy value "*" in a bit string for which a transition destination is to be decided, thereby standardizing the digits of bit strings as comparison targets by the time when a final true/false decision is made. Still further, the searching apparatus according to the second embodiment inserts a dummy node between nodes, thereby fixing the number of times of transitions from an initial node to a node at the final level.

Here, as explained in the first embodiment, when a second binary tree (refer to the lower part of FIG. 2) is created, the number of digits of bit strings as comparison targets varies by the time when a final true/false decision is made. Therefore, the searching apparatus has to decide the number of digits of bit strings for comparison for every transition-destination node, and may not efficiently make a true/false decision.

By contrast, the searching apparatus according to the second embodiment can fix the number of digits of bit strings by the time when a final true/false decision is made by inserting a dummy value "*", thereby eliminating the need of deciding the number of digits of bit strings for comparison for every transition-destination node and efficiently making a true/false decision. Also, by inserting a dummy node between nodes, the number of times of transition from the initial node to the node at the final level can be fixed, thereby facilitating control for a true/false decision.

Now compare a second binary tree in FIG. 45A with the second binary tree in FIG. 2. In FIG. 45A, a dummy node "1"' is inserted between a node "H" and a node "1", and also "**"' is inserted preceding to the bit string that makes a transition from a node "B" to a node "0". With this, the number of digits of bit strings for use by the time a final true/false decision is made is standardized as "4", and the number of times of transition is standardized as "2". By contrast, in FIG. 2, the number of digits of bit strings as a comparison target for use by the time when a final true/false decision is made is "4" or "2", and the number of times of transition is "1" or "2". Therefore, the process for a true/false decision with the second binary tree in FIG. 2 is more complex than that with the second binary tree in FIG. 45A.

Figure 45B:
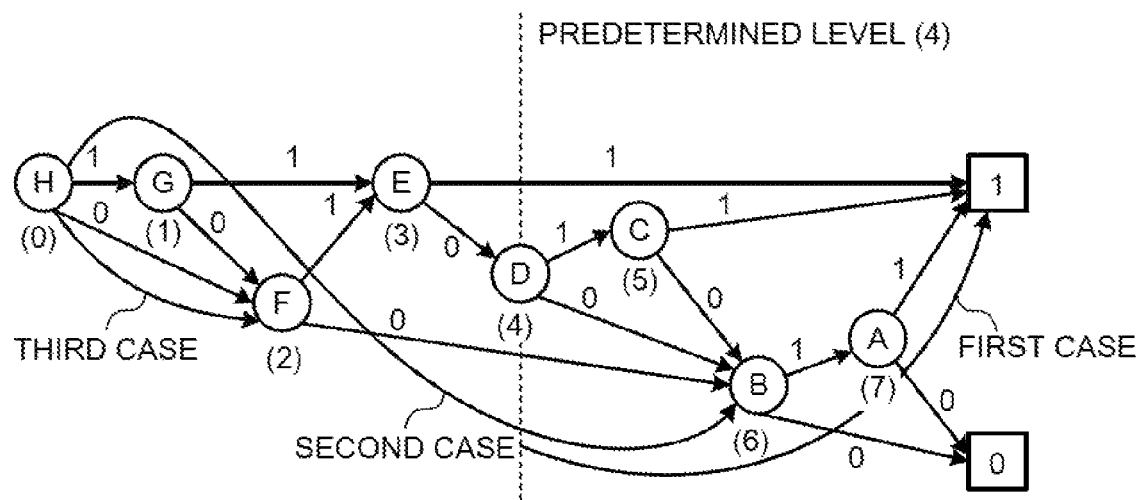
FIG. 45B is a drawing for explaining general outlines of a process when the number of digits of bit strings is standardized at a predetermined number of digits.

Next, a process of the searching apparatus when the number of digits of bit strings is standardized is explained. FIG. 45B is a drawing for explaining general outlines of the process when the number of digits of bit strings is standardized at a predetermined number of digits. Here, three cases are explained by using FIG. 45B.

First, a first case is explained in which the level of a first arrival variable exceeds a predetermined level and a bit string that makes a transition from the first arrival variable as a starting-point variable to a next second arrival variable is created. For convenience of explanation, it is assumed herein that a node "B (level 6)" is taken as a first arrival variable, 4 is taken as a predetermined level (when the number of digits of bit strings is standardized at 4), and a node "1 (level 8)" is taken as a second arrival variable.

The searching apparatus inserts two dummy values "" at the head bit of a bit string. Note that the number of dummy values "2" is given by subtracting the predetermined level "4" from the level of the first arrival variable "6". That is, the dummy bits "" are inserted at the head bit of a bit string "11" that makes a transition from the first arrival variable to the second arrival variable to create a bit string "**11", thereby standardizing the number of digits of bit strings at 4.

Next, a second case is explained in which a plurality of intermediate variables are included between the starting-point variable and the arrival variable and a bit string that makes a transition from the starting-point variable to the arrival variable is created when a level difference between the starting-point variable and the intermediate variables and a level difference between adjacent intermediate variables are 1, and the level of the arrival variable exceeds a predetermined level.

For convenience of explanation, it is assumed herein that a node "H (level 0)" is taken as a starting-point variable, nodes "G (level 1)" and "F (level 2)" are taken as intermediate variables, a node "B (level 6)" is taken as an arrival variable, and "4" is taken as a predetermined level (when the number of digits of bit strings is standardized at 4).

The searching apparatus subtracts "2" indicative of the level of the immediately-preceding intermediate variable (node F) before a transition to the arrival node (node B) from "4" indicative of the predetermined level, and further subtracts 1 from the subtraction result to obtain "1", and then inserts one dummy value "*" after a bit string "100" that makes a transition from the starting-point variable to the arrival variable, thereby creating a bit string "100*" and standardizing the number of digits of bit strings at 4.

Next, a third case is explained in which a plurality of intermediate variables are included between the starting-point variable and the arrival variable and a bit string that makes a transition from the starting-point variable to the arrival variable is created when a level difference between the level of a transition-destination variable and the level of a transition-source variable is equal to or greater than 2 and the level of the arrival variable exceeds a predetermined level.

For convenience of explanation, it is assumed herein that the node "H (level 0)" is taken as a starting-point variable, the node "F (level 2)" is taken as an intermediate variable, the node "B (level 6)" is taken as an arrival variable, and "4" is taken as a predetermined level (when the number of digits of bit strings is standardized at 4).

The searching apparatus subtracts the level of the transition-source variable from the level of the transition-destination variable, and further subtracts 1 from the subtraction result to obtain the number of dummy values, and then inserts dummy values as many as the obtained number after a bit string that makes a transition from the transition-source variable to the transition-destination variable. Specifically, "0" indicative of the level of the transition-source variable (node H) is subtracted from "2" indicative of the level of the transition-destination variable (node F), and 1 is further subtracted from the subtraction result to obtain "1". Then, one dummy value is inserted after a bit string "0" that makes a transition from the transition-source variable (node H) to the transition-destination variable (node F), thereby creating a bit string "0*".

Here, a bit string until a transition is made from the starting-point variable (node H) to the arrival variable (node B) (with the node F being taken as an intermediate node) is "0*0" by adding a bit "0" that makes a transition from the intermediate node (node F) to the arrival variable (node B) to the bit string (0*) that makes a transition from the starting-point variable (node H) to the intermediate variable (node F). To standardize the number of digits of bit strings, the searching apparatus adds "*" after the bit string "0*0*" to create a bit string "0*0*" that makes a transition from the starting-point variable (node H) to the arrival variable (node B), thereby standardizing the number of digits of bit strings at 4.

Figure 46:
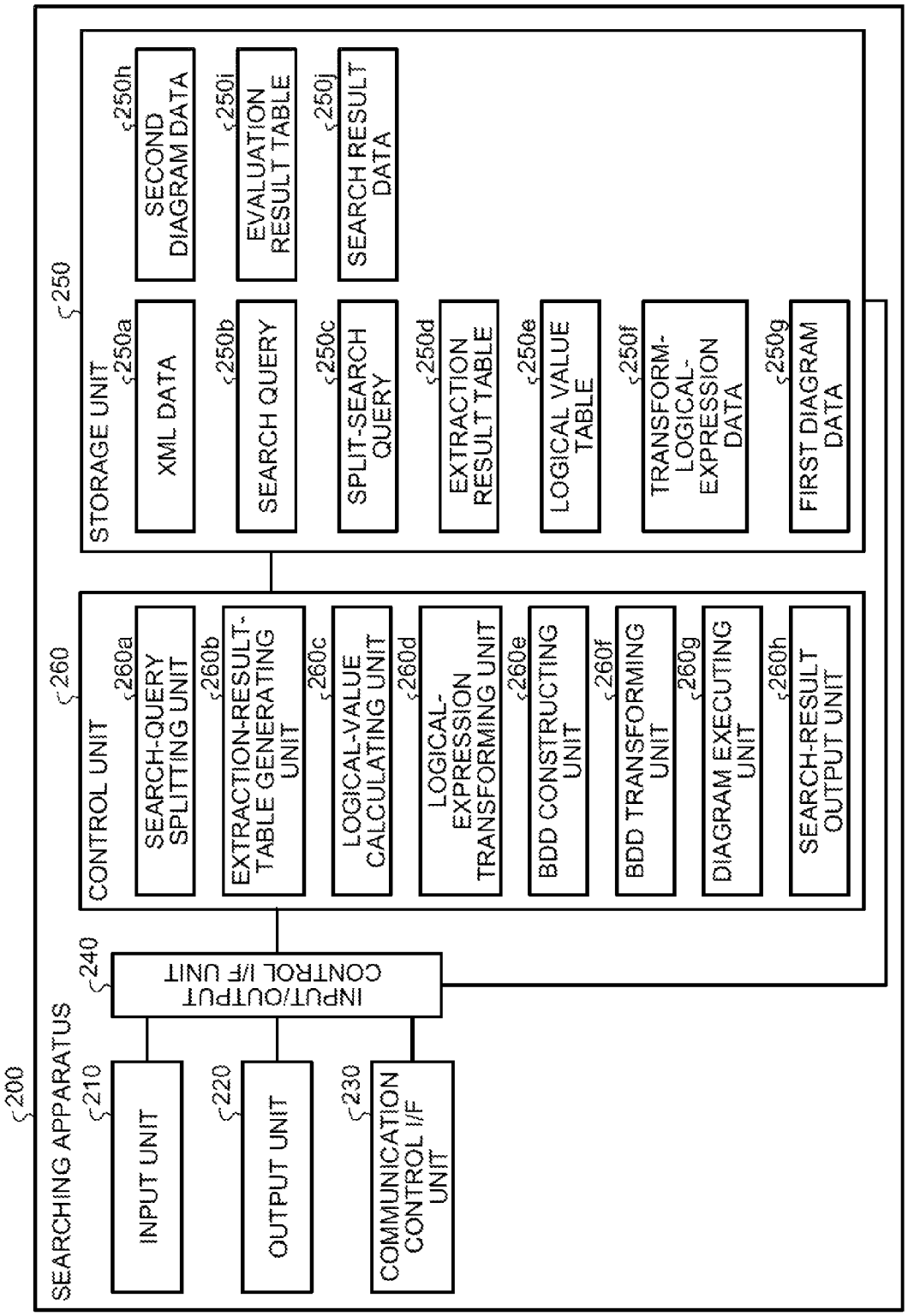
FIG. 46 is a functional block diagram of the configuration of the searching apparatus according to the second embodiment.

Next, the configuration of the searching apparatus according to the second embodiment is explained. FIG. 46 is a functional block diagram of the configuration of a searching apparatus 200 according to the second embodiment. Note that the configuration of a search system including the searching apparatus 200 according to the second embodiment is similar to the configuration of the search system according to the first embodiment.

As depicted in FIG. 46, this searching apparatus 200 includes an input unit 210, an output unit 220, a communication control I/F unit 230, an input/output control I/F unit 240, a storage unit 250, and a control unit 260.

The input unit 210 is a unit that is used to input various information, and is configured of, for example, a keyboard, a mouse, and a microphone. Note that a monitor (output unit 220), which will be explained below, also achieves a pointing device function in conjunction with the mouse.

The output unit 220 is a unit that outputs various information, and is configured of, for example, a monitor (or display or touch panel) and a loudspeaker. The communication control I/F unit 230 is a unit that mainly controls communication with the terminal device 60. Note the input/output control I/F unit 240 is a unit that controls inputs and outputs of data by the input unit 210, the output unit 220, the communication control I/F unit 230, the storage unit 250, and the control unit 260.

The storage unit 250 is a unit that stores therein data and programs required by the control unit 260 for various processes. In particular, in close association with the present invention, the storage unit 250 includes XML data 250a, a search query 250b, a split-search query 250c, an extraction result table 250d, a logical value table 250e, transform-logical-expression data 250f, first diagram data 250g, second diagram data 250h, an evaluation result table 250i, and a search result data 250j.

The XML data 250a is document data having a hierarchical structure with elements being divided with element identifiers "<", "</", and others. The data structure of this XML data 250a is similar to the data structure of the XML data 150a depicted in FIG. 5.

The search query 250b represents data for retrieving data at a check position from the XML data 250a. The data structure of this search query 250b is similar to the data structure of the search query 150b depicted in FIG. 6.

The split-search query 250c is data obtained as a result of splitting the search query 250b by a search-query splitting unit 260a (which will be explained further below). The data structure of this split-search query 250c is similar to the data structure of the split-search query 150c depicted in FIG. 7.

The extraction result table 250d is a table for managing information as an evaluation target of the evaluation expression (refer to q1 and q2 in FIG. 7) and an item for reply to the terminal device 60 when the evaluation result of the search query 250b is true. The data structure of this extraction result table 250d is similar to the data structure of the extraction result table 150d depicted in FIG. 8.

The logical value table 250e is a table for managing the evaluation result of each evaluation expression. The data structure of this logical value table 250e is similar to the data structure of the logical value table 150e depicted in FIG. 9.

The transform-logical-expression data 250f is data obtained by transforming the logical expression (refer to FIG. 7) to a reverse Polish notation by the logical-expression transforming unit 160d (which will be explained further below). The first diagram data 250g is data created by a BDD constructing unit 260e (which will be explained further below). The data structure of this first diagram data 250g is similar to that of the first diagram data 150g depicted in FIG. 10. Note in the second embodiment that the first diagram data 250g includes a first level table 251 and a first transition table 252.

The second diagram data 250h is data obtained by transforming the first diagram data 250g by a BDD transforming unit 260f (which will be explained further below). This second diagram data 250h includes a second transition table 253. With a binary tree defined by the second transition table 253, an evaluation can be performed for every multiple bits.

The evaluation result table 250i is a table for managing the evaluation result for each of the data types (for example, Data 0 to Data 2). The data structure of this evaluation result table 250i is similar to the data structure of the evaluation result table 150i depicted in FIG. 11.

The search result data 250j is data for storing the search result of the search query 250b with respect to the XML data 250a. The data structure of the search result data 250j is similar to the data structure of the search result data 150j depicted in FIG. 12.

The control unit 260 has an internal memory for storing programs and control data that define various process procedures, and executes various processes with these programs and control data. In particular, in close association with the present invention, as depicted in FIG. 46, the control unit 260 includes the search-query splitting unit 260a, an extraction-result-table generating unit 260b, a logical-value calculating unit 260c, a logical-expression transforming unit 260d, the BDD constructing unit 260e, the BDD transforming unit 260f, a diagram executing unit 260g, and a search-result output unit 260h.

Among these units, the search-query splitting unit 260a is a unit that stores a search query received from the terminal device 60 in the storage unit 250 as the search query 250b, and uses a known technique to generate the split-search query 250c from the search query 250b.

The extraction-result-table generating unit 260b is a unit that extracts first to n-th (n>1) logical variables and reply items from the XML data 250a based on an evaluation expression contained in the split-search query 250c to generate the extraction result table 250d.

The logical-value calculating unit 260c is a unit that compares the evaluation expression of the split-search query 250c with the extraction result table 250d to calculate a logical value of the extraction expression. The logical-value calculating unit 260c registers the calculation result in the logical value table 250e.

The logical-expression transforming unit 260d is a unit that transforms the logical expression (for example, Q=q1 and q2) of the search query by using the reverse Polish notation. When the logical-expression transforming unit 260d uses the reverse Polish notation to transform the logical expression "q1&q2", "q1q2&" is obtained. The logical-expression transforming unit 260d then stores the transformed logical expression data in the storage unit 250 as the transform-logical-expression data 250f.

The BDD constructing unit 260e is a unit that generates the first diagram data 250g based on the transform-logical-expression data 250f. The BDD constructing unit 260e sequentially reads characters of the transform-logical-expression data 250f (logical expression in reverse Polish notation) from the head, and registers various information in the first level table 251 and the first transition table 252 according to the read characters (such as logical operators and logical variables). Specific details of the process of the BDD constructing unit 260e are similar to those of the BDD constructing unit 160e depicted in the first embodiment, and therefore are not explained herein.

The BDD transforming unit 260f is a unit that transforms the first diagram data 250g to generate the second diagram data 250h so as to transform the first binary tree to a second binary tree (refer to FIGS. 45A and 45B). FIG. 47 is a drawing of an example of the data structure of the second diagram data 250h according to the second embodiment. Note that the second diagram data 250h depicted in FIG. 47 is obtained by transforming the first diagram data 150g depicted in FIG. 26 that is identical to the first diagram data 250g.

As depicted in FIG. 47, the second diagram data 250h includes the second transition table 253. The second transition table 253 is a table for managing nodes, a logical value input to each node, and a transition destination of the node corresponding to the logical value.

For example, in the first row of the second transition table 253, information is registered indicating that a transition is made to the node "1'" when the bit string input to the node "H" is "11*1 (or 1101 or 1111)". Note that the binary tree (second binary tree) depicted in FIGS. 45A and 45B is defined by the second transition table 253 depicted in FIG. 47.

Figure 48:
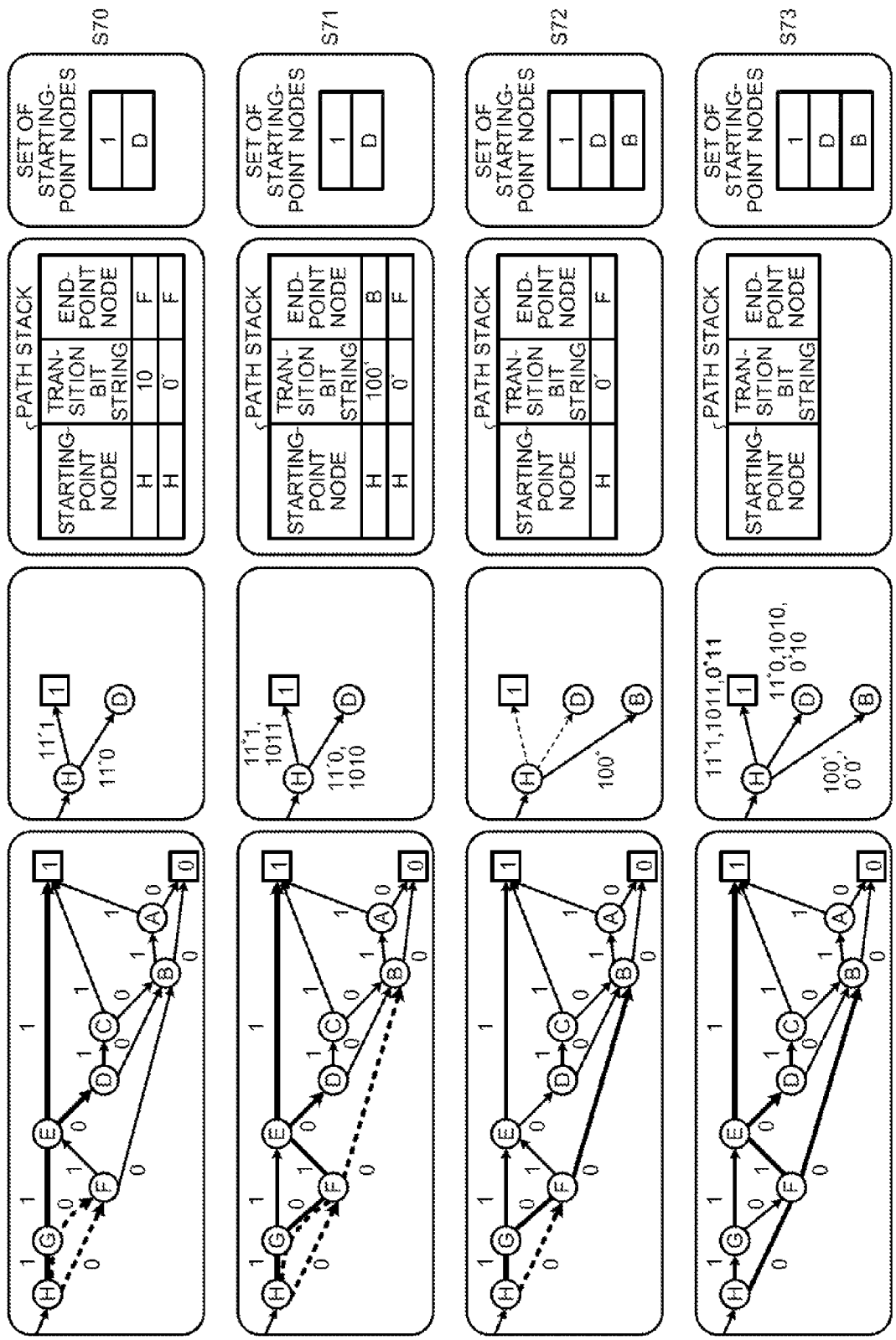
FIG. 48 is a first drawing for explaining a process of a BDD transforming unit according to the second embodiment.
Figure 49:
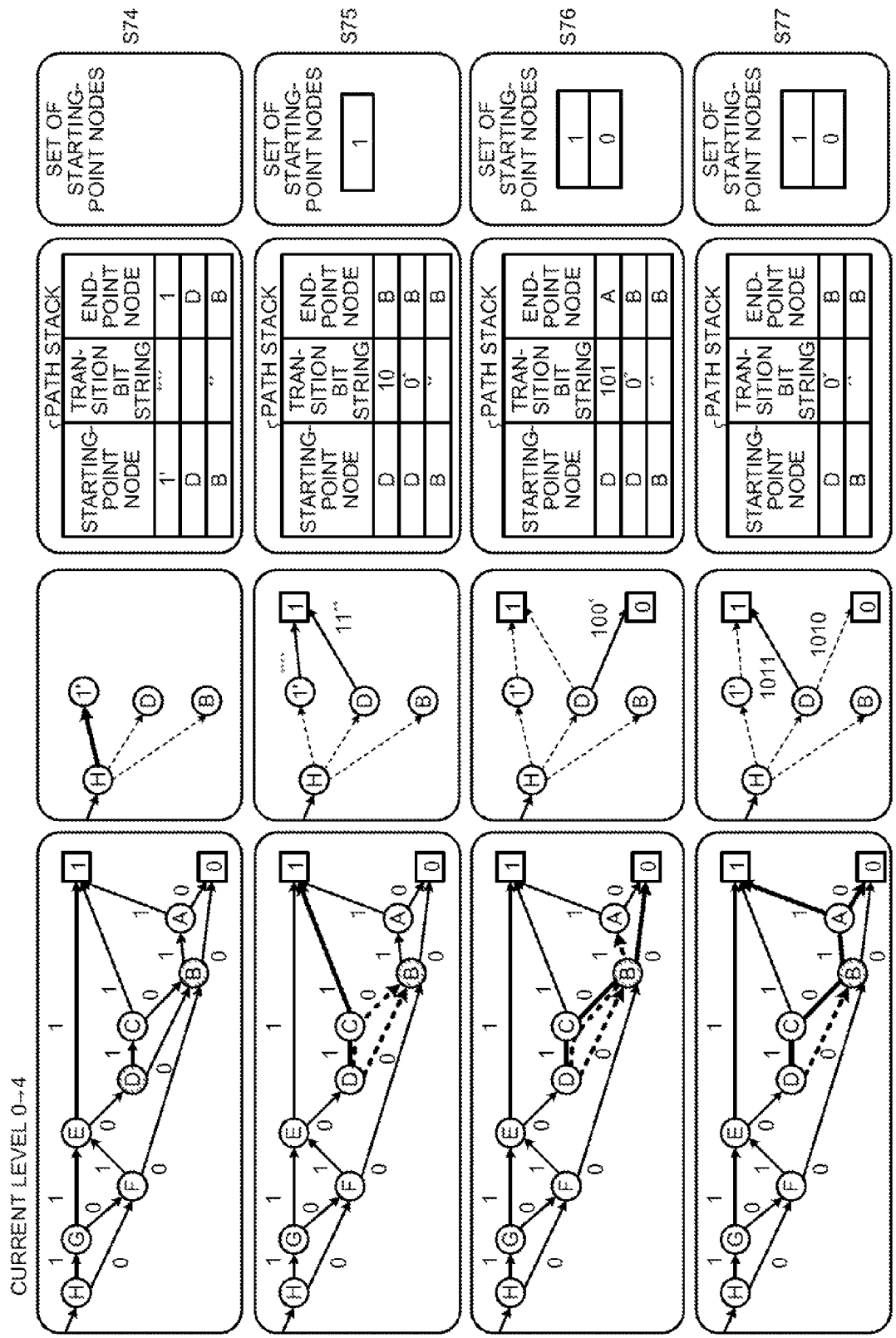
FIG. 49 is a second drawing for explaining the process of the BDD transforming unit according to the second embodiment.
Figure 50:
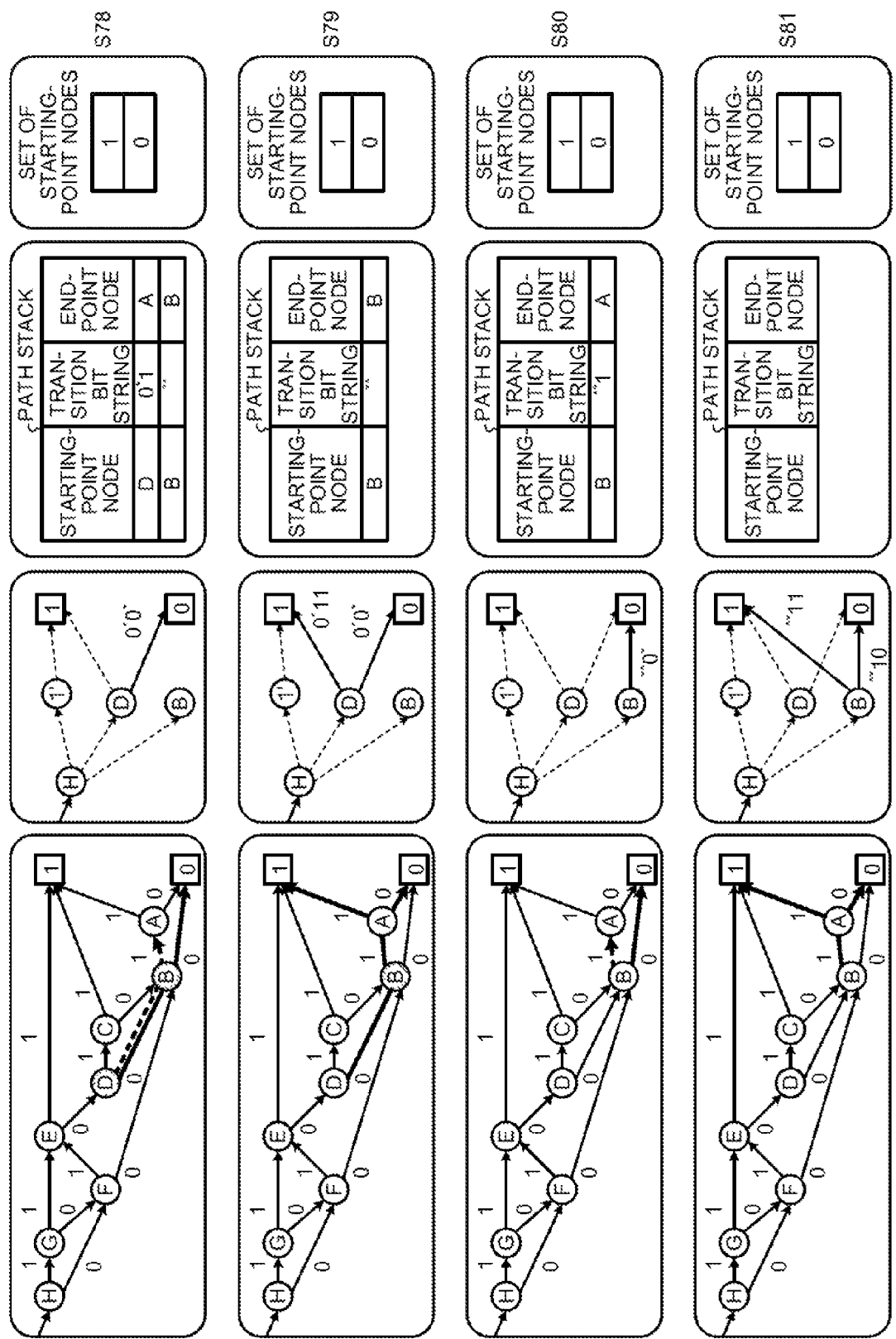
FIG. 50 is a third drawing for explaining the process of the BDD transforming unit according to the second embodiment.

Next, by using a specific example, a process of the BDD transforming unit 260f is explained. FIGS. 48 to 50 are drawings for explaining the process of the BDD transforming unit 260f according to the first embodiment. With the process explained with reference to FIGS. 48 to 50 being performed, the second diagram data 250h depicted in FIG. 47 is created from the first diagram data depicted in FIG. 26, thereby deciding a transition-destination node for every multiple bits. Also, the bit string and the number of times of transition are standardized, thereby reducing the load on the searching apparatus 200 at the time of data search. First, as depicted in FIG. 48, the BDD transforming unit 260f sets the current level at "0", and adds the node "H" in a BDD initial state to the set of starting-point nodes.

For a starting-point node of the set of starting-point nodes "H", the BDD transforming unit 260f stacks the starting-point node "H" as a starting-point node, "empty" as a transition bit string, and the starting-point node "H" as an end-point node on a path stack, and empties the set of starting-point nodes. Here, the path stack is retained in the BDD transforming unit 260f, where the starting-point node, the transition bit string, and the end-point node are stored in association with each other.

The BDD transforming unit 260f pops the starting-point node "H", the transition bit string "empty", and the end-point node "H" from the path stack, duplicates the transition bit string, and adds 0 and 1 to each transition bit string. Also, the BDD transforming unit 260f refers to the first transition table 252 to obtain transition-destination nodes "G" and "F" for logical values "0" and "1" of the popped end-point node "H", and adds n"*"s to each transition bit string, where n is given by [(the level of the transition-destination node)–(the level of the end-point node "H")–1]. When a level "0" of the end-point node "H" is subtracted from a level "2" of the transition-destination node "F", "2" is obtained. Therefore, one "*" is added to the last of the bit string "0". Then, the starting-point node "H", the bit string "0*", and the end-point node "F" are stacked on the path stack.

On the other hand, when the BDD transforming unit 260*f* subtracts a level "0" of the end-point node "H" from a level "1" of the transition-destination node "G", "1" is obtained. Therefore, zero "*"s are added to the last of the bit string "1". Then, the starting-point node "H", the bit string "1", and the end-point node "G" are stacked on the path stack (similar to the path stack at Step S41 in FIG. 27).

The BDD transforming unit 260*f* pops the starting-point node "H", the transition bit string "1", and the end-point node "G" from the path stack, duplicates the transition bit string, and adds 0 and 1 to each transition bit string. Also, the BDD transforming unit 260*f* refers to the first transition table 252 to obtain transition-destination nodes "E" and "F" for logical values "0" and "1" of the transition-destination node of the popped end-point node "G", and adds n"*"s to each transition bit string, where n is given by [(the level of the transition-destination node)−(the level of the end-point node "G")−1]. When the level "1" of the end-point node "G" is subtracted from the level "2" of the transition-destination node "F", "1" is obtained. Therefore, zero "*"s are added to the last of the bit string "10". Then, the starting-point node "H", the bit string "10", and the end-point node "F" are stacked on the path stack.

On the other hand, when the BDD transforming unit 260*f* subtracts the level "1" of the end-point node "G" from a level "3" of the transition-destination node "E", "2" is obtained. Therefore, one "*" is added to the last of the bit string "11". Then, the starting-point node "H", the bit string "11*", and the end-point node "E" are stacked on the path stack (similar to the path stack at Step S42 in FIG. 27).

The BDD transforming unit 260*f* pops the starting-point node "H", the transition bit string "11*", and the end-point node "E" from the path stack, duplicates the transition bit string, and adds 0 and 1 to each transition bit string. Also, the BDD transforming unit 260*f* refers to the first transition table 252 to obtain transition-destination nodes "1" and "D" for logical values "0" and "1" of the transition-destination node of the popped end-point node "E", and adds n"*"s to each transition bit string, where n is given by [(the level of the transition-destination node)−(the level of the end-point node "E")−1]. When the level "3" of the end-point node "E" is subtracted from a level "4" of the transition-destination node "D", "1" is obtained. Therefore, zero "*"s are added to the last of the bit string "11*0". Then, the starting-point node "H", the bit string "11*0", and the end-point node "D" are stacked on the path stack.

On the other hand, when the BDD transforming unit 260*f* subtracts the level "3" of the end-point node "E" from a level "8" of the transition-destination node "1", "5" is obtained. Therefore, four "*"s are added to the last of the bit string "11*1". Then, the starting-point node "H", the bit string "11*1" (a fifth bit and thereafter from the head of a bit string is cut), and the end-point node "1" are stacked on the path stack (similar to the path stack at Step S43 in FIG. 27).

The BDD transforming unit 260*f* pops the starting-point node "H", the transition bit string "11*1", and the end-point node "1" from the path stack. Here, since [(the level of the end-point node "1")−(the current level "0")] is equal to or greater than N (4), the BDD transforming unit 260*f* registers the starting-point node "H", a logical value "11*1", and a transition destination (end-point node) "1" in the second transition table 253. Also, the BDD transforming unit 260*f* adds the end-point node "1" to the set of starting-point nodes.

The BDD transforming unit 260*f* pops the starting-point node "H", the transition bit string "11*0", and the end-point node "D" from the path stack. Here, since [(the level of the end-point node "D")−(the current level "0")] is equal to or greater than N (4), the BDD transforming unit 260*f* registers the starting-point node "H", a logical value "11*0", and a transition destination (end-point node) "D" in the second transition table 253. Also, the BDD transforming unit 260*f* registers the end-point node "D" in the set of starting-point nodes (Step S70 in FIG. 48).

The BDD transforming unit 260*f* pops the starting-point node "H", the transition bit string "10", and the end-point node "F" from the path stack, duplicates the transition bit string, and adds 0 and 1 to each transition bit string. Also, the BDD transforming unit 260*f* refers to the first transition table 252 to obtain transition-destination nodes "E" and "B" for logical values "0" and "1" of the transition-destination node of the popped end-point node "F", and adds n"*"s to each transition bit string, where n is given by [(the level of the transition-destination node)−(the level of the end-point node "F")−1]. When the level "2" of the end-point node "F" is subtracted from the level "3" of the transition-destination node "E", "1" is obtained. Therefore, zero "*"s are added to the last of the bit string "101". Then, the starting-point node "H", the bit string "101", and the end-point node "E" are stacked on the path stack.

Next, the BDD transforming unit 260*f* pops the starting-point node "H", the bit string "101", and the end-point node "E", duplicates the transition bit string, and adds 0 and 1 to each transition bit string. Also, the BDD transforming unit 260*f* refers to the first transition table 252 to obtain transition-destination nodes "D" and "1" for logical values "0" and "1" of the transition-destination node of the popped end-point node "E", and adds n"*"s to each transition bit string, where n is given by [(the level of the transition-destination node)−(the level of the end-point node "E")−1].

When the BDD transforming unit 260*f* subtracts a level "3" of the end-point node "E" from a level "4" of the transition-destination node "D", "1" is obtained. Therefore, zero "*"s are added to the last of the bit string "1010". Then, the starting-point node "H", the bit string "1010", and the end-point node "D" are stacked on the path stack.

The BDD transforming unit 260*f* pops the starting-point node "H", the transition bit string "1010", and the end-point node "D" from the path stack. Here, since [(the level of the end-point node "D")−(the current level "0")] is equal to or greater than N (4), the BDD transforming unit 260*f* registers the starting-point node "H", a logical value "1010", and the transition destination (end-point node) "D" in the second transition table 253.

Meanwhile, when the BDD transforming unit 260*f* subtracts the level "3" of the end-point node "E" from a level "8" of the transition-destination node "1", "5" is obtained. Therefore, four "*"s are added to the last of the bit string "1011". Then, the starting-point node "H", the bit string "1011" (a fifth bit and thereafter from the head of a bit string is cut), and the end-point node "1" are stacked on the path stack.

The BDD transforming unit 260*f* pops the starting-point node "H", the transition bit string "1011", and the end-point node "1" from the path stack. Here, since [(the level of the end-point node "1")−(the current level "0")] is equal to or greater than N (4), the BDD transforming unit 260*f* registers the starting-point node "H", a logical value "1011", and the transition destination (end-point node) "1" in the second transition table 253.

Also, when the BDD transforming unit 260*f* subtracts a level "2" of the end-point node "F" from a level "6" of the transition-destination node "B", "4" is obtained. Therefore, three "*"s are added to the last of the bit string "100". Then, the starting-point node "H", the bit string "100*" (a fifth bit and thereafter from the head of a bit string is cut), and the end-point node "B" are stacked on the path stack (Step S71 in FIG. 48).

The BDD transforming unit 260f pops the starting-point node "H", the transition bit string "100*", and the end-point node "B" from the path stack. Here, since [(the level of the end-point node "B")–(the current level "0")] is equal to or greater than N (4), the BDD transforming unit 260f registers the starting-point node "H", a logical value "100*", the transition destination (end-point node) "B" in the second transition table 253. Also, the BDD transforming unit 260f registers the end-point node "B" in the set of starting-point nodes (Step S72 in FIG. 48).

The BDD transforming unit 260f pops the starting-point node "H", the transition bit string "0*", and the end-point node "F" from the path stack, duplicates the transition bit string, and adds 0 and 1 to each transition bit string. Also, the BDD transforming unit 260f refers to the first transition table 252 to obtain transition-destination nodes "E" and "B" for logical values "0" and "1" of the transition-destination node of the popped end-point node "F", and adds n"*"s to each transition bit string, where n is given by [(the level of the transition-destination node)–(the level of the end-point node "F")–1]. When a level "2" of the end-point node "F" is subtracted from the level "6" of the transition-destination node "B", "4" is obtained. Therefore, three "*"s are added to the last of the bit string "0*0". Then, the starting-point node "H", the bit string "0*0*" (a fifth bit and thereafter from the head of a bit string is cut), and the end-point node "B" are stacked on the path stack.

The BDD transforming unit 260f pops the starting-point node "H", the transition bit string "0*0*", and the end-point node "B" from the path stack. Here, since [(the level of the end-point node "B")–(the current level "0")] is equal to or greater than N (4), the BDD transforming unit 260f registers the starting-point node "H", a logical value "0*0*", and the transition destination (end-point node) "B" in the second transition table 253.

On the other hand, when the BDD transforming unit 260f subtracts a level "2" of the end-point node "F" from a level "3" of the transition-destination node "E", "1" is obtained. Therefore, zero "*"s are added to the last of the bit string "0*1". Then, the starting-point node "H", the bit string "0*1", and the end-point node "E" are stacked on the path stack.

The BDD transforming unit 260f pops the starting-point node "H", the bit string "0*1", and the end-point node "E" from the path stack, duplicates the transition bit string, and adds 0 and 1 to each transition bit string. Also, the BDD transforming unit 260f refers to the first transition table 252 to obtain transition-destination nodes "D" and "1" for logical values "0" and "1" of the transition-destination node of the popped end-point node "E", and adds n"*"s to each transition bit string, where n is given by [(the level of the transition-destination node)–(the level of the end-point node "E")–1]. When the level "3" of the end-point node "E" is subtracted from a level "4" of the transition-destination node "D", "1" is obtained. Therefore, zero "*"s are added to the last of the bit string "0*10". Then, the starting-point node "H", the bit string "0*10", and the end-point node "D" are stacked on the path stack.

The BDD transforming unit 260f pops the starting-point node "H", the transition bit string "0*10", and the end-point node "D" from the path stack. Here, since [(the level of the end-point node "D")–(the current level "0")] is equal to or greater than N (4), the BDD transforming unit 260f registers the starting-point node "H", a logical value "0*10", and the transition destination (end-point node) "D" in the second transition table 253.

On the other hand, when the BDD transforming unit 260f subtracts the level "3" of the end-point node "E" from a level "8" of the transition-destination node "1", "5" is obtained. Therefore, four "*"s are added to the last of the bit string "0*11". Then, the starting-point node "H", the bit string "0*11" (a fifth bit and thereafter from the head of a bit string is cut), and the end-point node "1" are stacked on the path stack.

The BDD transforming unit 260f pops the starting-point node "H", the transition bit string "0*11", and the end-point node "D" from the path stack. Here, since [(the level of the end-point node "1")–(the current level "0")] is equal to or greater than N (4), the BDD transforming unit 260f registers the starting-point node "H", a logical value "0*11", and the transition destination (end-point node) "1" in the second transition table 253 (Step S73 in FIG. 48).

The BDD transforming unit 260f sets the current level at "4", extracts the node "B" from the set of starting-point nodes as a starting-point node. Then, "*"s of [(a level "6" of the starting-point node "B")–(the current level "4")] are taken as a transition bit string. The BDD transforming unit 260f then stacks the starting-point node "B", the transition bit string "**", and the end-point node "B" onto the path stack.

The BDD transforming unit 260f extracts the node "D" from the set of starting-point nodes as a starting-point node. Then, "*"s of [(a level "4" of the starting-point node "D")–(the current level "4")] are taken as a transition bit string (in this case, since the subtraction result is 0, the transition bit string is empty). The BDD transforming unit 260f then stacks the starting-point node "D", the transition bit string "empty", and the end-point node "D" onto the path stack.

The BDD transforming unit 260f extracts the node "1" from the set of starting-point nodes as a starting-point node. Here, the difference between the level of the starting-point node "1" and the current level is equal to or greater than 4 (N). Therefore, the BDD transforming unit 260f defines a dummy node "1'" of the node "1". The BDD transforming unit 260f then refers to the second transition table 253 to replace an item where the transition destination is the node "1" by the dummy node "1'".

Also, the BDD transforming unit 260f stacks the dummy node "1'" as a starting-point node, "*" N (in the second embodiment, 4) bits (****) as a transition bit string, and the starting-point node "1" as an end-point node onto the path stack (Step S74 in FIG. 49).

The BDD transforming unit 260f pops the starting-point node "1'", the transition bit string "**", and the end-point node "1" from the path stack, and registers the starting-point node "1'", the transition bit string "**", and the end-point node "1" in the second transition table 253.

The BDD transforming unit 260f pops the starting-point node "D", the transition bit string "empty", and the end-point node "D" from the path stack. The BDD transforming unit 260f then duplicates the popped transition bit string, and adds 0 and 1 to each transition bit string. Also, the BDD transforming unit 260f refers to the first transition table 252 to obtain transition-destination nodes "B" and "C" for logical values "0" and "1" of the popped end-point node "D", and adds n"*"s to each transition bit string, where n is given by [(the level of the transition-destination node)–(the level of the end-point node "D")–1].

When the BDD transforming unit 260f subtracts a level "4" of the end-point node "D" from a level "6" of the transition-destination node "B", "2" is obtained. Therefore, one "*" is added to the last of the bit string "0". Then, the starting-point node "D", the bit string "0*", and the end-point node "B" are stacked on the path stack.

Also, when the BDD transforming unit 260f subtracts the level "4" of the end-point node "D" from a level "5" of the transition-destination node "C", "1" is obtained. Therefore, zero "*"s are added to the last of the bit string "1". Then, the starting-point node "D", the bit string "1", and the end-point node "C" are stacked on the path stack.

The BDD transforming unit 260f pops the starting-point node "D", the bit string "1", and the end-point node "C" from the path stack. The BDD transforming unit 260f then duplicates the popped transition bit string, and adds 0 and 1 to each transition bit string. Also, the BDD transforming unit 260f refers to the first transition table 252 to obtain transition-destination nodes "B" and "1" for logical values "0" and "1" of the popped end-point node "C", and adds n"*"s to each transition bit string, where n is given by [(the level of the transition-destination node)−(the level of the end-point node "C")−1].

When the BDD transforming unit 260f subtracts a level "5" of the end-point node "C" from the level "6" of the transition-destination node "B", "1" is obtained. Therefore, zero "*"s are added to the last of the bit string "10". Then, the starting-point node "D", the bit string "10", and the end-point node "B" are stacked on the path stack.

On the other hand, when the BDD transforming unit 260f subtracts the level "5" of the end-point node "C" from a level "8" of the transition-destination node "1", "3" is obtained. Therefore, two "*"s are added to the last of the bit string "11". Then, the starting-point node "D", the bit string "11**", and the end-point node "1" are stacked on the path stack.

The BDD transforming unit 260f pops the starting-point node "D", the bit string "11", and the end-point node "1" from the path stack. Here, since [(the level of the end-point node "1")−(the current level "4")] is equal to or greater than N (4), the BDD transforming unit 260f registers the starting-point node "D", a logical value "11", and the transition destination (end-point node) "1" in the second transition table 253. Also, the node "1" is registered in the set of starting-point nodes (Step S75 in FIG. 49).

The BDD transforming unit 260f pops the starting-point node "D", the bit string "10", and the end-point node "B" from the path stack. The BDD transforming unit 260f then duplicates the popped transition bit string, and adds 0 and 1 to each transition bit string. Also, the BDD transforming unit 260f refers to the first transition table 252 to obtain transition-destination nodes "0" and "A" for logical values "0" and "1" of the popped end-point node "B" and adds n"*"s to each transition bit string, where n is given by [(the level of the transition-destination node)−(the level of the end-point node "B")−1].

When the BDD transforming unit 260f subtracts a level "6" of the end-point node "B" from a level "8" of the transition-destination node "0", "2" is obtained. Therefore, one "*" is added to the last of the bit string "100". Then, the starting-point node "D", the bit string "100*", and the end-point node "0" are stacked on the path stack.

The BDD transforming unit 260f pops the starting-point node "D", the transition bit string "100*", and the end-point node "0" from the path stack. Here, since [(the level of the end-point node "0")−(the current level "4")] is equal to or greater than N (4), the BDD transforming unit 260f registers the starting-point node "D", a logical value "100*", and the transition destination (end-point node) "0" in the second transition table 253. Also, the node "0" is registered in the set of starting-point nodes.

On the other hand, when the BDD transforming unit 260f subtracts the level "6" of the end-point node "B" from a level "7" of the transition-destination node "A", "1" is obtained. Therefore, zero "*"s are added to the last of the bit string "101". Then, the starting-point node "D", the bit string "101", and the end-point node "A" are stacked on the path stack (Step S76 in FIG. 49).

The BDD transforming unit 260f pops the starting-point node "D", the bit string "101", and the end-point node "A" from the path stack, duplicates the popped transition bit string, and adds 0 and 1 to each transition bit string. Also, the BDD transforming unit 260f refers to the first transition table 252 to obtain transition-destination nodes "0" and "1" for logical values "0" and "1" of the popped end-point node "A". When the BDD transforming unit 260f subtracts a level "7" of the end-point node "A" from a level "8" of the transition-destination node "0", "1" is obtained. Therefore, zero "*"s are added to the last of the bit string "1010". Then, the starting-point node "D", the bit string "1010", and the end-point node "0" are stacked on the path stack.

The BDD transforming unit 260f pops the starting-point node "D", the transition bit string "1010", and the end-point node "0" from the path stack. Here, since [(the level of the end-point node "0")−(the current level "4")] is equal to or greater than N (4), the BDD transforming unit 260f registers the starting-point node "D", a logical value "1010", and the transition destination (end-point node) "0" in the second transition table 253.

On the other hand, when the BDD transforming unit 260f subtracts the level "7" of the end-point node "A" from a level "8" of the transition-destination node "1", "1" is obtained. Therefore, zero "*"s are added to the last of the bit string "1011". Then, the starting-point node "D", the bit string "1011", and the end-point node "1" are stacked on the path stack.

The BDD transforming unit 260f pops the starting-point node "D", the transition bit string "1011", and the end-point node "1" from the path stack. Here, since [(the level of the end-point node "1")−(the current level "4")] is equal to or greater than N (4), the BDD transforming unit 260f registers the starting-point node "D", a logical value "1011", and the transition destination (end-point node) "1" in the second transition table 253 (Step S77 in FIG. 49).

The BDD transforming unit 260f pops the starting-point node "D", the transition bit string "0*", and the end-point node "B" from the path stack, duplicates the transition bit string, and adds 0 and 1 to each transition bit string. Also, the BDD transforming unit 260f refers to the first transition table 252 to obtain transition-destination nodes "0" and "A" for logical values "0" and "1" of the popped end-point node "B". When the BDD transforming unit 260f subtracts a level "6" of the end-point node "B" from the level "8" of the transition-destination node "0", "2" is obtained. Therefore, one "*" is added to the last of the bit string "0*0". Then, the starting-point node "D", the bit string "0*0*", and the end-point node "0" are stacked on the path stack.

The BDD transforming unit 260f pops the starting-point node "D", the bit string "0*0*", and the end-point node "0" from the path stack. Here, since [(the level of the end-point node "0")−(the current level "4")] is equal to or greater than N (4), the BDD transforming unit 260f registers the starting-point node "D", a logical value "0*0*", and the transition destination (end-point node) "0" in the second transition table 253.

On the other hand, when the BDD transforming unit 260*f* subtracts the level "6" of the end-point node "B" from a level "7" of the transition-destination node "A", "1" is obtained. Therefore, zero "*"s are added to the last of the bit string "0*1". Then, the starting-point node "D", the bit string "0*1", and the end-point node "A" are stacked on the path stack (Step S78 in FIG. 50).

The BDD transforming unit 260*f* pops the starting-point node "D", the transition bit string "0*1", and the end-point node "A" from the path stack, duplicates the transition bit string, and adds 0 and 1 to each transition bit string. Also, the BDD transforming unit 260*f* refers to the first transition table 252 to obtain transition-destination nodes "1" and "0" for logical values "0" and "1" of the popped end-point node "A". When the BDD transforming unit 260*f* subtracts the level "7" of the end-point node "A" from the level "8" of the transition-destination node "0", "1" is obtained. Therefore, zero "*"s are added to the last of the bit string "0*10". Then, the starting-point node "D", the bit string "0*10", and the end-point node "0" are stacked on the path stack.

The BDD transforming unit 260*f* pops the starting-point node "D", the bit string "0*10", and the end-point node "0" from the path stack. Here, since [(the level of the end-point node "0")−(the current level "4")] is equal to or greater than N (4), the BDD transforming unit 260*f* registers the starting-point node "D", a logical value "0*10", and the transition destination (end-point node) "0" in the second transition table 253.

On the other hand, when the BDD transforming unit 260*f* subtracts a level "7" of the end-point node "A" from a level "8" of the transition-destination node "1", "1" is obtained. Therefore, zero "*"s are added to the last of the bit string "0*11". Then, the starting-point node "D", the bit string "0*11", and the end-point node "1" are stacked on the path stack.

The BDD transforming unit 260*f* pops the starting-point node "D", the bit string "0*11", and the end-point node "1" from the path stack. Here, since [(the level of the end-point node "1")−(the current level "4")] is equal to or greater than N (4), the BDD transforming unit 260*f* registers the starting-point node "D", a logical value "0*11", and the transition destination (end-point node) "1" in the second transition table 253 (Step S79 in FIG. 50).

The BDD transforming unit 260*f* pops the starting-point node "B", the transition bit string "**", and the end-point node "B" from the path stack, duplicates the transition bit string, and adds 0 and 1 to each transition bit string. Also, the BDD transforming unit 260*f* refers to the first transition table 252 to obtain transition-destination nodes "0" and "A" for logical values "0" and "1" of the popped end-point node "B". Since the BDD transforming unit 260*f* subtracts the level "6" of the end-point node "B" from the level "7" of the transition-destination node "A", "1" is obtained. Therefore, zero "*"s are added to the last of the bit string "1". Then, the starting-point node "B", the bit string "1", and the end-point node "A" are stacked on the path stack.

On the other hand, when the BDD transforming unit 260*f* subtracts the level "6" of the end-point node "B" from the level "8" of the transition-destination node "0", "2" is obtained. Therefore, one "*" is added to the last of the bit string "0". Then, the starting-point node "B", the bit string "0*", and the end-point node "0" are stacked on the path stack.

The BDD transforming unit 260*f* pops the starting-point node "B", the bit string "**0*", and the end-point node "0" from the path stack. Here, since [(the level of the end-point node "0")−(the current level "4")] is equal to or greater than N (4), the BDD transforming unit 260*f* registers the starting-point node "B", a logical value "**0*", and the transition destination (end-point node) "0" in the second transition table 253 (Step S80 in FIG. 50).

The BDD transforming unit 260*f* pops the starting-point node "B", the transition bit string "**1", and the end-point node "A" from the path stack, duplicates the transition bit string, and adds 0 and 1 to each transition bit string. Also, the BDD transforming unit 260*f* refers to the first transition table 252 to obtain transition-destination nodes "0" and "1" for logical values "0" and "1" of the popped end-point node "A". Here, when the BDD transforming unit 260*f* subtracts the level "7" of the end-point node "A" from the level "8" of the transition-destination node "0", "1" is obtained. Therefore, zero "*"s are added to the last of the bit string "10". Then, the starting-point node "B", the bit string "10" (a fifth bit and thereafter from the head of a bit string is cut), and the end-point node "0" are stacked on the path stack.

The BDD transforming unit 260*f* pops the starting-point node "B", the bit string "**10", and the end-point node "0" from the path stack. Here, since [(the level of the end-point node "0")−(the current level "4")] is equal to or greater than N (4), the BDD transforming unit 260*f* registers the starting-point node "B", a logical value "**10", and the transition destination (end-point node) "0" in the second transition table 253.

On the other hand, when the BDD transforming unit 260*f* subtracts the level "6" of the end-point node "B" from the level "8" of the transition-destination node "1", "2" is obtained. Therefore, one "*" is added to the last of the bit string "11". Then, the starting-point node "B", the bit string "11" (a fifth bit and thereafter from the head of a bit string is cut), and the end-point node "1" are stacked on the path stack.

The BDD transforming unit 260*f* pops the starting-point node "B", the bit string "**11", and the end-point node "1" from the path stack. Here, since [(the level of the end-point node "1")−(the current level "4")] is equal to or greater than N (4), the BDD transforming unit 260*f* registers the starting-point node "B", a logical value "**11", and the transition destination (end-point node) "1" in the second transition table 253 (Step S81 in FIG. 50).

As such, the BDD transforming unit 260*f* performs the process from Steps S70 to S81, thereby the first diagram data 150*g* depicted in FIG. 26 that is identical to the first diagram data 250*g* is transformed to the second diagram data 250*h* depicted in FIG. 47.

Referring back to explanation of FIG. 46, the diagram executing unit 260*g* is a unit that compares the logical value table 250*e* with the second diagram data 250*h* to decide whether the final logical value is "1 (true)". Note that the diagram executing unit 260*g* according to the second embodiment is different from the diagram executing unit 160*g* according to the first embodiment in that a decision is made by using a bit string of a predetermined number of digits.

The diagram executing unit 260*g* then detects in the evaluation result table 250*i* a reply item corresponding to a data type for which the decision result is "1", and then stores the detected reply item in the storage unit 250 as the search result data 250*j*. For example, when the decision result of a data type "Data 2" is "1", a reply item "third development department" is stored as the search result data 250*j*.

Figure 51:
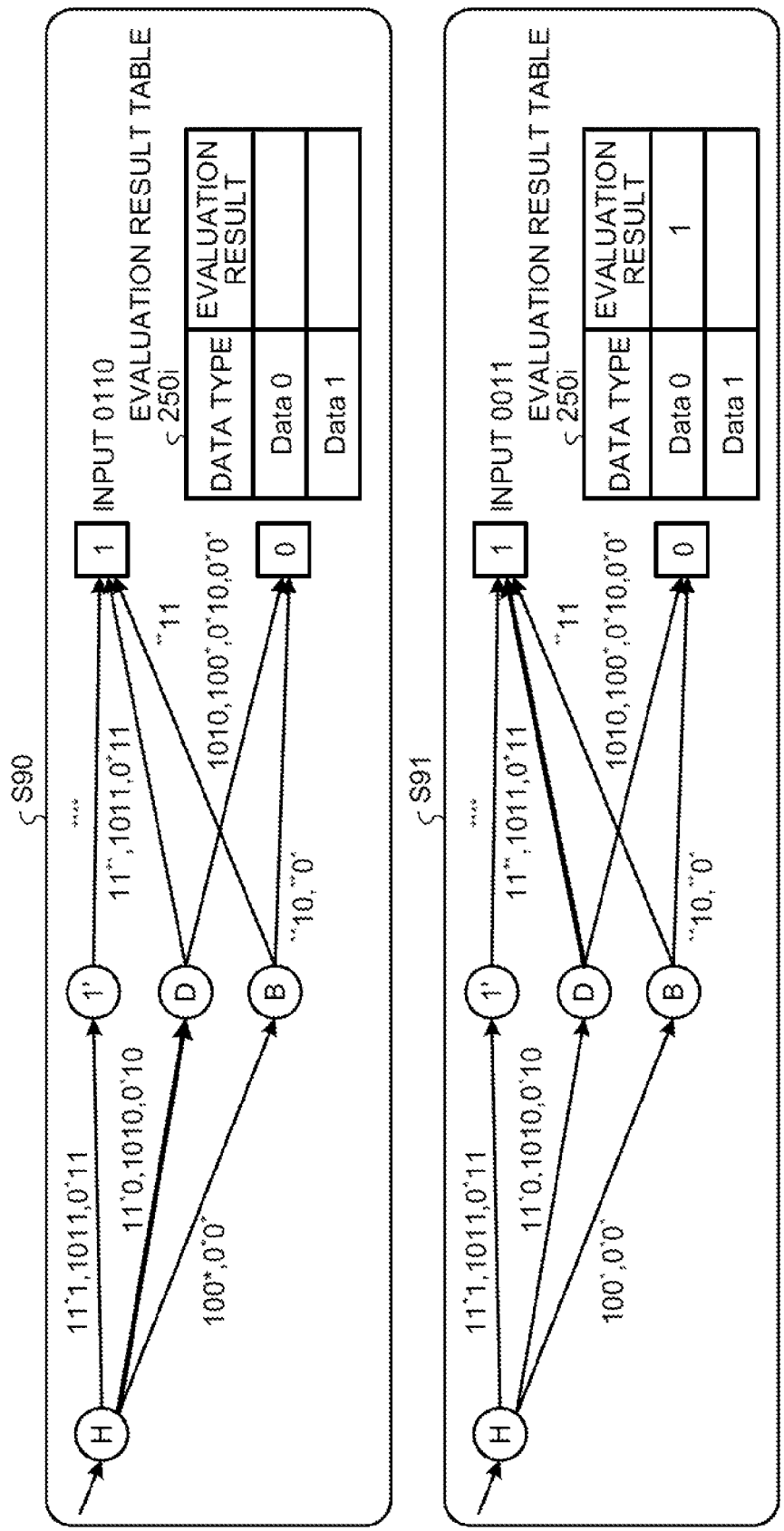
FIG. 51 is a first drawing for explaining a process of a diagram executing unit according to the second embodiment.
Figure 52:
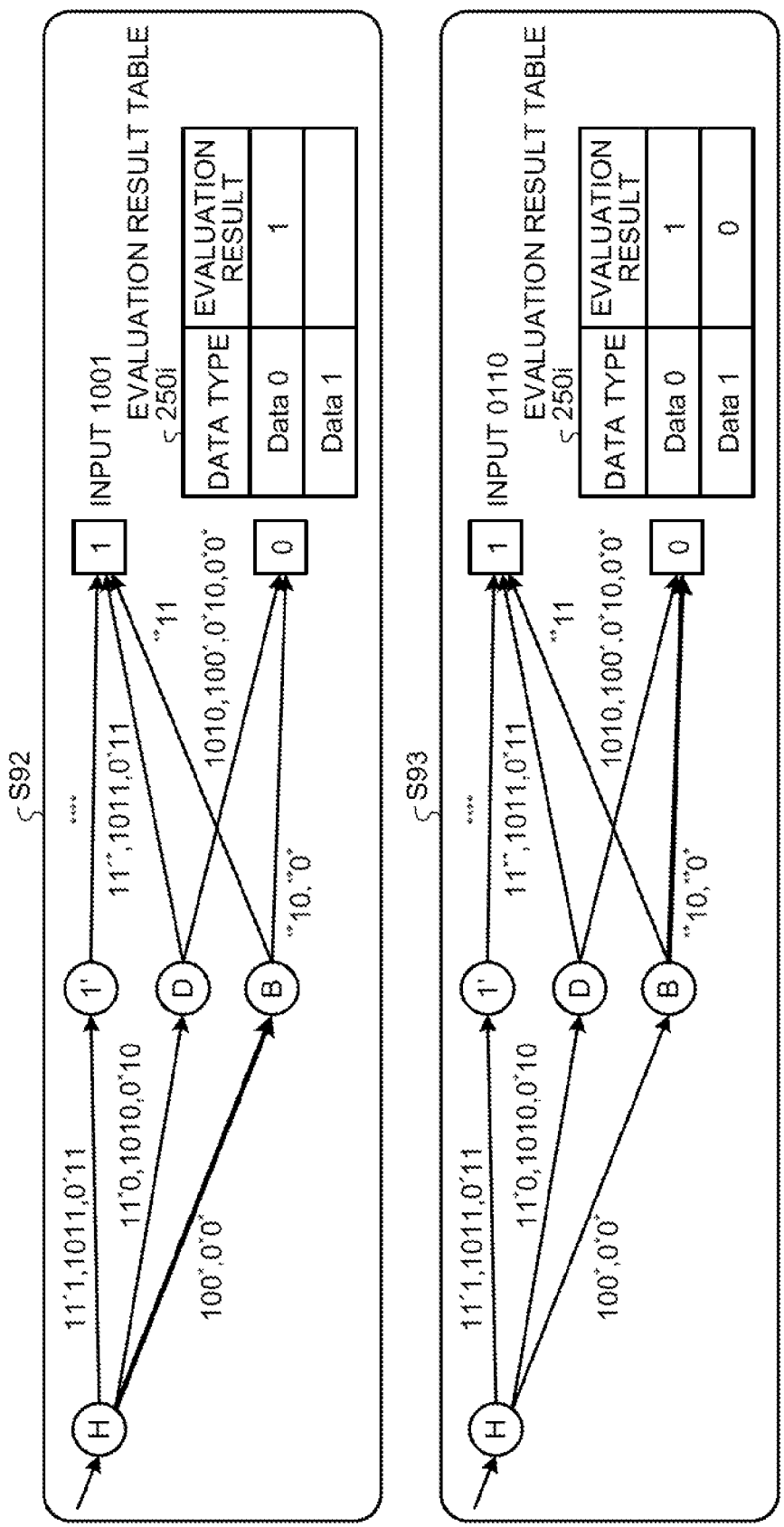
FIG. 52 is a second drawing for explaining the process of the diagram executing unit according to the second embodiment.

A process of the diagram executing unit 260*g* is now specifically explained. FIGS. 51 and 52 are drawings for explaining the process of the diagram executing unit 260*g* according to the second embodiment. It is postulated herein that the data structure depicted in FIG. 47 is taken as the data structure of the second diagram data 250*h*. It is also assumed herein that the data types are "Data 0" and "Data 1" and logical values of "Data 0" are "H=0, G=1, F=1, E=0, D=0, C=0, B=1, A=1" and logical values of "Data 1" are "H=1, G=0, F=0, E=1, D=0, C=1, B=1, A=0". Furthermore, since the input ordering follows the level ordering of the first level table 251 (refer to FIG. 26), the ordering is "H, G, F, E, D, C, B, A". Still further, the number of digits of bit strings for comparison is assumed to be "4".

First, the case is explained where the diagram executing unit 260*g* makes a true/false decision on "Data 0". The diagram executing unit 260*g* compares upper four bits "0110" in the bit string "01100011" of "Data 0" with the second transition table 253 to obtain a transition-destination node "D" (Step S90 in FIG. 51).

Then, the diagram executing unit 260*g* compares the remaining bit string "0011" with the second transition table 253 to obtain a transition-destination node "1 (true)". In the evaluation result table 250*i*, the diagram executing unit 260*g* registers "1 (true)" in the evaluation result corresponding to the data type "Data 0" (Step S91 in FIG. 51).

Next, the case is explained where the diagram executing unit 260*g* makes a true/false decision on "Data 1". The diagram executing unit 260*g* compares upper four bits "1001" in the bit string "10010110" of "Data 1" with the second transition table 253 to obtain a transition-destination node "B" (Step S92 in FIG. 52).

Then, the diagram executing unit 260*g* compares the remaining bits "0110" with the second transition table 253 to obtain a transition-destination node "0 (false)". In the evaluation result table 250*i*, the diagram executing unit 260*g* registers "0 (false)" in the evaluation result corresponding to the data type "Data 1" (Step S93 in FIG. 52).

The search-result output unit 260*h* is a unit that transmits the search result data 250*j* stored in the storage unit 250 to the terminal device 60 (refer to FIG. 3). Upon receiving the search result data 250*j*, the terminal device 60 outputs the received search result data 250*j* onto a monitor screen.

Figure 53:
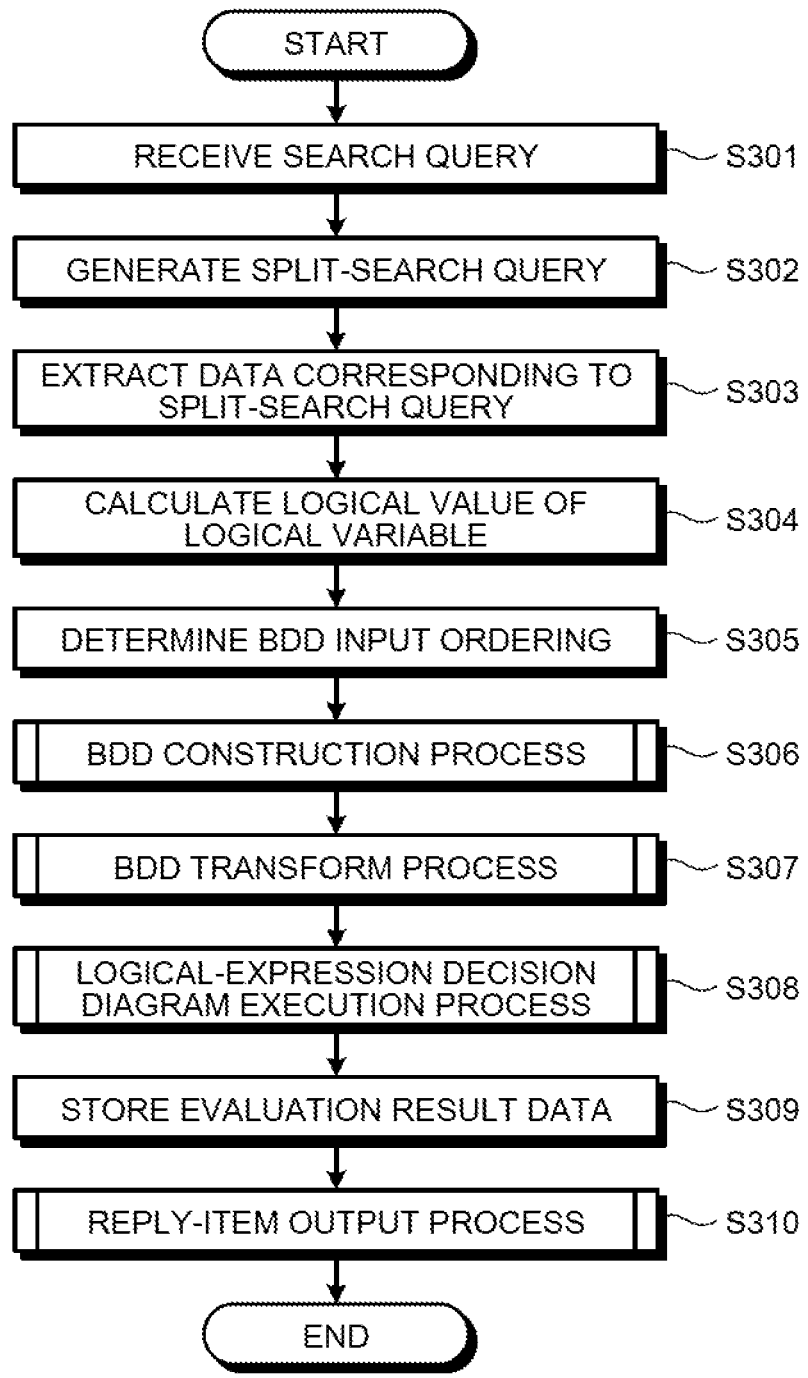
FIG. 53 is a flowchart of a process procedure of the searching apparatus according to the second embodiment.

Next, a process procedure of the searching apparatus 200 according to the second embodiment is explained. FIG. 53 is a flowchart of the process procedure of the searching apparatus 200 according to the second embodiment. As depicted in the drawing, the searching apparatus 200 receives a search query (Step S301), and the search-query splitting unit 260*a* generates the split-search query 250*c* (Step S302).

Subsequently, the extraction-result-table generating unit 260*b* extracts data corresponding to the split-search query 250*c* for registration in the extraction result table 250*d* (Step S303). The logical-value calculating unit 260*c* then calculates a logical value for registration in the logical value table 250*e* (Step S304).

The BDD constructing unit 260*e* then determines a BDD input ordering (Step S305) to perform a BDD construction process (Step S306). The BDD transforming unit 260*f* performs a BDD transform process to transform the first diagram data 250*g* to the second diagram data 250*h* (Step S307).

The diagram executing unit 260*g* performs a logical-expression-decision diagram execution process (Step S308) and stores the evaluation result data (Step S309). The search-result output unit 260*h* then performs a reply-item output process (Step S310).

The BDD construction process depicted at Step S306 in FIG. 35 is similar to the BDD construction process depicted in FIG. 35. Also, the reply-item output process depicted at Step S310 in FIG. 53 is similar to the reply-item output process depicted in FIG. 44.

Figure 54:
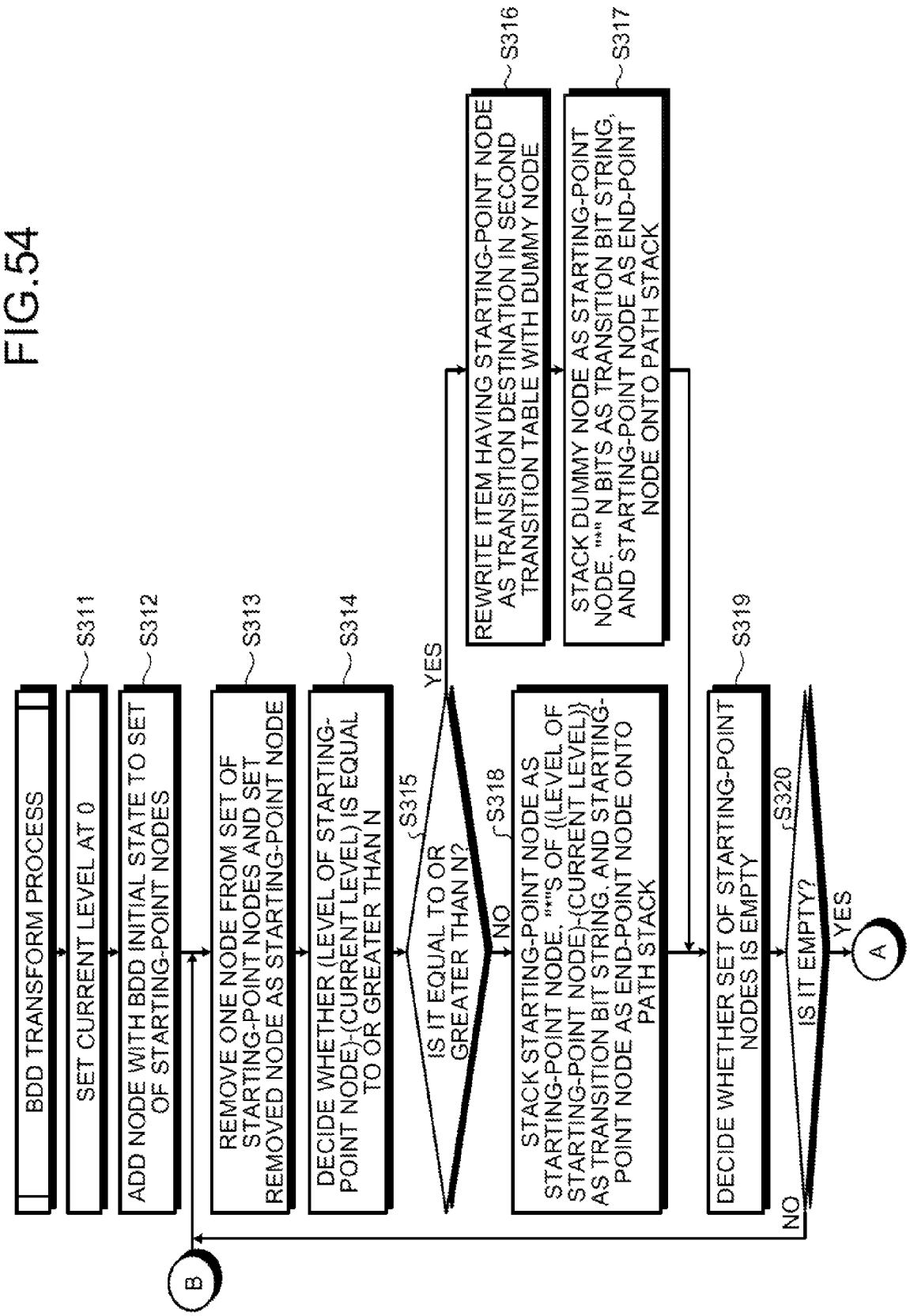
FIG. 54 is a first flowchart of a procedure of a BDD transform process according to the second embodiment.
Figure 55:
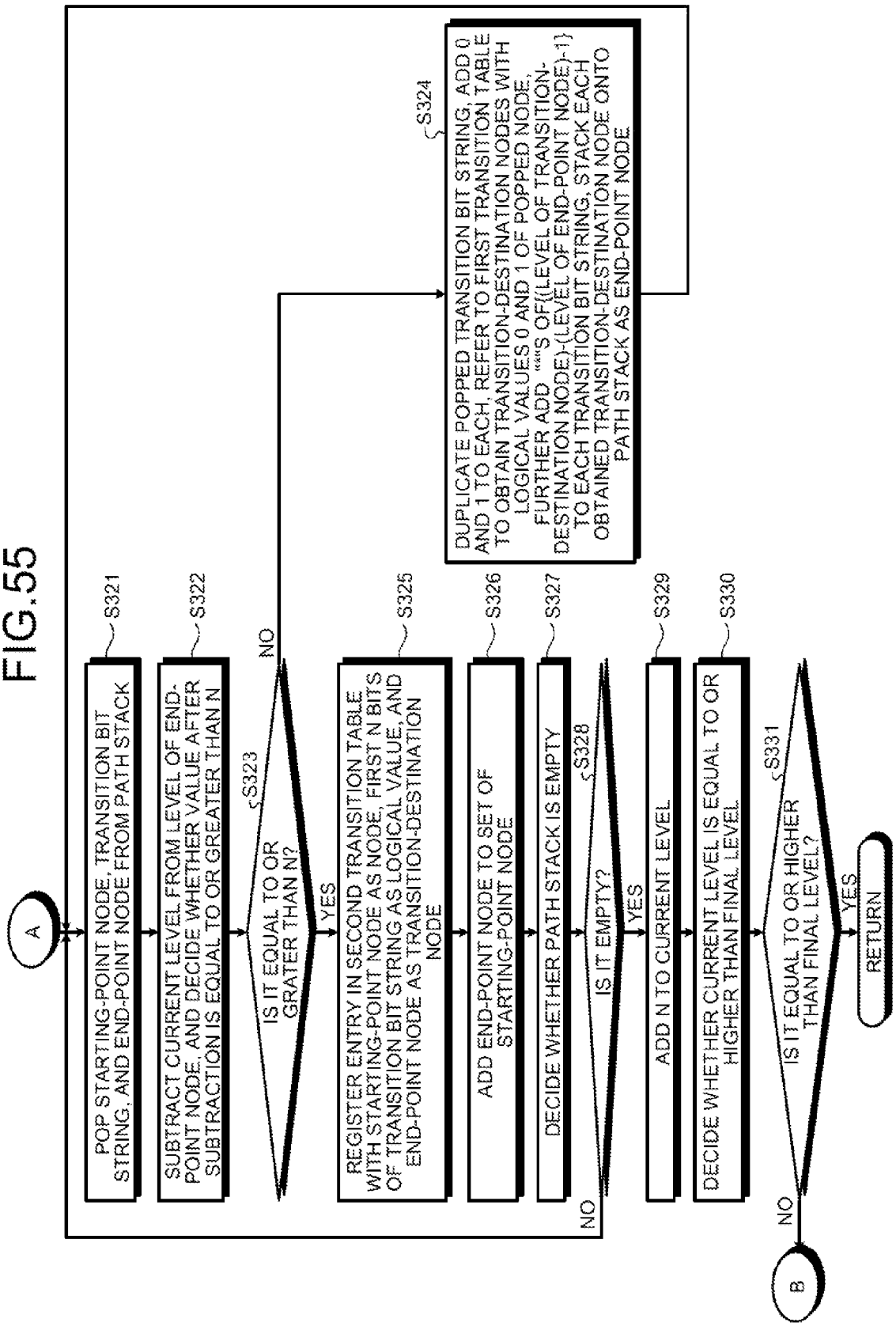
FIG. 55 is a second flowchart of the procedure of the BDD transform process according to the second embodiment.

Next, the BDD transform process depicted at Step S307 in FIG. 53 is explained. FIGS. 54 and 55 are flowcharts of a procedure of the BDD transform process according to the second embodiment. As depicted in FIG. 54, the BDD transforming unit 260*f* sets the current level at 0 (Step S311), and adds a node in a BDD initial state to the set of starting-point nodes (Step S312).

Subsequently, the BDD transforming unit 260*f* removes one node from the set of starting-point nodes, and sets the removed node as a starting-point node (Step S313), and decides whether [(the level of the starting-point node)−(current level)] is equal to or greater than N (for example, 4) (Step S314).

When the result is equal to or greater than N (Yes at Step S315), an item having the starting-point node as a transition destination in the second transition table 253 is rewritten with a dummy node (Step S316). Then, the dummy node as a starting-point node, "*" N bits as a transition bit string, and the starting-point node as an end-point node are stacked onto the path stack (Step S317), and the procedure goes to Step S319.

On the other hand, when the result is smaller than N (No at Step S315), the starting-point node as a starting-point node, "*"s of [(the level of the starting-point node)−(current level)] as a transition bit string, and the starting-point node as an end-point node are stacked onto the path stack (Step S318).

Subsequently, the BDD transforming unit 260*f* decides whether the set of starting-point nodes is empty (Step S319). When it is not empty (No at Step S320), the procedure goes to Step S313. On the other hand, when the set of starting-point nodes is empty (Yes at Step S320), as depicted in FIG. 55, the starting-point node, the transition bit string, and the end-point node are popped from the path stack (Step S321).

The BDD transforming unit 260*f* then subtracts the current level from the level of the end-point node to decide whether the value after subtraction is equal to or greater than N (Step S322). When the subtraction result is smaller than N (No at Step S323), the BDD transforming unit 260*f* duplicates the popped transition bit string, adds 0 and 1 to each transition bit string, and refers to the first transition table 252 to obtain transition-destination nodes for logical values 0 and 1 of the popped node. Also, n"*"s are further added to each transition bit string, where n is given by [(the level of the transition-destination node)−(the level of the end-point node)−1]. The obtained transition-destination node is added as an end-point node. The BDD transforming unit 260*f* then stacks each of obtained transition-destination node on the path stack as an end-point node (Step S324), and then goes to Step S321.

On the other hand, when the subtraction result is equal to or greater than N (Yes at Step S323), the BDD transforming unit 260*f* registers an entry in the second transition table with the starting-point node as a node, first N bits of the transition bit string as a logical value, and the end-point node as a transition-destination node (Step S325).

The BDD transforming unit 260*f* adds the end-point node to the set of starting-point nodes (Step S326), and decides whether the path stack is empty (Step S327). When the path stack is not empty (No at Step S328), the procedure goes to Step S321.

On the other hand, when the path stack is empty (Yes at Step S328), N is added to the current level (Step S329). Then, it is decided whether the current level is equal to or higher than the final level (Step S330). When the current level is lower than the final level (No at Step S331), the procedure goes to Step S313. When the current level is equal to or higher than the final level (Yes at Step S331), the BDD transform process ends.

Figure 56:
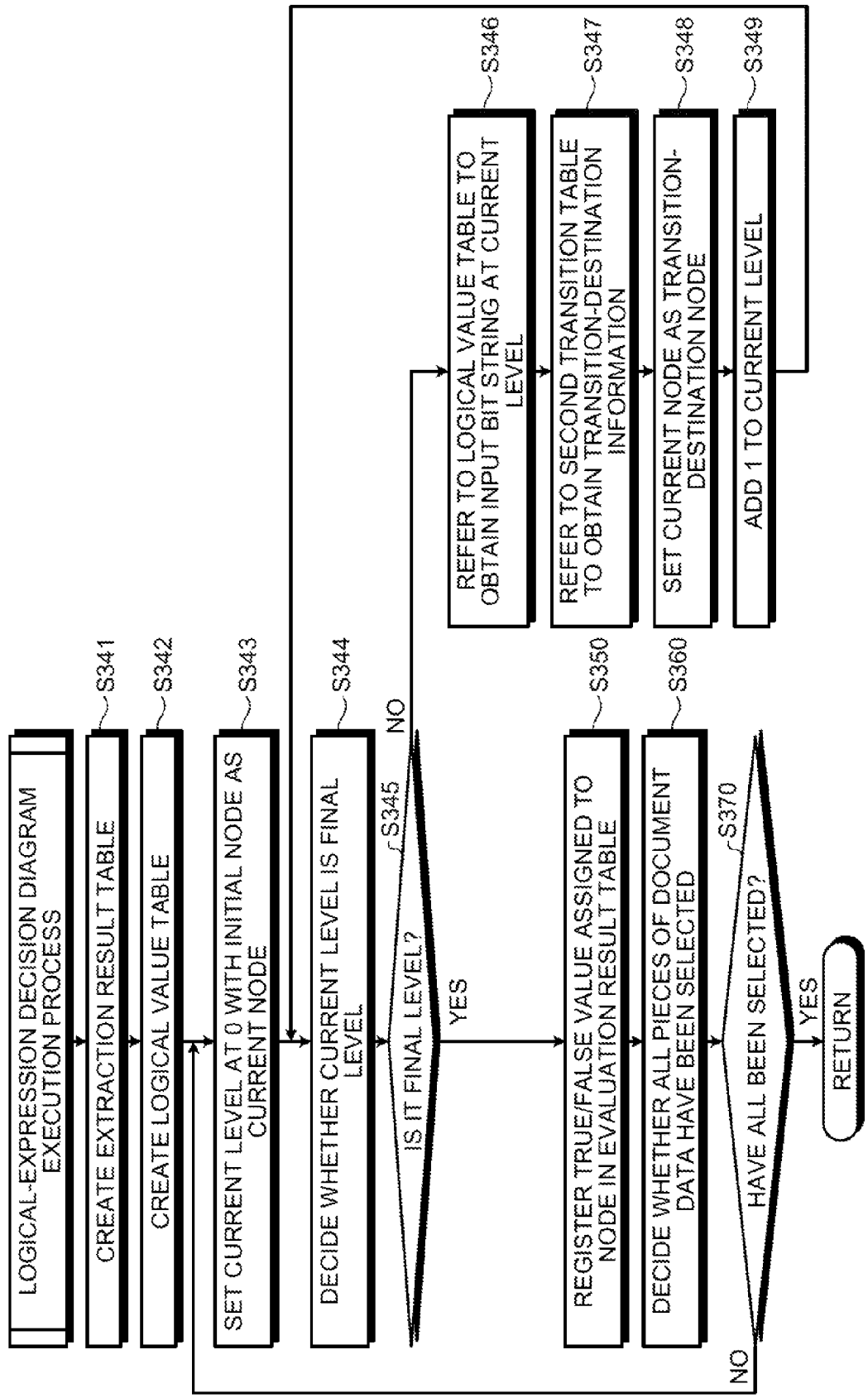
FIG. 56 is a flowchart of a procedure of a logical-expression decision diagram execution process according to the second embodiment.

Next, the logical-expression decision diagram execution process depicted at Step S308 in FIG. 53 is explained. FIG. 56 is a flowchart of a procedure of the logical-expression decision diagram execution process according to the second embodiment. As depicted in FIG. 56, the extraction-result-table generating unit 260b creates the extraction result table 250d (Step S341), and the logical-value calculating unit 260c creates the logical value table 250e (Step S342).

The diagram executing unit 260g then sets the current level at 0 with an initial node as the current node (Step S343), and decides whether the current level is the final level (Step S344).

When the current level is not the final level (No at Step S345), the diagram executing unit 260g refers to the logical value table 250e to obtain an input bit string at the current level (Step S346). Also, the diagram executing unit 260g refers to the second transition table 253 to obtain transition-destination information (Step S347).

Subsequently, the diagram executing unit 260g sets the current node as a transition-destination node (Step S348), adds 1 to the current level (Step S349), and then goes to Step S344.

On the other hand, when the current level is the final level (Yes at Step S345), the diagram executing unit 260g registers a true/false value assigned to the node in the evaluation result table 250i (Step S350). The diagram executing unit 260g then decides whether all pieces of document data have been selected (Step S360). If all pieces of document data have not been selected (No at Step S370), the procedure goes to Step S343. If all pieces of document data have been selected (Yes at Step S370), the logical-expression decision diagram execution process ends.

As explained above, when creating the second diagram data 250h, the searching apparatus 200 according to the second embodiment inserts a dummy value "*" in a bit string for which a transition destination is to be decided or a dummy node between transition-destination nodes. With this, by the time when a final true/false decision is made, the number of digits of bit strings as comparison targets is fixed, thereby eliminating the need of deciding the number of digits of bit strings for comparison for every transition-destination node and efficiently making a true/false decision.

Also, the searching apparatus 200 according to the second embodiment inserts a dummy node to fix the number of times of transition from the initial node to the node at the final level. Therefore, the process required for making a true/false decision can be simplified, and the processing load on the searching apparatus 200 can be reduced.

Meanwhile, in the searching apparatus 200 according to the second embodiment, by way of example, the dummy value "*" and the dummy node are used to create the second diagram data 250h. Alternatively, the second diagram data 250h may be created with only the dummy value inserted to fix the bit string or with only the dummy node inserted to fix the number of times of transition.

[c] Third Embodiment

Next, general outlines and features of a searching apparatus according to a third embodiment is explained. FIG. 57 is a drawing for explaining the general outlines and features of the searching apparatus according to the third embodiment. The searching apparatus according to the third embodiment uses a logical variable (hereinafter, referred to as an uncertain logical variable) to be set at a state selected between a state in which a logical value of the logical variable has been found and a state in which a logical value of the logical variable has not been found, so as to construct a first binary tree, and then uses the technique explained in either one of the first and second embodiments to transform the first binary tree to a second binary tree, thereby making a true/false decision on the logical expression. Depending on the input bit string, a final true/false decision can be made even without finding a logical value of a logical variable (for example, a logical variable with high calculation cost).

Here, a logical variable with high calculation cost (a logical variable for which the time required for calculating whether the logical value is "1" or "0" is equal to or greater than a predetermined time) is desirably not calculated. Therefore, by creating an uncertain logical variable corresponding to such a logical variable with high calculation cost, the processing load on the searching apparatus for making a true/false decision can be reduced.

A first binary tree depicted in FIG. 57 indicates a logical expression "A and B or (C and D or E) and (F or G and H)". It is also assumed in FIG. 57 that logical variables with high calculation cost are "A" and "C". With "A?" being taken as an uncertain logical variable for "A", logical variable "A" and the uncertain logical variable "A?" are used to indicate the value of the logical variable "A". In the third embodiment, a logical variable and its uncertain logical variable corresponding to that logical variable are used to define three states of the logical variable. Specifically, "a?=0, a=0" indicates that the logical value of "A" has not yet been found, "a?=1, a=0" indicates that the logical value of A is "0", and "a?=1, a=1" indicates that the logical value of A is "1". Note that initial values of the uncertain logical variable and the logical variable corresponding to the uncertain logical variable are "0".

Similarly, with "C?" being taken as an uncertain logical variable of "C", the logical variable "C" and the uncertain logical variable "C?" are used to indicate the value of the logical variable "C". Specifically, "c?=0, c=0" indicates that the logical value of "C" has not yet been found, "c?=1, c=0" indicates that the logical value of C is "0", and "c?=1, c=1" indicates that the logical value of C is "1".

Here, "Ax" depicted in FIG. 57 represents an undefined final node of the logical variable "A". When a bit string is input to the second binary tree and eventually arrives at the undefined final node "Ax", the logical value of the logical variable "Ax" is required. In the case of arriving at the undefined final node "Ax", the searching apparatus finds the logical value of the logical variable "A", sets the value of the uncertain logical variable "A?" at "1", and then again performs a comparison from the node "A?" immediately preceding to the undefined final node "Ax", thereby making a true/false decision.

Similarly, "Cx" depicted in FIG. 57 represents an undefined final node of the logical variable "C". When a bit string is input to the second binary tree and eventually arrives at the undefined final node "Cx", the logical value of the logical variable "Cx" is required. In the case of arriving at the undefined final node "Cx" the searching apparatus finds the logical value of the logical variable "C", sets the value of the uncertain logical variable "C?" at "1", and then again performs a comparison from the node "D" immediately preceding to the undefined final node "Cx", thereby making a true/false decision.

Specifically, when it is assumed that logical values input to the second binary tree are "H=1, G=1, F=0, E=1, D=0, C?=0, C=0, B=1, A?=0, A=0" (logical values of A and C are uncertain), since a transition is made from the initial node "H" to a node "1", a true/false decision can be made on the logical expression (in this case, true) even without finding the logical values of the logical variables "A, C" with high calculation cost.

On the other hand, when it is assumed that logical values input to the second binary tree are "H=1, G=1, F=0, E=0, D=1, C?=0, C=0, B=1, A?=0, A=0" (logical values of A and C are uncertain), a transition is made from the initial node "H" via the node "D" to the undefined final node "Cx". In this case, the logical value of the logical variable "C" has to be found. Therefore, the logical value of the logical variable "C" is found, the value of the uncertain logical variable "C?" is set at "1", and then a bit string is again input to the node "D".

For example, when the logical value of the logical variable "C" is taken as "1", the logical values are "H=1, G=1, F=0, E=0, D=1, C?=1, C=1, B=1, A?=0, A=0" (logical value of A is uncertain). When logical values "D=1, C?=1, C=1, B=1" is input to the node "D", a transition is made via the node "D" to the node "1". Therefore, a true/false decision can be made on the logical expression even without finding all logical values of the logical variables with high calculation cost (in this case, the logical value of the logical variable A does not have to be found).

Figure 58:
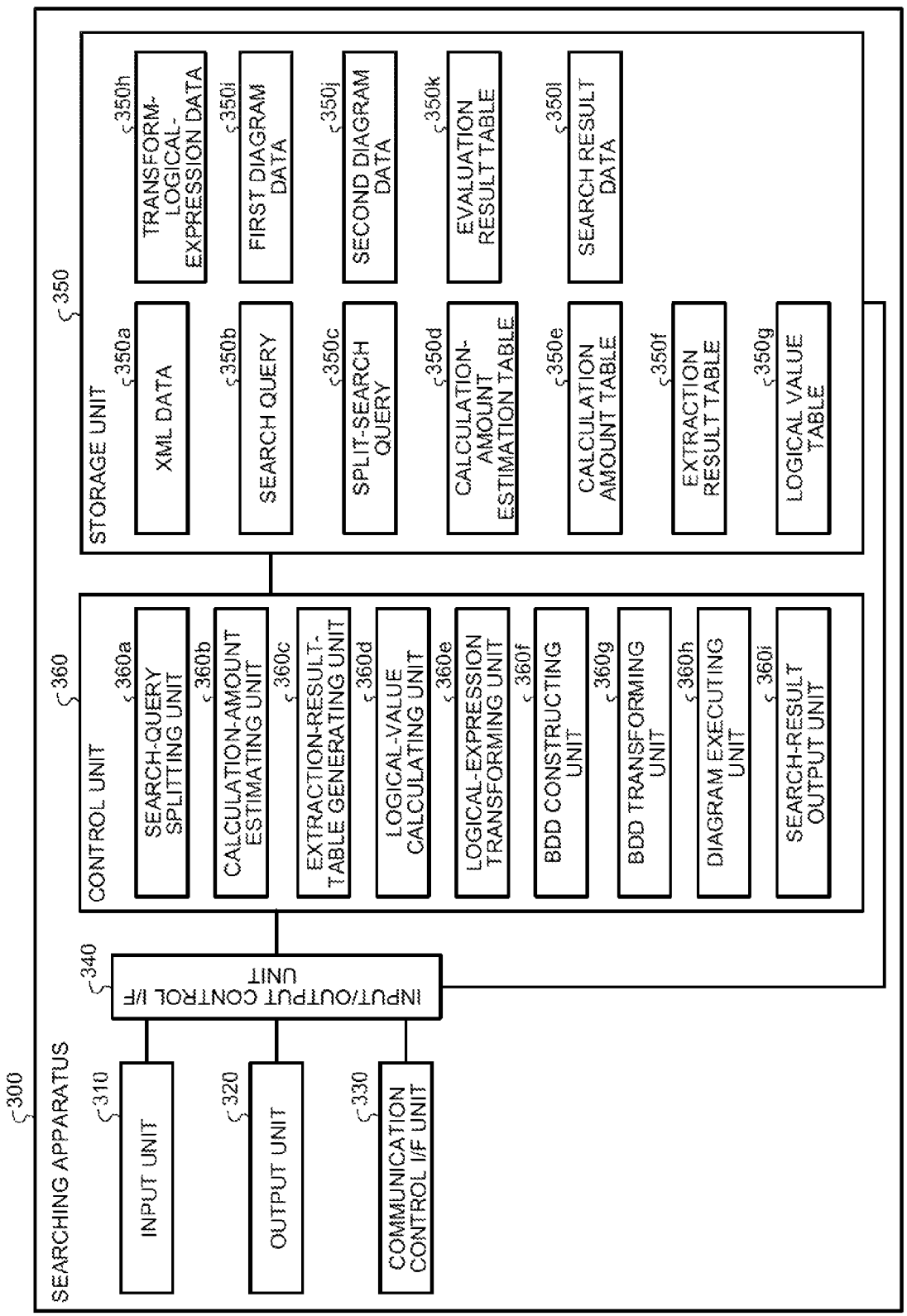
FIG. 58 is a functional block diagram of the configuration of the searching apparatus according to the third embodiment.

Next, the configuration of the searching apparatus according to the third embodiment is explained. FIG. 58 is a functional block diagram of the configuration of a searching apparatus 300 according to the third embodiment. Note that the configuration of a search system including the searching apparatus 300 according to the third embodiment is similar to the configuration of the search system according to the first embodiment.

As depicted in FIG. 58, this searching apparatus 300 includes an input unit 310, an output unit 320, a communication control I/F unit 330, an input/output control I/F unit 340, a storage unit 350, and a control unit 360.

The input unit 310 is a unit that inputs various information, and is configured of, for example, a keyboard, a mouse, and a microphone. Note that a monitor (output unit 320), which will be explained below, also achieves a pointing device function in conjunction with the mouse.

The output unit 320 is a unit that outputs various information, and is configured of, for example, a monitor (or display or touch panel) and a loudspeaker. The communication control I/F unit 330 is a unit that mainly controls communication with the terminal device 60. Note the input/output control I/F unit 340 is a unit that controls inputs and outputs of data by the input unit 310, the output unit 320, the communication control I/F unit 330, the storage unit 350, and the control unit 360.

The storage unit 350 is a unit that stores data and programs required by the control unit 360 for various processes. In particular, in close association with the present invention, the storage unit 350 includes XML data 350*a*, a search query 350*b*, a split-search query 350*c*, a calculation-amount estimation table 350*d*, a calculation amount table 350*e*, extraction result table 350*f*, logical value table 350*g*, transform-logical-expression data 350*h*, first diagram data 350*i*, and a second diagram data 350*j*, an evaluation result table 350*k*, and search result data 350*l*.

The XML data 350*a* is document data having a hierarchical structure with elements being divided with element identifiers "<", "</", and others. The data structure of this XML data 350*a* is similar to the data structure of the XML data 150*a* depicted in FIG. 5.

The search query 350*b* represents data for retrieving data at a check position from the XML data 350*a*. The data structure of this search query 350*b* is similar to the data structure of the search query 150*b* depicted in FIG. 6.

The split-search query 350*c* is data obtained as a result of splitting the search query 350*b* by a search-query splitting unit 360*a* (which will be explained further below). The data structure of this split-search query 350*c* is similar to the data structure of the split-search query 150*c* depicted in FIG. 7.

The calculation-amount estimation table 350*d* is a table for managing a calculation cost of an evaluation expression for evaluating a logical value of a logical variable. FIG. 59 is a drawing of an example of the data structure of the calculation-amount estimation table 350*d* according to the third embodiment. As depicted in the drawing, this calculation-amount estimation table 350*d* has stored therein an evaluation expression type and a calculation cost in association with each other. For example, the evaluation expression type contains simple search, regular expression, numerical-value operation, date and time calculation, and neighbor search. Also, the value of the calculation cost corresponding to each evaluation expression type is set and updated as appropriate based on user's experiences.

Here, an evaluation expression classified as simple search is to decide whether predetermined document data is included in a search target element. For example, the evaluation expression q1 depicted in FIG. 7 is an evaluation expression for simple search.

An evaluation expression classified as regular expression requires various complex processes. An evaluation expression classified as numerical-value operation includes comparison, four fundamental rules of arithmetic, and complex operations (not including simple matching). For example, the evaluation expression q2 depicted in FIG. 7 is an evaluation expression for numerical-value operation.

An evaluation expression classified as date and time calculation is to make a decision according to various formats, such as before or after January 2008. An evaluation expression classified as neighbor search requires counting a character spacing, such as within five characters between "information" and "unification".

The calculation amount table 350*e* is a table for managing a calculation cost corresponding to the evaluation expression. FIG. 60 is a drawing of an example of the data structure of the calculation amount table 350*e* according to the third embodiment. As depicted in the drawing, this calculation amount table 350*e* has stored therein evaluation expression identification information and a calculation cost in association with each other. Here, the calculation cost of the evaluation expression "q1" is "1", whilst the calculation cost of the evaluation expression "q2" is "100".

The extraction result table 350*f* is a table for managing information as an evaluation target of the evaluation expression (refer to q1 and q2 in FIG. 7) and an item for reply to the terminal device 60 when the evaluation result of the search query 350*b* is true. The data structure of this extraction result table 350*f* is similar to the data structure of the extraction result table 150*d* depicted in FIG. 8.

The logical value table 350*g* is a table for managing the evaluation result of each evaluation expression. The data structure of this logical value table 350*g* is similar to the data structure of the logical value table 150*e* depicted in FIG. 9. However, at an initial stage, a logical value with high calculation cost is taken as "?". For example, when the calculation cost of the evaluation expression "q2" is high (equal to or higher than a predetermined value), the value of a second logical value (q2) is taken as "?". When the value of the "q2" is required, "1" or "0" is registered.

The transform-logical-expression data 350*h* is data obtained by transforming the logical expression (refer to FIG. 7) to a reverse Polish notation by a logical-expression transforming unit 360*e* (which will be explained further below). The first diagram data 350*i* is data created by a BDD constructing unit 360*f* (which will be explained further below).

The data structure of this first diagram data 350i is similar to that of the first diagram data 150g depicted in FIG. 10. However, the first diagram data 350i according to the third embodiment includes, in addition to normal logical variables and nodes, an uncertain logical variable of a logical variable with a calculation cost equal to or greater than a predetermined value, and an undefined final node. Also, in the third embodiment, the first diagram data 350i includes a first level table 351 and a first transition table 352.

The second diagram data 350j is data obtained by transforming the first diagram data 350i by a BDD transforming unit 360g (which will be explained further below). This second diagram data 350j includes a second level table and a second transition table (the data structure of the second level table and the data structure of the second transition table are similar to those in the second embodiment). The data structure of this second diagram data 350j is similar to that depicted in FIG. 25 including the second level table 153 and the second transition table 154. However, the second diagram data 350j according to the third embodiment includes, in addition to normal nodes, a node corresponding to an uncertain logical variable and an undefined final node.

The evaluation result table 350k is a table for managing the evaluation result for each of the data types (for example, Data 0 to Data 2). The data structure of this evaluation result table 350k is similar to the data structure of the evaluation result table 150i depicted in FIG. 11.

The search result data 350l is data for storing the search result of the search query 350b with respect to the XML data 350a. The data structure of this search result data 350l is similar to the data structure of the search result data 150j depicted in FIG. 12.

The control unit 360 has an internal memory for storing programs and control data that define various process procedures, and executes various processes with these programs and control data. In particular, in close association with the present invention, as depicted in FIG. 58, the control unit 360 includes the search-query splitting unit 360a, a calculation-amount estimating unit 360b, an extraction-result-table generating unit 360c, a logical-value calculating unit 360d, the logical-expression transforming unit 360e, the BDD constructing unit 360f, the BDD transforming unit 360g, a diagram executing unit 360h, and a search-result output unit 360i.

Among these units, the search-query splitting unit 360a is a unit that stores a search query received from the terminal device 60 in the storage unit 350 as the search query 350b, and uses a known technique to generate the split-search query 350c from the search query 350b.

The calculation-amount estimating unit 360b is a unit that decides a calculation cost of each evaluation expression (in the example depicted in FIG. 7, the evaluation expressions q1 and q2) included in the split-search query 350c to generate the calculation amount table 350e (refer to FIG. 60). The calculation-amount estimating unit 360b compares the evaluation expression of the split-search query 350c with the calculation-amount estimation table (refer to FIG. 59) to decide the calculation cost of the evaluation expression.

The extraction-result-table generating unit 360c is a unit that extracts first to n-th (n>1) logical variables and reply items from the XML data 350a based on the evaluation expression contained in the split-search query 350c to generate the extraction result table 350f.

The logical-value calculating unit 360d is a unit that evaluates an evaluation expression with low calculation cost based on the calculation cost of the evaluation expression (calculates a logical value of a logical variable with a calculation cost lower than a predetermined value) to generate the logical value table 350g. Also, the logical-value calculating unit 360d calculates a logical value of a logical variable required to be calculated upon request from the diagram executing unit 360h.

The logical-expression transforming unit 360e is a unit that transforms the logical expression (for example, Q=q1 and q2) of the search query by using the reverse Polish notation. When the logical-expression transforming unit 360e uses the reverse Polish notation to transform the logical expression "q1&q2", "q1q2&" is obtained. The logical-expression transforming unit 360e then stores the transformed logical expression data in the storage unit 350 as the transform-logical-expression data 350h.

The BDD constructing unit 360f is a unit that generates the first diagram data 350i based on the transform-logical-expression data 350h. The BDD constructing unit 360f sequentially reads characters of the transform-logical-expression data 350h (logical expression in reverse Polish notation) from the head, and registers various information in the first level table 351 and the second level table according to the read characters (such as logical operators and logical variables).

In particular, when a logical variable with high calculation cost is included in an evaluation expression, the BDD constructing unit 360f according to the third embodiment creates an uncertain logical variable and an undefined final node corresponding to the logical variable with high calculation cost to generate a second binary tree. It is assumed herein that a node of the uncertain logical variable is an uncertain logical node.

In the following, a process of the BDD constructing unit 360f when creating the first diagram data 350i is specifically explained. FIGS. 61 to 65 are drawings for explaining a process of the BDD constructing unit 360f according to the third embodiment. With the process depicted in FIGS. 61 to 65 being performed, an uncertain logical variable and an undefined final node of the logical variable with high calculation cost are combined into a binary tree. As a result, a second binary tree can be created even without calculating a logical value of the logical variable with high calculation cost, thereby deciding a node transition destination for every multiple bits.

It is postulated herein that the logical variables "A" and "C" have a calculation cost of 100 or greater. Here, the BDD constructing unit 360f once uses a technique similar to that of the BDD constructing unit 160f in the first embodiment to create first diagram data, and then searches for any logical variable with high calculation cost to create first diagram data 350i using an uncertain logical variable and the final node.

Figure 61:
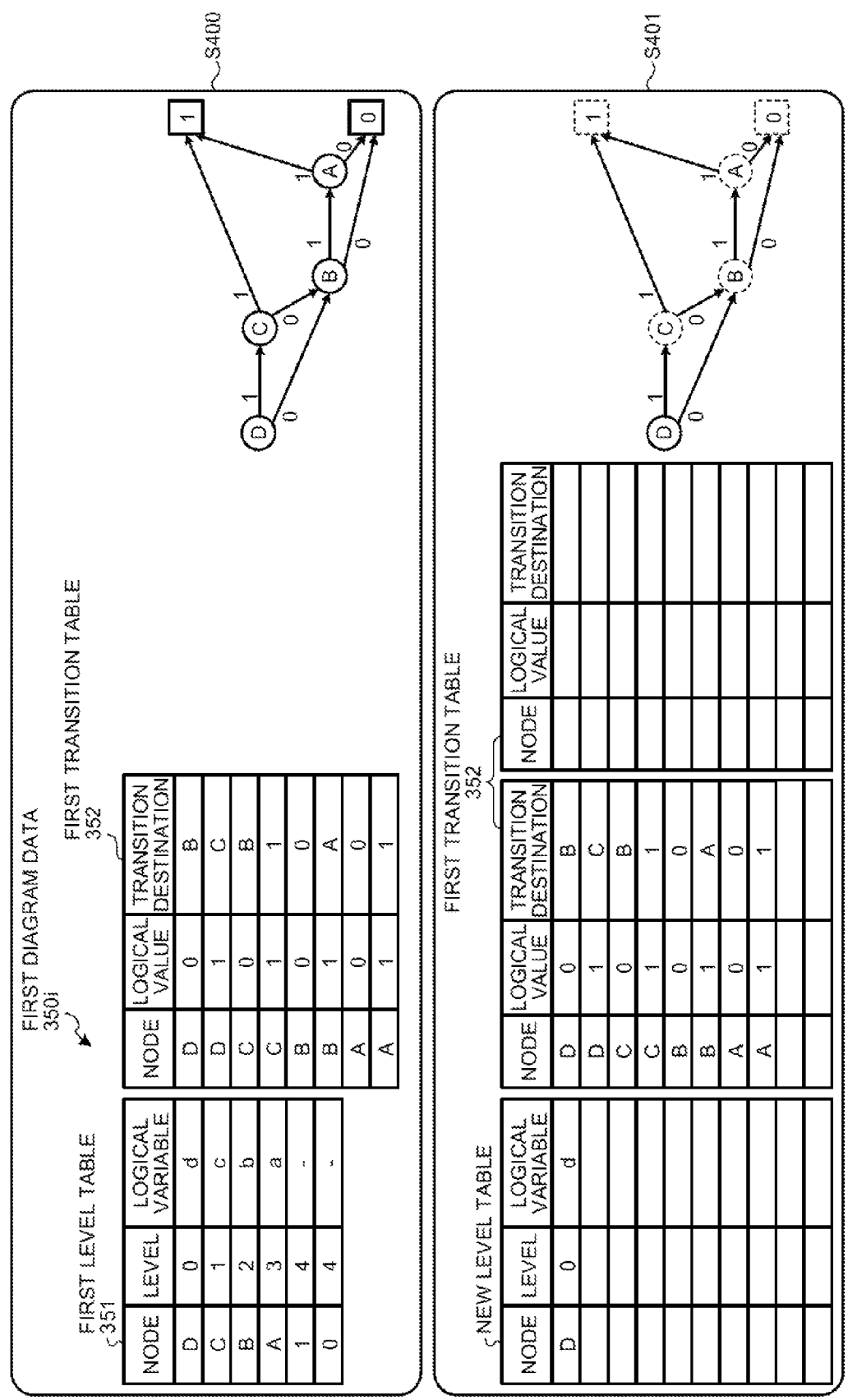
FIG. 61 is a first drawing for explaining a process of a BDD constructing unit according to the third embodiment.
Figure 63:
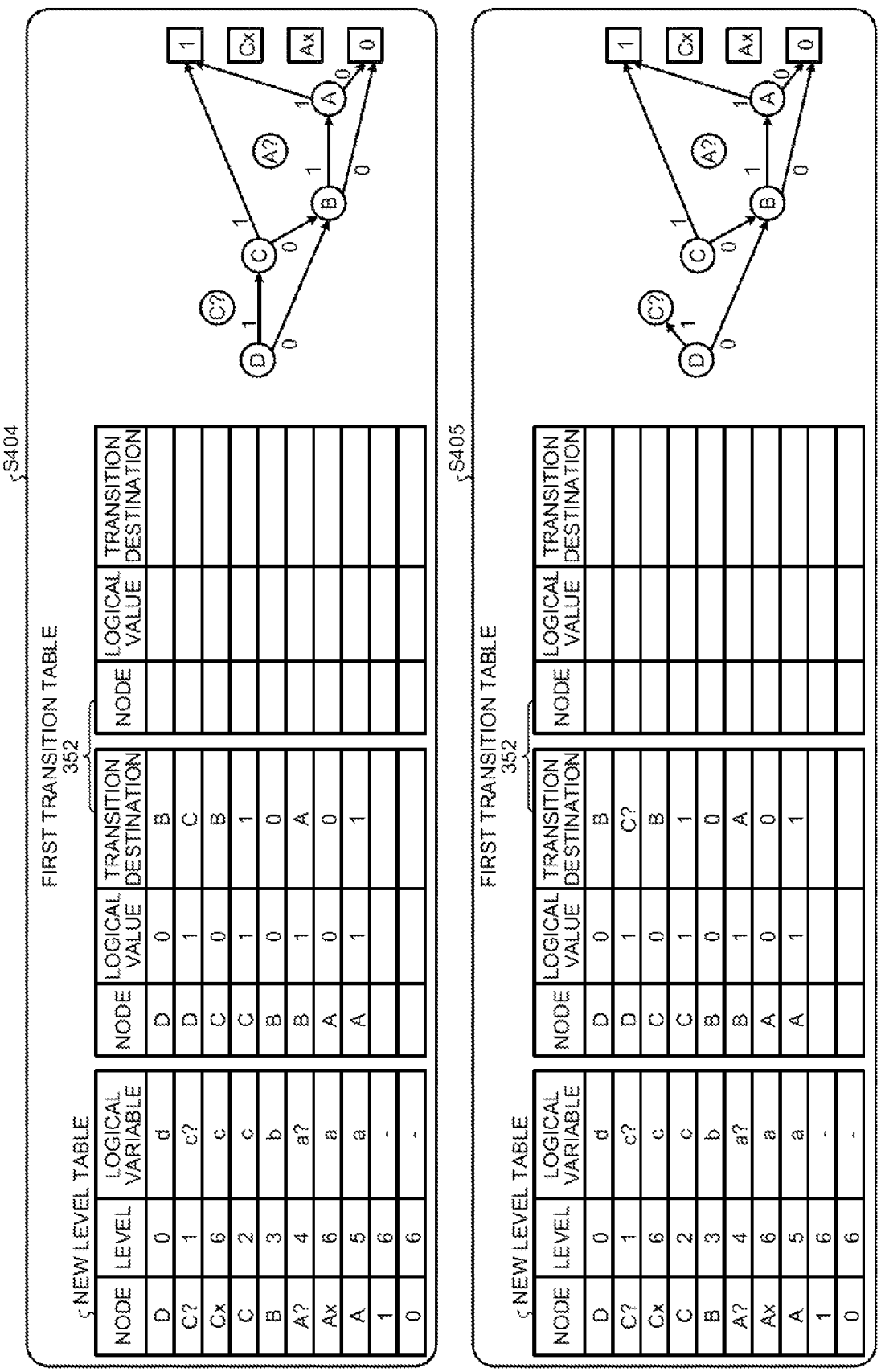
FIG. 63 is a third drawing for explaining the process of the BDD constructing unit according to the third embodiment.
Figure 64:
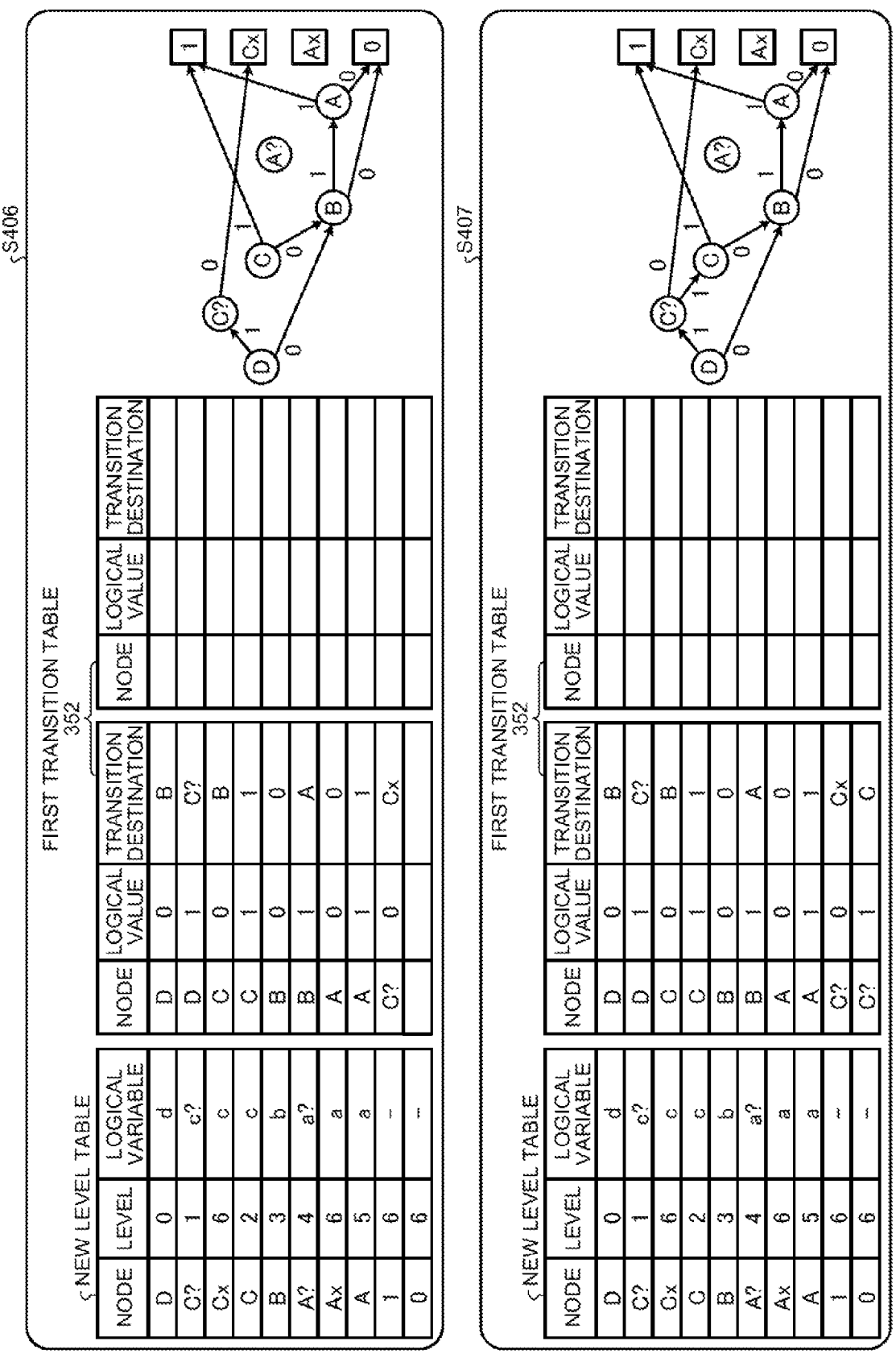
FIG. 64 is a fourth drawing for explaining the process of the BDD constructing unit according to the third embodiment.
Figure 65:
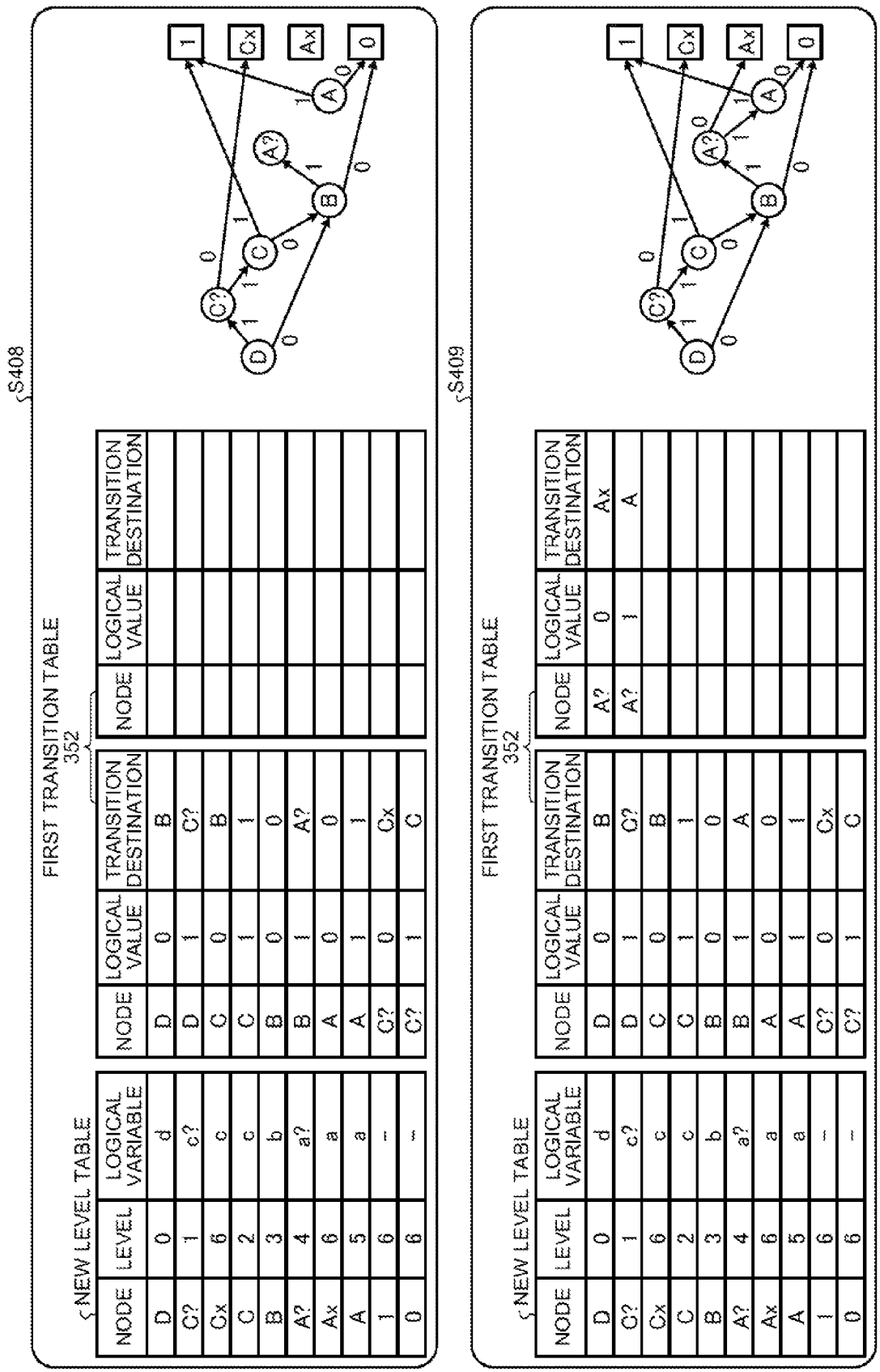
FIG. 65 is a fifth drawing for explaining the process of the BDD constructing unit according to the third embodiment.

Here, for convenience of explanation, first diagram data generated by using the technique of the BDD constructing unit 160e in the first embodiment is taken as the first diagram data 350i depicted in a upper part of FIG. 61. With the head entry in the first level table 351 being taken as a current entry, the BDD constructing unit 360f sets the current level at 0. Since the node "D" of the current entry is a node with a calculation cost lower than a predetermined value, the node "D", the level "0", and a logical variable "d" are registered as they are in a new level table (Steps S400 and S401 in FIG. 61). It is assumed herein that the new level table is retained by the BDD constructing unit 360f.

The BDD constructing unit 360f adds 1 to the current level, and sets the next entry in the first level table 351 (second row of the first level table 351 in FIG. 61) as a current entry. Since the node "C" of the current entry is a node with a calculation cost equal to or higher than the predetermined value, an uncertain logical node "C?" corresponding to the node "C", the current level "1", and a logical variable (undefined logical variable) "c?" are registered. Also, an uncertain final node "Cx" and the logical variable "c" corresponding to the logical variable "C" are also registered in the new level table.

Then, the BDD constructing unit 360ƒ adds 1 to the current level, and registers the node "C", the level "2", and the logical variable "c" in the new level table (Step S402 in FIG. 62).

The BDD constructing unit 360ƒ adds 1 to the current level, and sets the next entry in the first level table 351 (third row of the first level table 351 in FIG. 61) as a current entry. Since the node "B" of the current entry is a node with a calculation cost lower than the predetermined value, the node "B", the level "3", and a logical variable "b" are registered as they are in the new level table.

Subsequently, the BDD constructing unit 360ƒ adds 1 to the current level, and sets the next entry in the first level table 351 (fourth row of the first level table 351 in FIG. 61) as a current entry. Since the node "A" of the current entry is a node with a calculation cost equal to or higher than the predetermined value, an uncertain logical node "A?" corresponding to the node "A", the current level "4", and a logical variable (undefined logical variable) "a?" are registered. Also, an uncertain final node "Ax" and the logical variable "a" corresponding to the logical variable "A" are also registered in the new level table.

Then, the BDD constructing unit 360ƒ adds 1 to the current level, and registers the node "A", the level "5", and the logical variable "a" in the new level table. Subsequently, the BDD constructing unit 360ƒ sets the next entry in the first level table 351 (fifth row of the first level table 351 in FIG. 61) as a current entry. Since a node "1" of the current entry is a node at the final level, the node "1" and the level "6" are registered in the new level table.

Subsequently, the BDD constructing unit 360ƒ sets the next entry in the first level table 351 (sixth row of the first level table 351 in FIG. 61) as a current entry. Since a node "0" of the current entry is a node at the final level, the node "0" and the level "6" are registered in the new level table (Step S403 in FIG. 62).

The BDD constructing unit 360ƒ sets the level of the undefined final nodes "Cx" and "Ax" in the new level table at the final level "6". Also, the BDD constructing unit 360ƒ takes the head entry in the first transition table 352 as a current entry to obtain a transition-destination node "B" with a node "D" and a logical value "0". Since the calculation cost of the transition-destination node "B" is lower than the predetermined value, the first transition table 352 is left as it is (Step S404 in FIG. 63).

The BDD constructing unit 360ƒ takes an entry on the second row in the first transition table 352 as a current entry to obtain a transition-destination node "C" with a node "D" and a logical value "1". Since the calculation cost of the transition-destination node "C" is equal to or higher than the predetermined value, the BDD constructing unit 360ƒ rewrites the transition-destination node "C" with a transition-destination node "C?" (Step S405 in FIG. 63).

Subsequently, the BDD constructing unit 360ƒ takes an entry on the third row in the first transition table 352 as a current entry to obtain a transition-destination node "B" with a node "C" and a logical value "0". Since the calculation cost of the node "C" is equal to or higher than the predetermined value and the logical value is "0", the BDD constructing unit 360ƒ registers an uncertain logical node "C?", a logical value "0", and an undefined final node "Cx" in the first transition table 352 (Step S406 in FIG. 64).

Subsequently, the BDD constructing unit 360ƒ takes an entry on the fourth row in the first transition table 352 as a current entry to obtain a transition-destination node "1" with a node "C" and a logical value "1". Since the calculation cost of the node "C" is equal to or higher than the predetermined value and the logical value is "1", the BDD constructing unit 360ƒ registers an uncertain logical node "C?", a logical value "1", and the read node "C" in the first transition table 352 (Step S407 in FIG. 64).

The BDD constructing unit 360ƒ takes an entry on the fifth row in the first transition table 352 as a current entry to obtain a transition-destination node "0" with a node "B" and a logical value "0". Since the calculation cost of the transition-destination node "0" is lower than the predetermined value, the BDD constructing unit 360ƒ leaves the first transition table 352 as it is.

Subsequently, the BDD constructing unit 360ƒ takes an entry on the sixth row in the first transition table 352 as a current entry to obtain a transition-destination node "A" with a node "B" and a logical value "1". Since the calculation cost of the transition-destination node "A" is equal to or higher than the predetermined value, the BDD constructing unit 360ƒ rewrites the transition destination with "A?" (Step S408 in FIG. 65).

The BDD constructing unit 360ƒ takes an entry on the seventh row in the first transition table 352 as a current entry to obtain a transition-destination node "0" with a node "A" and a logical value "0". Since the calculation cost of the node "A" is equal to or higher than the predetermined value and the logical value is "0", the BDD constructing unit 360ƒ registers an uncertain logical node "A?", a logical value "0", and an undefined final node "Ax" in the first transition table 352.

Subsequently, the BDD constructing unit 360ƒ takes an entry on the eighth row in the first transition table 352 to obtain a transition-destination node "1" with a node "A" and a logical value "1". Since the calculation cost of the transition-destination node "A" is equal to or higher than the predetermined value and the logical value is "1", the BDD constructing unit 360ƒ registers an uncertain logical node "A?", a logical value "1", and the read node "A" in the first transition table 352 (Step S409 in FIG. 65). The BDD constructing unit 360ƒ then updates the first level table 351 with the new level table.

Referring back to explanation of FIG. 58, the BDD transforming unit 360g is a unit that transforms the first diagram data 350i to generate the second diagram data 350j so as to transform the first binary tree to a second binary tree. Note that the technique of transforming the first diagram data 350i to the second diagram data 350j is similar to those of the BDD transforming unit 160ƒ in the first embodiment and the BDD transforming unit 260ƒ in the second embodiment.

The diagram executing unit 360h is a unit that compares the logical value table 350g with the second diagram data 350j to decide whether the final logical value is "1 (true)".

The diagram executing unit 360h then detects in the evaluation result table 350k a reply item corresponding to a data type for which the decision result is "1", and then stores the detected reply item in the storage unit 350 as the search result data 350l. For example, when the decision result of the data type "Data 2" is "1", a reply item "third development department" is stored as the search result data 350l.

Meanwhile, when the diagram executing unit 360h refers to the logical value table 350g and finds that a logical variable with a logical value "?" (a logical variable with a calculation cost equal to or higher than the predetermined value) is present, the diagram executing unit 360h defines an uncertain logical variable corresponding to a logical variable with high calculation cost, sets the values of the relevant logical variable and uncertain logical variable at "0" to create a bit string, and compares the bit string with the second diagram data 350*j* to make a final true/false decision.

Also, when the value of the logical variable with a logical value "?" is required in the course of calculating the final logical value, the diagram executing unit 360*h* causes the logical value of the relevant logical variable to be calculated (requests the logical-value calculating unit 360*d* to calculate the logical value of the logical variable). Then, when the logical value of the relevant logical variable is "1", a bit string is created with a logical variable "1" and an uncertain logical variable "1", and is then compared with the second diagram data 350*j* to make a final true/false decision.

On the other hand, when the logical value of the relevant logical variable is "0", a bit string is created with a logical variable "0" and an uncertain logical variable "1", and is then compared with the second diagram data 350*j* to make a final true/false decision.

For example, when a bit string of logical values of logical variables "H, G, F, E, D, C, B, A" is created to make a final true/false decision, where "H=1, G=1, F=1, E=1, D=0, C=?, B=1, A=?" (when the calculation cost of the logical variables A and C is equal to or higher than the predetermined value), uncertain logical variables "C?" and "A?" are defined. Then, with a logical variable "C=0", an uncertain logical variable "C?=0", a logical variable "A=0", and an uncertain logical variable "A?=0", a bit string "H=1, G=1, F=1, E=1, D=0, C?=0, C=0, B=1, A?=0, A=0" is created.

By way of example, when it is assumed that the second binary tree depicted in the lower part of FIG. 57 is taken as a second binary tree and this binary tree is compared with the bit string "H=1, G=1, F=1, E=1, D=0, C?=0, C=0, B=1, A?=0, A=0", a transition is made from the initial node "H" to the node "1". Therefore, a final true/false decision can be made without finding the logical values of the logical variables "C" and "A".

On the other hand, when a bit string of logical values of logical variables "H, G, F, E, D, C, B, A" is created to make a final true/false decision, where "H=1, G=1, F=1, E=0, D=1, C=?, B=1, A=?", an uncertain logical variable "C?" is defined. Then, with a logical variable "C=0", an uncertain logical variable "C?=0", a logical variable "A=0", and an uncertain logical variable "A?=0", a bit string "H=1, G=1, F=1, E=0, D=1, C=0, C?=0, B=1, A?=0, A=0" is created.

When it is assumed that the second binary tree depicted in the lower part of FIG. 57 is taken as a second binary tree and this binary tree is compared with the bit string "H=1, G=1, F=1, E=0, D=1, C?=0, C=0, B=1, A?=0, A=0", a transition is made from the initial node "H" to the undefined final node "Cx". In this case, the logical value of the logical variable "C" has to be calculated. It is assumed herein that the logical value of the logical variable "C" is "1" as a result of calculating the logical value of the logical variable "C". In this case, "C=1" and "C?=1" are obtained.

When the diagram executing unit 360*h* inputs a bit string "D=1, C?=1, C=1, B=1" to the node "D" immediately preceding to the undefined final node "Cx", a transition is made from the node "D" to the node "1". Therefore, a final true/false decision can be made even without finding the logical value of the logical variable "A".

The search-result output unit 360*i* is a unit that transmits the search result data 350*l* stored in the storage unit 350 to the terminal device 60 (refer to FIG. 3). Upon receiving the search result data 350*l*, the terminal device 60 outputs the received search result data 350*l* onto a monitor screen.

Figure 66:
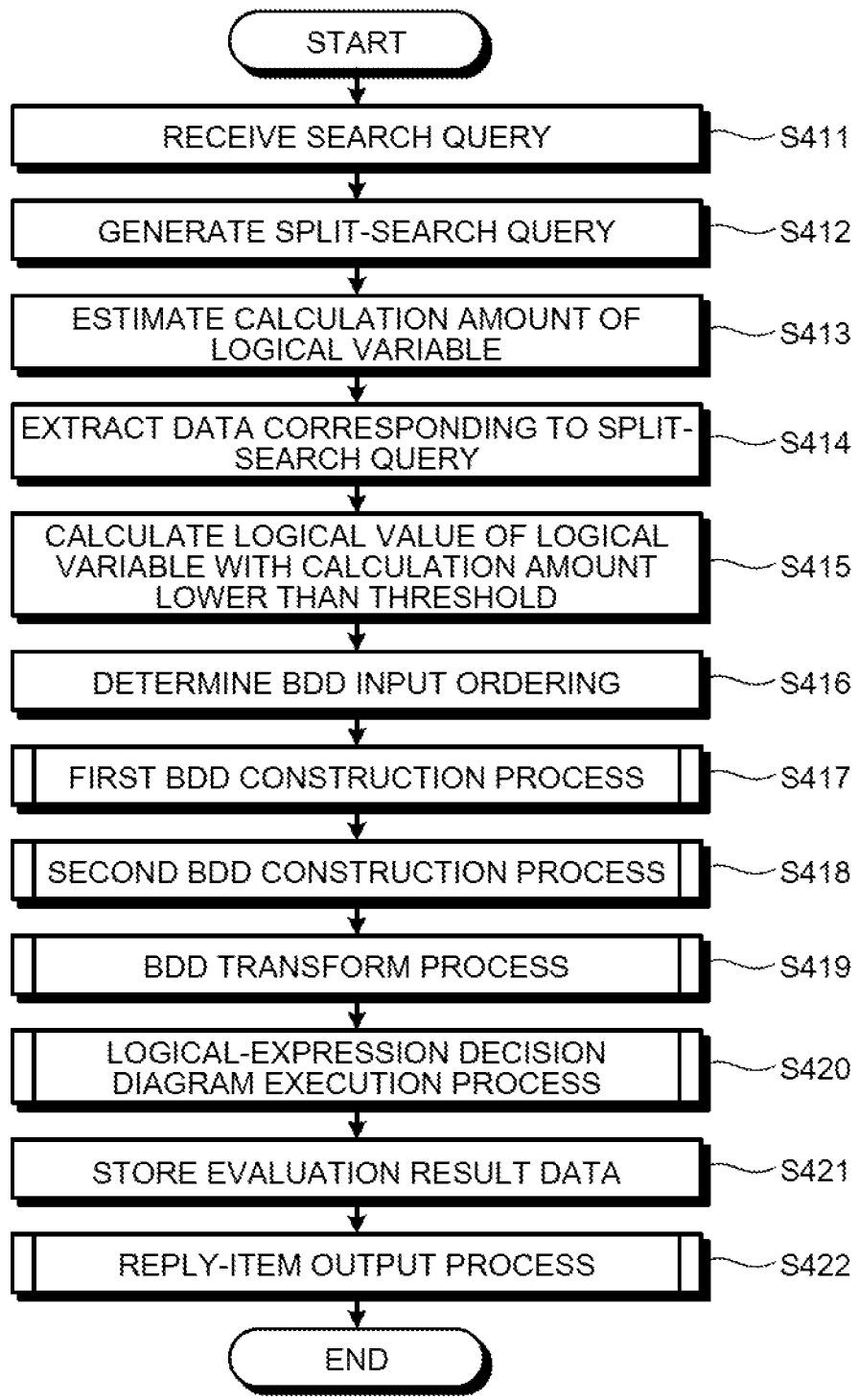
FIG. 66 is a flowchart of a process procedure of the searching apparatus according to the third embodiment.

Next, a process procedure of the searching apparatus 300 according to the third embodiment is explained. FIG. 66 is a flowchart of the process procedure of the searching apparatus 300 according to the third embodiment. As depicted in the drawing, the searching apparatus 300 receives a search query (Step S411), and the search-query splitting unit 360*a* generates the split-search query 350*c* (Step S412).

Subsequently, the calculation-amount estimating unit 360*b* estimates the calculation amount (calculation cost) of each logical variable (Step S413). The extraction-result-table generating unit 360*c* then extracts data corresponding to the split-search query 350*c* for registration in the extraction result table 350*f* (Step S414). The logical-value calculating unit 360*d* then calculates a logical value of a logical variable with a calculation amount (calculation cost) lower than a threshold (Step S415).

The BDD constructing unit 360*f* then determines a BDD input ordering (Step S416) to perform a first BDD construction process and a second BDD construction process (Steps S417 and S418). The BDD transforming unit 360*g* performs a BDD transform process to transform the first diagram data 350*i* to the second diagram data 350*j* (Step S419).

The diagram executing unit 360*h* then performs a logical-expression-decision diagram execution process (Step S420) and stores the evaluation result data (Step S421). The search-result output unit 360*i* then performs a reply-item output process (Step S422).

Here, the first BDD construction process depicted at Step S417 in FIG. 66 is similar to the BDD construction process depicted in FIG. 35. Also, the reply-item output process depicted at Step S422 in FIG. 66 is similar to the reply-item output process depicted in FIG. 44.

Figure 67:
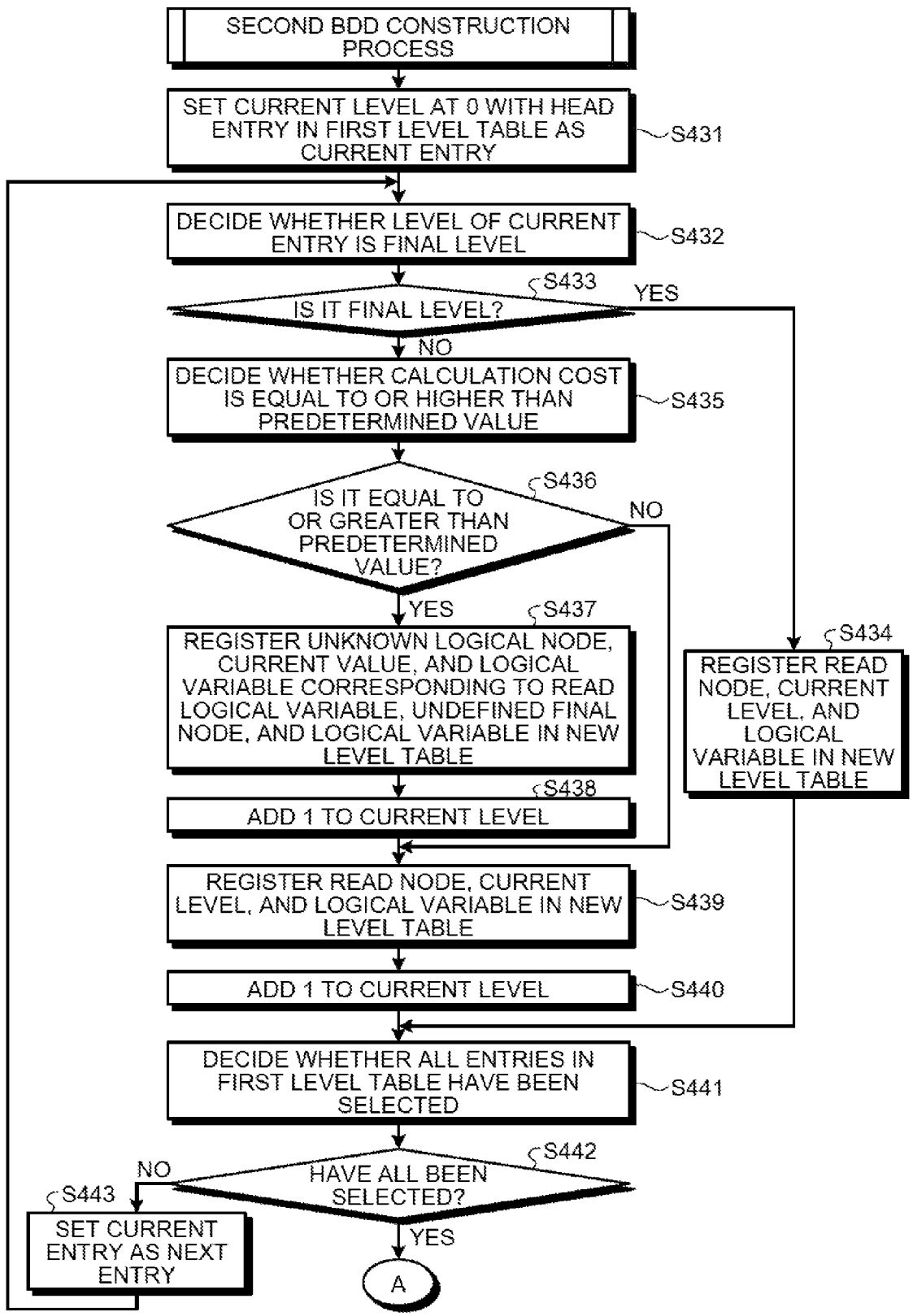
FIG. 67 is a first flowchart of a procedure of a second BDD construction process according to the third embodiment.
Figure 68:
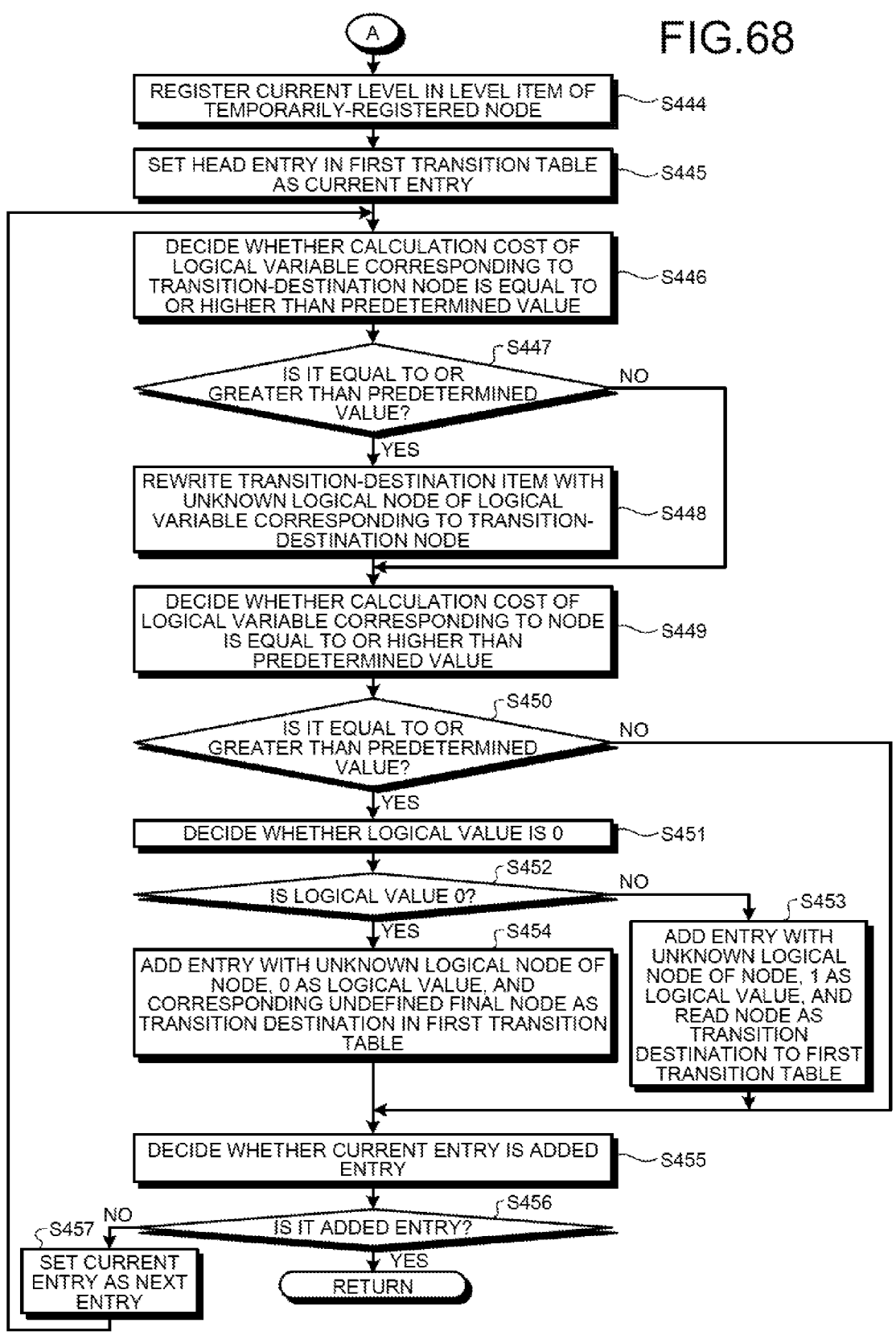
FIG. 68 is a second flowchart of the procedure of the second BDD construction process according to the third embodiment.

Next, the second BDD construction process depicted at Step S418 in FIG. 66 is explained. FIGS. 67 and 68 are flowcharts of a procedure of the second BDD construction process according to the third embodiment. With the process in FIGS. 67 and 68 being performed, an uncertain logical node and an undefined final node corresponding to a logical variable with high calculation cost are combined into the first diagram data 350*i*. As depicted in FIG. 67, with the head entry in the first level table 351 being taken as a current entry, the BDD constructing unit 360*f* sets the current level at "0" (Step S431) to decide whether the level of the current entry is the final level (Step S432).

When the current entry is at the final level (Yes at Step S433), the read node, the current level, and the logical variable are registered in the new level table (Step S434), and then the procedure goes to Step S441.

When the current entry is not at the final level (No at Step S433), it is decided whether the calculation cost is equal to or higher than a predetermined value (Step S435). When the calculation cost is lower than the predetermined value (No at Step S436), the procedure goes to Step S439.

On the other hand, when the calculation cost is equal to or higher than the predetermined value (Yes at Step S436), an uncertain logical node, a current level, and a logical variable corresponding to the read logical variable, an undefined final node (undefined final node corresponding to the read logical variable), and the logical variable are registered in the new level table (Step S437).

Then, the BDD constructing unit 360*f* adds 1 to the current level (Step S438), registers the read node, the current level, and the logical variable in the new level table (Step S439), and then adds 1 to the current level (Step S440).

The BDD constructing unit 360*f* then decides whether all entries in the first level table 351 have been selected (Step S441). If not all have been selected (No at Step S442), the BDD constructing unit 360*f* sets the current entry as the next entry (Step S443), and then goes to Step S432.

If all entries in the first level table 351 have been selected (Yes at Step S442), in FIG. 68, the BDD constructing unit 360f registers the current level (final level) in the level item of the temporarily-registered node (undefined final node) (Step S444), and then sets the head entry in the first transition table 352 as the current entry (Step S445).

Subsequently, the BDD constructing unit 360f decides whether the calculation cost of the logical variable corresponding to the transition-destination node is equal to or higher than the predetermined value (Step S446). When the calculation cost is lower than the predetermined value (No at Step S447), the procedure goes to Step S449.

When the calculation cost of the logical variable corresponding to the transition-destination node is equal to or higher than the predetermined value (Yes at Step S447), the BDD constructing unit 360f rewrites the transition-destination item with the uncertain logical node of the logical variable corresponding to the transition-destination node (Step S448), and decides whether the calculation cost of the logical variable corresponding to the node of the current entry is equal to or higher than the predetermined value (Step S449).

When the calculation cost of the logical value of the logical variable corresponding to the node of the current entry is lower than the predetermined value (No at Step S450), the procedure goes to Step S455. On the other hand, when the calculation cost of the logical value of the logical variable corresponding to the node is equal to or higher than the predetermined value (Yes at Step S450), the BDD constructing unit 360f decides whether the logical value is 0 (Step S451).

When the logical value is 1 (No at Step S452), the BDD constructing unit 360f adds an entry with an uncertain logical node of the node of the current entry, 1 as a logical value, and the read node (the node of the current entry) as a transition destination to the first transition table 352 (Step S453), and then goes to Step S455.

On the other hand, when the logical value is 0 (Yes at Step S452), the BDD constructing unit 360f adds an entry with an uncertain logical node of the node of the current entry, 0 as a logical value, and an undefined final node corresponding to the current entry as a transition destination to the first transition table 352 (Step S454).

The BDD constructing unit 360f then decides whether the current entry is an added entry (Step S455). When the current entry is not an added entry (No at Step S456), the BDD constructing unit 360f sets the current entry as the next entry (Step S457), and then goes to Step S446. On the other hand, when the current entry is an added entry (Yes at Step S456), the second BDD construction process ends.

Figure 69:
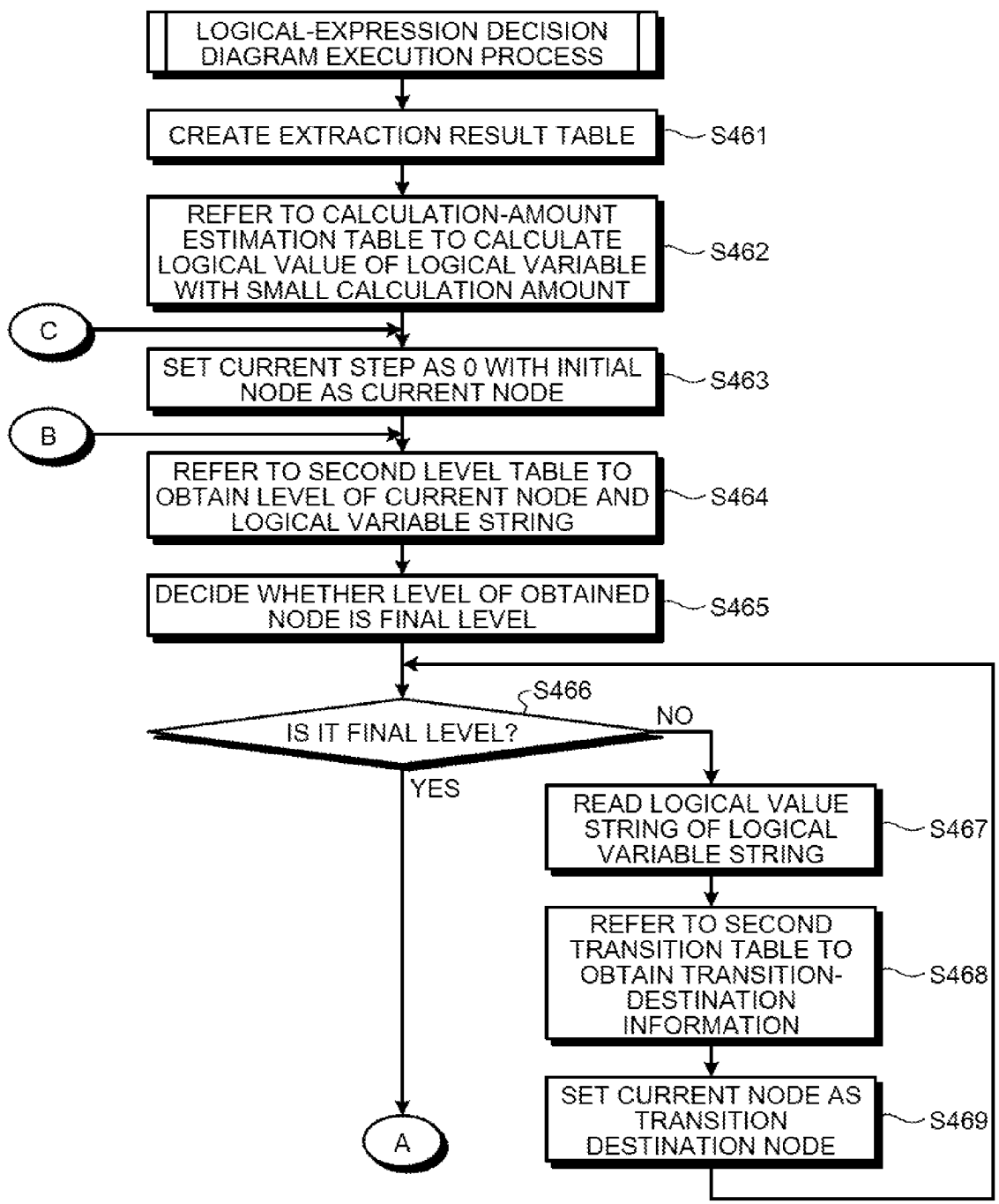
FIG. 69 is a first flowchart of a procedure of a logical-expression decision diagram execution process according to the third embodiment.
Figure 70:
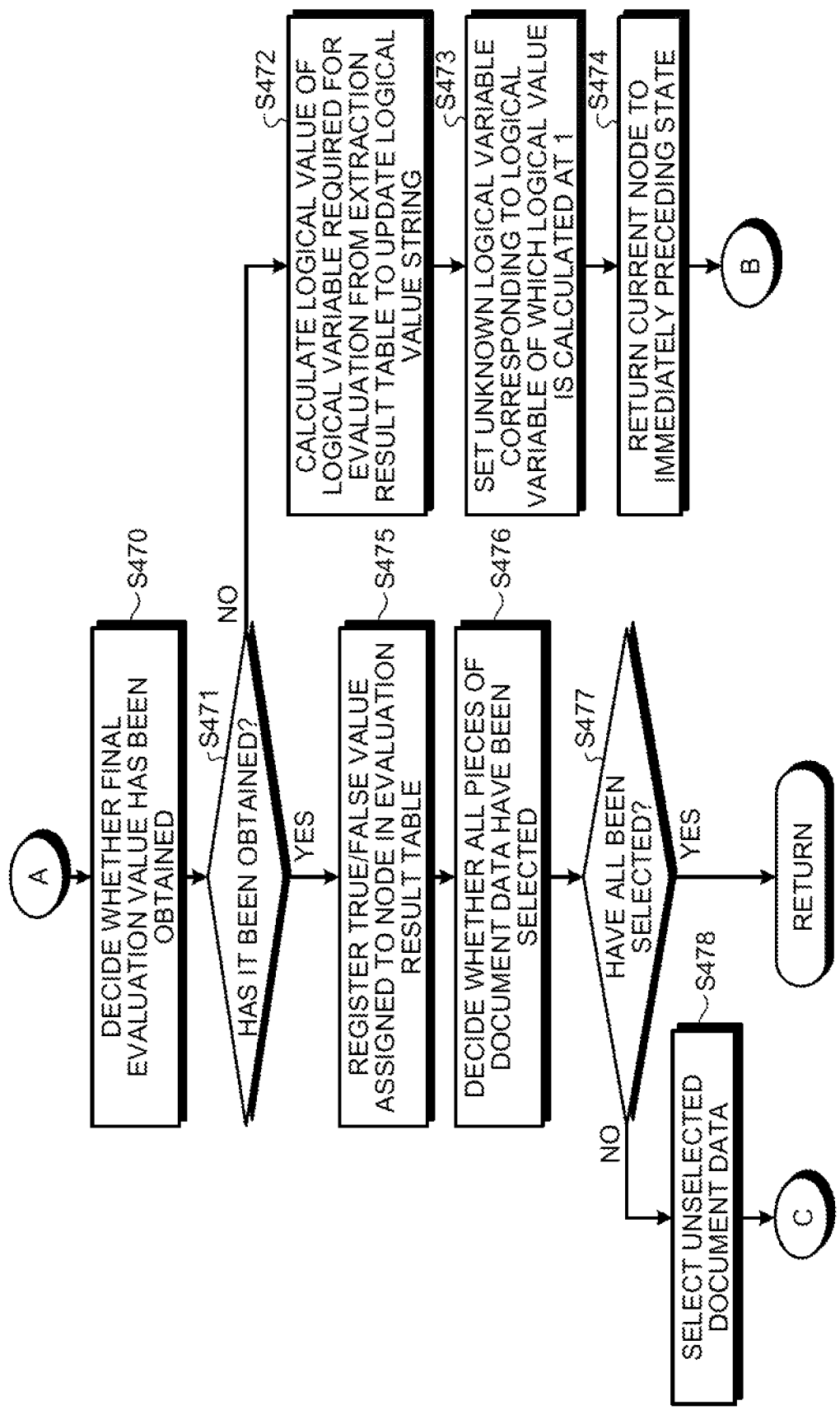
FIG. 70 is a second flowchart of the procedure of the logical-expression decision diagram execution process according to the third embodiment.

Next, the logical-expression decision diagram execution process depicted at Step S420 in FIG. 66 is explained. FIGS. 69 and 70 are flowcharts of a procedure of the logical-expression decision diagram execution process according to the third embodiment. As depicted in FIG. 69, the extraction-result-table generating unit 360c creates the creates the extraction result table 350f (Step S461), and the logical-value calculating unit 360d refers to the calculation-amount estimation table 350d to calculate a logical value of a logical variable with small calculation amount (calculation cost lower than the predetermined value) (Step S462).

The diagram executing unit 360h then sets an initial node as the current node and sets the current step at 0 (Step S463), and refers to the second level table to obtain the level of the current node and a logical variable string (bit string) (Step S464).

The diagram executing unit 360h then decides whether the level of the obtained node is the final level (Step S465). When the level of the node is not the final level (No at Step S466), the diagram executing unit 360h reads a logical value string of the logical variable string (Step S467).

Subsequently, the BDD constructing unit 360f refers to the second transition table to obtain transition-destination information (Step S468), sets the transition-destination node as the current node (Step S469), and then goes to Step S466.

On the other hand, when the level of the obtained node is the final level (Yes at Step S466), as depicted in FIG. 70, the diagram executing unit 360h decides whether the final evaluation value (true or false) has been obtained (Step S470). If the final evaluation value has not been obtained (No at Step S471), a logical value of a logical variable required for evaluation is calculated from the extraction result table 350f to update the logical value string (Step S472). Then, the uncertain logical variable corresponding to the logical variable of which logical value is calculated is set at 1 (Step S473), the current node is returned to an immediately preceding state (Step S474), and then the procedure goes to Step S464.

Meanwhile, if the final evaluation result has been obtained (Yes at Step S471), the true/false value assigned to the node is registered in the evaluation result table 350k (Step S475), and then it is decided whether all pieces of document data have been selected (Step S476). If not all pieces of document data have been selected (No at Step S477), an unselected piece of document data is selected (Step S478), and then the procedure goes to Step S463. If all pieces of document data have been selected (Yes at Step S477), the logical-expression decision diagram execution process ends.

As explained above, in the searching apparatus 300 according to the third embodiment, the calculation-amount estimating unit 360b estimates the calculation cost of each logical variable. The BDD constructing unit 360f then leaves a logical value of a logical variable with high calculation cost uncalculated by using an uncertain logical variable. The diagram executing unit 360h then evaluates the second diagram data 350j. Then, it is not until a logical variable with high calculation cost is required in the course of evaluating the second diagram data 350j (when a transition is made to an undefined final node) that the logical value of the logical variable is calculated. Therefore, the number of occasions of calculating the logical value of the logical variable with high calculation cost is reduced, thereby decreasing the processing load on the searching apparatus.

Here, in the searching apparatus according to any of the first to third embodiments explained above, by way of example, the second transition table (for example, refer to FIG. 25) is created to decide a node as a transition destination from a combination of a node and a logical value. However, the second transition table may not be necessarily created to decide a node as a transition destination. For example, a combination of a node and a logical value may be represented in bit string, and a transition-destination node may be registered at a memory address corresponding to the represented bit string. When the node and the logical value are designated, a transition-destination node can be specified by referring to the memory address corresponding to a bit string formed of a combination of the node and the logical value.

Also, when a combination of a node and a logical value is represented in bit string, the dummy value can be transformed to all-bit-string pattern. For example, "1**" can be transformed to "100", "101", "110", and "111".

According to the embodiments, an effort to make a true/false decision for each bit can be saved, and the processing time required for the true/false decision can be reduced.

Meanwhile, among the processes explained in the embodiments, all or part of the processes explained as being automatically performed may be manually performed, or all or part of the processes explained as being manually performed may be automatically performed through a known method. In addition, the process procedure, the control procedure, specific names, and information including various data and parameters explained in the specification and depicted in the drawings can be arbitrarily changed unless otherwise specified.

Also, each component of the searching apparatuses 100, 200, and 300 depicted in FIGS. 4, 46, and 58 is conceptual in function, and is not necessarily physically configured as depicted. That is, the specific patterns of distribution and unification of the components are not meant to be restricted to those depicted in the drawings. All or part of the components can be functionally or physically distributed or unified in arbitrary units according to various loads and the state of use. Furthermore, all or arbitrary part of the process functions performed in each component can be achieved by a Central Processing Unit (CPU) and a program analyzed and executed on that CPU, or can be achieved as hardware with a wired logic.

FIG. 71 is a drawing of a hardware configuration of a computer 400 forming the searching apparatus 100 (or the searching apparatus 200 or 300) according to the embodiments. As depicted in FIG. 71, this computer (searching apparatus) 400 includes an input device 401, a monitor 402, a Random Access Memory (RAM) 403, a Read Only Memory (ROM) 404, a medium reading device 405 that reads data from a storage medium, a communication device 406 that transmits and receives data with another device (for example, the terminal device 60), a CPU 407, and a Hard Disk Device (HDD) 408, which are all connected via a bus 409.

The HDD 408 has stored therein a search program 408b achieving functions similar to those of the searching apparatus 100 (or any of the searching apparatuses 200 and 300) explained above. With the CPU 407 reading and executing the search program 408b, a search process 407a is started. Here, the search process 407a corresponds to the search-query splitting unit 160a, the extraction-result-table generating unit 160b, the logical-value calculating unit 160c, the logical-expression transforming unit 160d, the BDD constructing unit 160e, the BDD transforming unit 160f, the diagram executing unit 160g, and the search-result output unit 160h depicted in FIG. 4 (alternatively, the search process 407a corresponds to the functional units 260a to 260h depicted in the control unit 260 in FIG. 46 or the functional units 360a to 360i depicted in the control unit 360 in FIG. 58).

Also, the HDD 408 has stored therein various data 408a corresponding to the XML data 150a, the search query 150b, the split-search query 150c, the extraction result table 150d, the logical value table 150e, the transform-logical-expression data 150f, the first diagram data 150g, the second diagram data 150h, the evaluation result table 150i, and the search result data 150j (alternatively, the various data 408 corresponds to the data 250a to 250j depicted in FIG. 46 or the data 350a to 350l depicted in FIG. 58). The CPU 407 reads the various data 408a stored in the HDD 408 for storage in the RAM 403, and uses various data 403a stored in the RAM 403 to evaluate a search query.

Meanwhile, the search program 408b is not necessarily required be stored in the HDD 408 depicted in FIG. 71 from the start. For example, the search program 408b may be stored in a "portable physical medium" inserted in the computer, such as a flexible disk (FD), compact-disk read only memory (CD-ROM), digital versatile disk (DVD), magneto-optical disk, or Integrated Circuit (IC) card; a "fixed physical medium" inside or outside of the computer, such as an HDD; or further "another computer (or server)" connected to the computer via a public line, the Internet, a Local Area Network (LAN), or a Wide Area Network (WAN), and be read by the computer therefrom for execution.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A true/false decision method performed by a searching apparatus, the method comprising:

accepting a search condition including a logical condition formed of a plurality of variables;

creating a first diagram from the search condition by using a Binary Decision Diagrams method, the first diagram storing a combination of a starting-point variable, an arrival variable and a bit which indicates true or false of the starting-point variable, the arrival variable being at a next level from the starting variable;

creating a second diagram from the first diagram, the second diagram storing a combination of a starting-point variable, an arrival variable and a bit string, one or more variables being between the starting-point variable and the arrival variable, each bit included in the bit string indicating true or false of one of the one or more variables and the starting-point variable, and the bit string indicating true or false of the one or more variables and the starting-point variable;

adding, to the second diagram, an uncertain logical variable to be set at a state selected between a state in which a logical value of a variable has been found and a state in which a logical value of a variable has not been found; and making a true/false decision on the search condition of a logical bit string of search target data, each bit of the logical bit string indicating true or false decision result of a variable included in the search target data, by extracting a bit string of a predetermined number of digits from the starting-point variable from the logical bit string of the search target data, and specifying the arrival variable as a transition destination based on the second diagram, wherein in the making a true/false decision, as a result of specifying the arrival variable as a transition destination, when a logical value of a variable corresponding to the uncertain logic variable is required, the logical value of the variable being required is calculated, and the uncertain logical variable is set at the state in which the logical value has been found.

2. The true/false decision method according to claim 1, further comprising storing a level table in the storage device, the level table in which a difference between a level of the starting-point variable and a predetermined level is associated with the starting-point variable, wherein in the making of a true/false decision, the predetermined number of digits of the bit string is determined based on the level table.

3. The true/false decision method according to claim 1, wherein when a level of a first arrival variable exceeds a predetermined level, a dummy value is inserted to a head bit of a bit string with the first arrival variable being taken as the starting-point variable for transition to a next second arrival variable, the dummy value being given by subtracting the predetermined level from the level of the first arrival variable, thereby standardizing the number of digits of bit strings to the predetermined number of digits.

4. The true/false decision method according to claim 1, wherein intermediate variables are included between the starting-point variable and the arrival variable and, when a level of the arrival variable exceeds a predetermined level, a dummy value is inserted at a last of the bit string that makes a transition from the starting-point variable to the arrival variable, the dummy value being given by subtracting a level of an immediately-preceding intermediate variable before a transition to the arrival variable from the predetermined level and further subtracting 1 from the subtraction result, thereby standardizing the number of digits of bit strings to the predetermined number of digits.

5. The true/false decision method according to claim 1, wherein when a level difference between a level of a transition-destination variable excluding the arrival variable and a level of a transition-source variable is equal to or greater than 2, the dummy value is inserted at a last of a bit string that makes a transition from the transition-source variable to the transition-destination variable, the dummy value being given by subtracting the level of the transition-source variable from the level of the transition-destination variable and further subtracting 1 from the subtraction result, thereby standardizing the number of digits of bit strings to the predetermined number of digits.

6. The true/false decision method according to claim 1, wherein a dummy variable is inserted between respective variables to standardize the number of times of transition from an initial variable to a final variable.

7. A non-transitory computer readable storage medium containing program instructions that, when executed by a computer, causes the computer to perform:

accepting a search condition including a logical condition formed of a plurality of variables;

creating a first diagram from the search condition by using a Binary Decision Diagrams method, the first diagram storing a combination of a starting-point variable, an arrival variable and a bit which indicates true or false of the starting-point variable, the arrival variable being at a next level from the starting variable;

creating a second diagram from the first diagram, the second diagram storing a combination of a starting-point variable, an arrival variable and a bit string, one or more variables being between the starting-point variable and the arrival variable, each bit included in the bit string indicating true or false of one of the one or more variables and the starting-point variable, and the bit string indicating true or false of the one or more variables and the starting-point variable;

adding, to the second diagram, an uncertain logical variable to be set at a state selected between a state in which a logical value of a variable has been found and a state in which a logical value of a variable has not been found; and making a true/false decision on the search condition of a logical bit string of search target data, each bit of the logical bit string indicating true or false decision result of a variable included in the search target data, by extracting a bit string of a predetermined number of digits from the starting-point variable from the logical bit string of the search target data, and specifying the arrival variable as a transition destination based on the second diagram, wherein in the making a true/false decision, as a result of specifying the arrival variable as a transition destination, when a logical value of a variable corresponding to the uncertain logic variable is required, the logical value of the variable being required is calculated, and the uncertain logical variable is set at the state in which the logical value has been found.

8. The computer readable storage medium according to claim 7, wherein the instructions further cause the computer to perform storing a level table in the storage device, the level table in which a difference between a level of the starting-point variable and a predetermined level is associated with the starting-point variable, and wherein in the making of a true/false decision, the predetermined number of digits of the bit string is determined based on the level table.

9. The computer readable storage medium according to claim 7, wherein when a level of a first arrival variable exceeds a predetermined level, a dummy value is inserted to a head bit of a bit string with the first arrival variable being taken as the starting-point variable for transition to a next second arrival variable, the dummy value being given by subtracting the predetermined level from the level of the first arrival variable, thereby standardizing the number of digits of bit strings to the predetermined number of digits.

* * * * *